(12) United States Patent
Droandi et al.

(10) Patent No.: US 12,479,584 B2
(45) Date of Patent: Nov. 25, 2025

(54) SYSTEMS AND METHODS FOR MANAGING eVTOL FLIGHT IN ICING

(71) Applicant: Archer Aviation Inc., San Jose, CA (US)

(72) Inventors: Giovanni Droandi, San Jose, CA (US); Bharat Tulsyan, San Jose, CA (US); Scott Graves, Felton, CA (US); Sujay Desai, San Jose, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 19/204,044

(22) Filed: May 9, 2025

(65) Prior Publication Data

US 2025/0276794 A1    Sep. 4, 2025

Related U.S. Application Data

(63) Continuation of application No. PCT/US2024/044891, filed on Aug. 30, 2024.

(60) Provisional application No. 63/587,117, filed on Sep. 30, 2023.

(51) Int. Cl.
*B64D 15/02* (2006.01)
*B64C 29/00* (2006.01)
*B64D 27/34* (2024.01)

(52) U.S. Cl.
CPC .......... *B64D 15/02* (2013.01); *B64C 29/0033* (2013.01); *B64D 27/34* (2024.01)

(58) Field of Classification Search
CPC ......... B64D 15/02; B64D 15/06; F02C 7/047; F01D 25/02; B64C 29/0033
See application file for complete search history.

(56) References Cited

U.S. PATENT DOCUMENTS

| 2,455,313 | A | 11/1948 | Osofsky |
| 2,619,305 | A | 11/1952 | Enos |
| 3,834,157 | A | 9/1974 | Hoffmann |
| 4,505,639 | A | 3/1985 | Groess et al. |
| 4,976,102 | A | 12/1990 | Taylor |
| 5,558,495 | A | 9/1996 | Parker |

(Continued)

FOREIGN PATENT DOCUMENTS

| CN | 217198667 U | 8/2022 |
| CN | 115788597 A | 3/2023 |

(Continued)

OTHER PUBLICATIONS

Commercial Aviation Safety Team, "Propeller operation and malfunctions basic familiarization for flight crews.", CAST, 2011, pp. 1-16.

(Continued)

*Primary Examiner* — William L Gmoser

(74) *Attorney, Agent, or Firm* — Finnegan, Henderson, Farabow, Garrett & Dunner, LLP

(57) ABSTRACT

Embodiments of the present disclosure provide systems and methods for averting, shedding, or otherwise managing ice accretions that may develop during flight of an aircraft. Example systems and methods direct oil from a lubrication and cooling path to targeted sections of ice-prone surfaces to manage ice accretion in a way that does not unduly increase the total volume of oil, require larger pumps, or complicate the system.

24 Claims, 48 Drawing Sheets

(56) References Cited

U.S. PATENT DOCUMENTS

| | | |
|---|---|---|
| 5,704,567 A | 1/1998 | Maglieri |
| 5,746,580 A | 5/1998 | Parker et al. |
| 5,793,137 A | 8/1998 | Smith |
| 6,102,333 A | 8/2000 | Gerardi et al. |
| 6,181,235 B1 | 1/2001 | Smith |
| 7,131,612 B2 | 11/2006 | Baptist et al. |
| 7,217,091 B2 | 5/2007 | LeMieux |
| 7,921,632 B2 | 4/2011 | Jacquet-Francillon et al. |
| 7,967,566 B2 | 6/2011 | Liang |
| 8,057,163 B2 | 11/2011 | Thompson, Jr. et al. |
| 9,140,187 B2 | 9/2015 | Ribarov et al. |
| 9,239,011 B2 | 1/2016 | Jones |
| 9,463,879 B2 | 10/2016 | Khozikov et al. |
| 9,469,408 B1 | 10/2016 | Elangovan et al. |
| 9,580,182 B2 | 2/2017 | Leschi et al. |
| 9,638,044 B2 | 5/2017 | Gieras et al. |
| 9,815,545 B1 | 11/2017 | Steer |
| 9,964,098 B2 | 5/2018 | Zhou et al. |
| 10,155,593 B2 | 12/2018 | Burton et al. |
| 10,399,684 B2 | 9/2019 | Hull et al. |
| 10,450,950 B2 | 10/2019 | Weber |
| 10,752,367 B2 | 8/2020 | Torske et al. |
| 10,822,999 B2 | 11/2020 | Morris et al. |
| 11,047,316 B2 | 6/2021 | Raykowski |
| 11,077,937 B1 | 8/2021 | Bruell et al. |
| 11,124,304 B2 | 9/2021 | Clark et al. |
| 11,280,398 B2 | 3/2022 | Parsons et al. |
| 11,453,504 B2 | 9/2022 | Ueda |
| 11,679,872 B1 | 6/2023 | Tulsyan |
| 11,702,213 B2* | 7/2023 | Porte ..................... F02C 7/047 701/36 |
| 11,702,939 B2 | 7/2023 | Riverin |
| 12,110,825 B1 | 10/2024 | Cafaro et al. |
| 2002/0154999 A1 | 10/2002 | Eccles |
| 2013/0039759 A1 | 2/2013 | Perkinson |
| 2014/0166127 A1 | 6/2014 | Yun |
| 2014/0205446 A1 | 7/2014 | Patsouris et al. |
| 2014/0369812 A1 | 12/2014 | Caruel et al. |
| 2015/0083863 A1 | 3/2015 | Karthauser et al. |
| 2016/0017751 A1 | 1/2016 | Caruel |
| 2016/0114898 A1 | 4/2016 | Llamas Castro et al. |
| 2016/0122025 A1 | 5/2016 | Hull et al. |
| 2017/0015427 A1 | 1/2017 | Gornik |
| 2018/0010527 A1 | 1/2018 | Rowe |
| 2018/0038280 A1 | 2/2018 | Rogero et al. |
| 2018/0162538 A1* | 6/2018 | Zheng .................... B64D 15/02 |
| 2018/0216529 A1* | 8/2018 | Maalioune ............ B64D 15/04 |
| 2018/0230853 A1 | 8/2018 | Jastrzembowski et al. |
| 2018/0327100 A1* | 11/2018 | Froman ................. B64D 15/12 |
| 2019/0084682 A1 | 3/2019 | Aubert et al. |
| 2019/0112065 A1* | 4/2019 | Porte ......................... F02C 7/04 |
| 2019/0118955 A1* | 4/2019 | Porte ..................... F02C 7/047 |
| 2019/0118957 A1* | 4/2019 | Thomassin ............ B64D 27/04 |
| 2019/0337628 A1 | 11/2019 | Torske et al. |
| 2020/0003295 A1 | 1/2020 | Parsons et al. |
| 2020/0039654 A1 | 2/2020 | Smith |
| 2020/0122844 A1* | 4/2020 | Porte ..................... B64D 29/00 |
| 2020/0247552 A1 | 8/2020 | Lisio et al. |
| 2020/0284192 A1 | 9/2020 | Haynes et al. |
| 2020/0290742 A1 | 9/2020 | Kumar et al. |
| 2020/0386118 A1 | 12/2020 | Warren et al. |
| 2021/0039783 A1 | 2/2021 | Weekes et al. |
| 2021/0108576 A1 | 4/2021 | Adibhatla |
| 2021/0114740 A1 | 4/2021 | Berkey et al. |
| 2021/0309375 A1 | 10/2021 | Gutwein |
| 2021/0309376 A1 | 10/2021 | Carpino, II |
| 2021/0362849 A1 | 11/2021 | Bower |
| 2022/0266987 A1 | 8/2022 | Möbius et al. |
| 2022/0281613 A1 | 9/2022 | Senthilnathan et al. |
| 2022/0361300 A1 | 11/2022 | Hull et al. |
| 2023/0074603 A1 | 3/2023 | Manning |
| 2023/0174241 A1 | 6/2023 | Palacios |
| 2023/0249833 A1 | 8/2023 | Zaid et al. |
| 2023/0312111 A1 | 10/2023 | Hein et al. |
| 2023/0366326 A1 | 11/2023 | Kulecki |
| 2024/0190573 A1* | 6/2024 | Belleville ............... B64D 15/04 |

FOREIGN PATENT DOCUMENTS

| | | |
|---|---|---|
| EP | 3838764 B1 | 5/2023 |
| EP | 4227496 A1 | 8/2023 |
| EP | 4385899 A1 | 6/2024 |
| FR | 2281273 A1 | 3/1976 |
| FR | 3001253 A1 | 7/2014 |
| FR | 3125999 A1 | 2/2023 |
| GB | 2158524 A | 11/1985 |
| GB | 2518715 A | 4/2015 |
| JP | 3558279 B2 | 8/2004 |
| WO | 2010132086 | 11/2010 |
| WO | 2021101465 A1 | 5/2021 |
| WO | 2021231699 A1 | 11/2021 |
| WO | 2022074405 A1 | 4/2022 |

OTHER PUBLICATIONS

Dallas, Thomas et al., "Analysis and Preliminary Investigation of Eddy-Current Heating for Icing Protection of Axial-Flow-Compressor Blades", National Advisory Committee for Aeronautics, Aug. 8, 1949, pp. 1-67.

Rosenthal, H.A. et al., "De-Icing of Aircraft Turbine Engine Inlets", Department of Transportation Report, Jun. 1988, pp. 1-82.

Rekuviene et al., "A review on passive and active anti-icing and de-icing technologies", Applied Thermal Engineering, 2024, vol. 250, pp. 1-13.

International Search Report and Written Opinion mailed Dec. 3, 2024, in counterpart PCT International Application No. PCT/US2024/044891, 32 pages.

* cited by examiner

SYSTEMS AND METHODS FOR MANAGING eVTOL FLIGHT IN ICING

CROSS-REFERENCE TO RELATED APPLICATIONS

This application claims the benefit of priority of International Application No. PCT/US2024/044891, titled "Systems and Methods for Managing Ice Accretions During Flight of Aircraft," filed Aug. 30, 2024, which in turn claims the benefit of priority of U.S. Provisional Application No. 63/587,117, titled "Systems and Methods for Managing eVTOL Flight in Icing," filed Sep. 30, 2023, the contents of all of which are incorporated herein by reference in their entirety for all purposes.

TECHNICAL FIELD

This disclosure relates generally to the field of powered aerial vehicles. More particularly, and without limitation, the present disclosure relates to innovations in tilt-rotor aircraft that use electrical propulsion systems. Certain aspects of the present disclosure generally relate to systems and methods for preventing or mitigating ice accretion in electric aircraft. Other aspects of the present disclosure generally relate to improvements in ice prevention or mitigation that may be used in other types of vehicles but provide particular advantages in aerial vehicles.

BACKGROUND

An electric vertical takeoff and landing (eVTOL) aircraft typically includes one or more electric propulsion units ("EPUs"), each including at least one (full or partial) electric or hybrid-electric motor and at least one propeller. The propeller includes a plurality of propeller blades (sometimes molded or integrated as a single piece) that rotate about a propeller hub when driven mechanically by a propeller shaft. Each EPU generates thrust by its motor(s) converting electrical power into mechanical shaft power to rotate the propeller blades.

SUMMARY

Embodiments of the present disclosure provide systems and methods for preventing or mitigating (collectively "managing") ice accretions during flight of any aircraft.

Some embodiments of the present disclosure provide a method of managing ice accretions on an aircraft, the method comprising: determining an icing condition of the aircraft; performing a propeller modulation based on the icing condition, wherein performing the propeller modulation comprises: inducing a first ice management cycle in a first set of one or more propellers of the aircraft, inducing a second ice management cycle in a second set of one or more propellers of the aircraft, the first set of one or more propellers being different from the second set of one or more propellers, and the first ice management cycle occurring at a first time interval that is different from a second time interval of the second ice management cycle.

Some embodiments of the present disclosure provide a propeller assembly for an aircraft, comprising: a propeller; a motor assembly coupled to the propeller; a heat exchanger; an oil flow path configured to thermally couple the heat exchanger to the motor assembly, the oil flow path comprising a first segment, a second segment, and a third segment; and a nacelle mechanically coupled to the motor assembly, the nacelle comprising an air inlet configured to direct air into the heat exchanger, the air inlet comprising a lower lip with respect to a forward flight configuration and an upper lip opposite the lower lip, the lower lip being farther from the motor assembly than the upper lip, wherein: the first segment passes through motor assembly; the second segment passes through the heat exchanger; the third segment passes along the lower lip, and the oil flow path bypasses the upper lip.

Some embodiments of the present disclosure provide a propeller assembly for an aircraft, comprising: a propeller comprising: a hub; and a plurality of propeller blades, each of the plurality of propeller blades comprising a blade channel inside the propeller blade and configured to circulate fluid; a motor assembly configured to rotate the propeller about a rotation axis; and an oil flow path configured to circulate oil through the motor assembly and through each blade channel of the plurality of propeller blades to thermally couple the motor assembly to the plurality of propeller blades; wherein the propeller assembly is configured to transfer heat from the motor assembly to an external environment outside the propeller assembly by thermal conduction through the propeller blades.

Some embodiments of the present disclosure provide a propeller assembly for an aircraft, comprising: a propeller comprising: a hub; and a plurality of propeller blades, each of the plurality of propeller blades comprising a blade channel inside the propeller blade and configured to circulate fluid; a motor assembly configured to rotate the propeller about a rotation axis; and an oil flow path configured to circulate oil through the motor assembly and through each blade channel of the plurality of propeller blades to thermally couple the motor assembly to the plurality of propeller blades; wherein the plurality of propeller blades comprises a sole heat exchanger of the motor assembly.

Some embodiments of the present disclosure provide a propeller assembly for an aircraft, comprising: a propeller hub; a propeller blade coupled to the propeller hub; a spinner coupled to the propeller hub; a spinner rod coupled to the propeller hub; an electrically conductive portion; a motor configured to rotate the propeller hub, the propeller blade, the spinner, the spinner rod, and the electrically conductive portion; and a magnet suspended from the spinner rod, the magnet being rotationally decoupled from the spinner rod by a bearing; wherein the magnet is configured to generate a current in the electrically conductive portion when the propeller rotates to manage ice accretion on a surface of the propeller assembly.

Some embodiments of the present disclosure provide a propeller assembly for an aircraft, comprising: a rotating portion comprising: a propeller hub; a propeller blade coupled to the propeller hub; a spinner coupled to the propeller hub; and an electrically conductive portion; a motor configured to rotate the rotating portion; and a magnet configured to remain stationary with respect to the motor; wherein the magnet is configured to generate a current in the electrically conductive portion when the rotating portion rotates to manage ice accretion on a surface of the rotating portion.

Some embodiments of the present disclosure provide a method of managing ice accretions on an aircraft, the method comprising: determining an icing condition of the aircraft; and performing a propeller modulation based on the icing condition, wherein performing the propeller modulation comprises: modulating a first propeller parameter in coordination with a modulation of a second propeller parameter of a first set of one or more propellers of the aircraft, wherein the first propeller parameter and the second propeller parameters are different parameters, each comprising one of: revolutions per minute (RPM), blade pitch angle, torque, propeller tilt angle, or propeller angular position about a propeller blade rotation axis, of the first set of one or more propellers.

BRIEF DESCRIPTIONS OF FIGURES

DETAILED DESCRIPTION

Figure 1A:
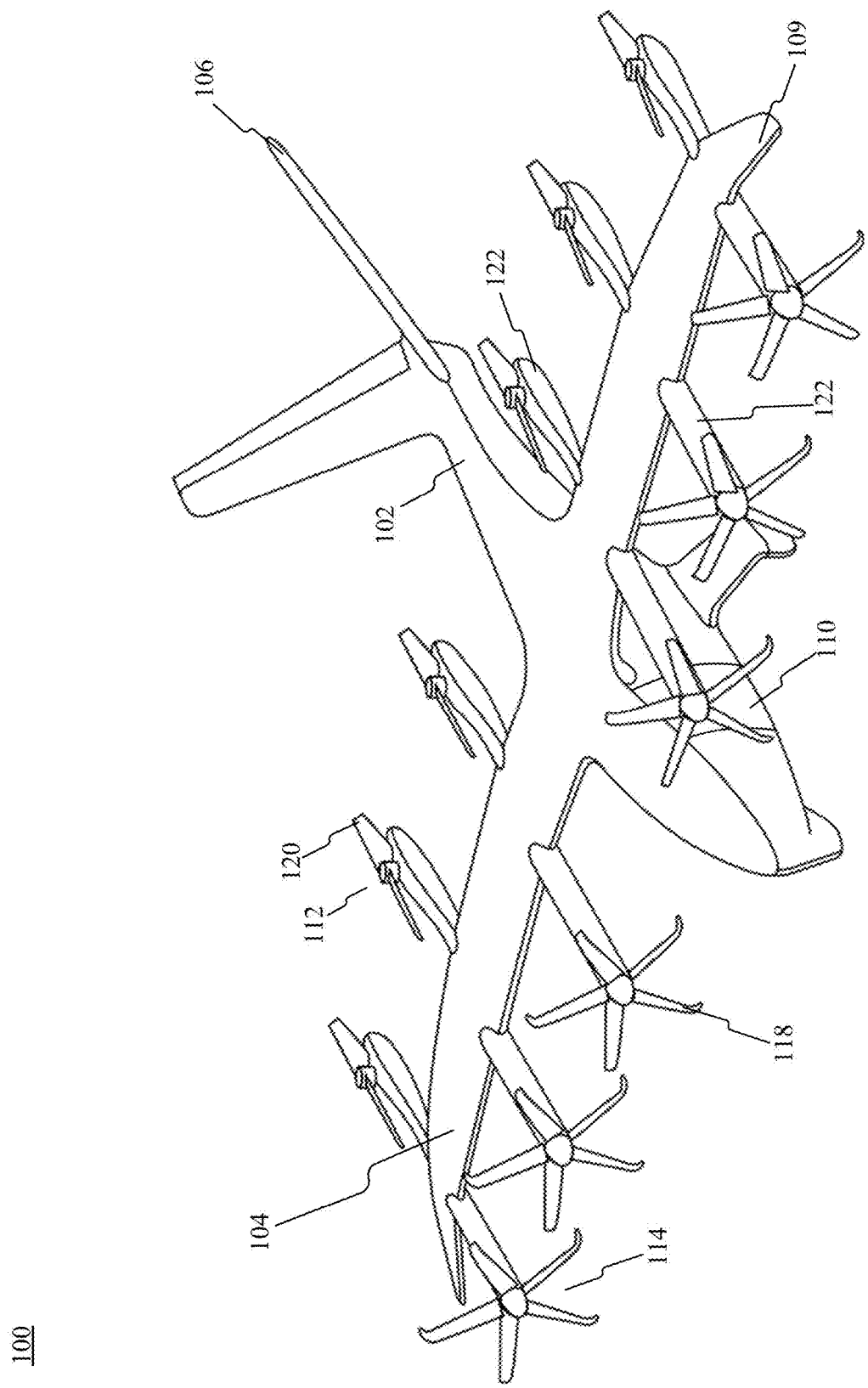
FIG. 1A illustrates an example VTOL aircraft in a cruise configuration, consistent with embodiments of the present disclosure.

The present disclosure addresses components of an aircraft, such as a vertical takeoff and landing (VTOL) aircraft, e.g. an electric vertical takeoff and landing (eVTOL) aircraft. For example, the eVTOL aircraft of the present disclosure may be intended for frequent (e.g., over 50 flights per workday), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft are propelled by a distributed propulsion system, avoiding the risk of a single point of failure, and that they are capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

Although they could be employed for use in conventional aircrafts, disclosed embodiments provide new and improved configurations of aircraft components that are not observed in conventional aircraft, and/or identified design parameters for components that differ from those of conventional aircraft. Such alternate configurations and design parameters, in combination addressing drawbacks and challenges with conventional components, yielded the embodiments disclosed herein for various configurations and designs of VTOL or eVTOL aircraft components.

In some embodiments, the VTOL or eVTOL aircraft of the present disclosure may be designed to be capable of both vertical and conventional takeoff and landing, with a distributed electrical propulsion system enabling vertical flight, forward flight, and transition. Thrust may be generated by supplying high voltage electrical power to the electrical engines of the distributed electrical propulsion system, which each may convert the high voltage electrical power into mechanical shaft power to rotate a propeller. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations. For example, in order to be certified for flight into known icing (FIKI) conditions, the Federal Aviation Administration or its foreign counterparts may require an aircraft to be capable of reliably preventing or mitigating ice accretion on its surfaces.

In some embodiments, the distributed electrical propulsion system may include twelve electrical engines, which may be mounted on booms forward and aft of the main wings of the aircraft. The forward electrical engines may be tiltable mid-flight between a horizontally oriented position (e.g., to generate forward thrust) and a vertically oriented position (e.g., to generate vertical lift). In some embodiments, for a vertical takeoff and landing (VTOL) mission, the forward electrical engines as well as aft electrical engines may provide vertical thrust during takeoff and landing. During flight phases where the aircraft is in forward flight-mode, the forward electrical engines may provide horizontal thrust, while the propellers of the aft electrical engines may be stowed at a fixed position in order to minimize drag. The aft electrical engines may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a mostly horizontal direction during forward-flight mode. A variable pitch mechanism may change the forward electrical engine's propeller-hub assembly blade collective angles for operation during the hover-phase, transition phase, and cruise-phase.

In some embodiments, in a conventional takeoff and landing (CTOL) mission, the forward electrical engines may provide horizontal thrust for wing-borne take-off, cruise, and landing. In some embodiments, the aft electrical engines may not be used for generating thrust during a CTOL mission and the aft propellers may be stowed in place.

In some embodiments, an electrical propulsion system as described herein may generate thrust by supplying High Voltage (HV) electric power to an electric engine, which in turn converts HV power into mechanical shaft power which is used to rotate a propeller. As mentioned above, an aircraft as described herein may possess multiple electric engines which are boom-mounted forward and aft of the wing. The amount of thrust each electric engine generates may be governed by a torque command from the Flight Control System (FCS) over a digital communication interface to each electric engine. Embodiments may include forward electric engines, and may be able to alter their orientation, or tilt. Additional embodiments include forward engines that may be a clockwise (CW) type or counterclockwise (CCW) type. The forward electric engine propulsion subsystem may consist of a multi-blade adjustable pitch propeller, as well as a variable pitch subsystem.

As disclosed herein, an electrical engine may include an inverter and motor; or inverter, gearbox, and motor across various configurations, such as representative configurations as described herein. For example, an electrical engine may include an electrical motor, gearbox, and inverter that all share the same central axis. Additionally, the central axis may be configured along an axis of an output shaft going to the propeller of the aircraft. In such an exemplary configuration, the motor, gearbox, and inverter would all share the output shaft as a central axis and would be circularly oriented around the output shaft. Additional embodiments may include a motor, gearbox, and inverter that are mounted together in a sequence, or a configuration where some of the components are mounted together, such as the motor and gearbox, and another component is located elsewhere, such as the inverter, but wiring systems are used to connect the electrical engine.

It is understood that an electrical engine may generate heat during operation and may comprise a heat management system to ensure components of the electrical engine do not fail during operation. In some embodiments, coolant may be used and circulated throughout individual components of the engine, such as an inverter, gearbox, or motor, through some of the components, or through all of the components of the engine to assist with managing the heat present in the engine. Additional embodiments may include using air cooling methods to cool the electrical engine or using a mixture of coolant and air to manage the heat generated during operation in the electrical engine. In some embodiments, the coolant being used may also be the same liquid that is being used as lubricant throughout the inverter, gearbox, or motor. For example, the inverter, gearbox, and motor may be cooled using a liquid or air, or a mixture of air and liquid cooling could be used, such as cooling the motor using air cooling and using liquid cooling in the inverter and gearbox, or any other combination of air and liquid cooling across the inverter, gearbox, and motor or even subsets of those components.

In some embodiments, oil may be used as a lubricant throughout an electrical engine and may also be used as coolant fluid to assist in managing the heat generated by the engine during operation. Further to this example, different amounts of oil may be used to act as both lubricant and coolant fluid in the electrical engine, such as less than one quart, less than two quarts, or any other amount of oil needed to lubricate and cool the electrical engine, in combination with or without the assistance of air cooling. In some embodiments, another coolant, such as glycol, may be used alternatively or in addition to oil.

The inventors here have recognized certain problems associated with flying into known or potential icing conditions. During flight, ice accretions may develop on lift and tilt propellers of the VTOL aircraft. Ice accretions on the aircraft, such as on propeller blades, control surfaces and leading edge surfaces, may degrade aircraft performance and pose safety hazards. Electric aircraft in the Urban Air Mobility (UAM) space may be particularly susceptible to icing issues on propeller blades due to the propellers frequently operating at lower revolutions per minute (RPMs) than comparably sized conventional aircraft. For example, the propellers may be designed to operate at lower speeds to minimize noise generation in urban environments. The lower centrifugal accelerations associated with these lower propeller speeds may increase the likelihood, rate, or magnitude of ice accretion on propeller blades and other surfaces. Certification of an aircraft for flight in icing conditions, including intentional or inadvertent flight into known icing conditions, may require ice protection systems or alternate means to manage the effects of propeller icing.

Further, the design of VTOL aircraft may introduce icing problems that may not arise with conventional aircraft. For example, some VTOL aircraft may comprise a lift propeller that only operates in a lift or hover phase of flight, and may be stowed in a stationary configuration otherwise, such as during forward wing borne flight. The stationary arrangement may cause asymmetric ice accretions to develop on the lift propeller. If the lift propeller is then activated, asymmetric ice accretions may create an adverse propeller imbalance and safety flight risk.

Additionally, during flight, ice accretion may develop on other surfaces such as, e.g., an air inlet. Ice accretion may also develop on other surfaces such as, e.g., wings or control surfaces. Ice accretion may degrade aircraft performance and cause a safety hazard. For example, inlet ice accretion may constrict airflow to, e.g., a heat exchanger located downstream of the inlet, reducing the cooling efficiency of the heat exchanger and potentially leading to overheating in an electric engine, battery, or other heat source. Ice accretion may additionally affect aircraft performance by reducing lift, increasing weight and drag, and therefore requiring more thrust. Certification for FIKI (flight into known icing) conditions may require ice protection systems or alternate means to manage the effects of inlet icing.

Embodiments of the present disclosure may provide systems and methods for shedding or otherwise managing ice accretions of an aircraft, such as a VTOL aircraft. Management in this context may refer to preventing ice accretion from forming as well as mitigation of ice accretion that has already been formed. In some embodiments, management may refer to alleviating problems associated with ice accretion, such as by causing ice accretion to form on two opposing blades with a more balanced ice distribution than would otherwise be formed without the ice management. Such management systems may take advantage of the heightened level of individual motor control that is available in the distributed propulsion architectures of electric aircraft. For example, ice management cycles may comprise periodically and alternately modulating a propeller parameter on a set of one or more propellers, such as tip Mach number or RPM, to shed and remove propeller ice accretions. The periodic modulation on one propeller may be compensated by corresponding modulations on another propeller so that ice accretion may be managed without inducing an unintended change in flight trajectory. For example, the modulation may be performed in symmetric pairs such that the increased thrust of the symmetric pair of propellers is balanced on either side of the aircraft. Further, other propellers may be controlled to reduce their thrust, thereby achieving a net change in thrust that is acceptable (e.g., below a pre-determined threshold level), or a net change in thrust that is at or near substantially zero. For example, a first symmetric pair of outward propellers may increase their RPM to achieve a tip Mach number that is sufficient for ice prevention or mitigation, while a second symmetric pair of inward propellers may decrease their RPM by a corresponding amount. In this way, ice accretions may be removed from the outward propellers without any appreciable disruption to the flight trajectory or passenger experience. A similar process may then be performed for the inward symmetric pair of propellers. In some embodiments, rather than performing periodic modulations of relatively short duration, symmetric pairs of propellers may be placed into an extended ice shedding mode. For example, in some embodiments a first symmetric pair of propellers may be maintained at a high speed such that ice is continually prevented from forming, while a second symmetric pair may be shut down entirely. This allows some propellers to avoid ice accretion altogether while others can be shut down and disregarded. In some embodiments, the propellers that are shut down may be periodically modulated to prevent excessive ice accretion, and shut down otherwise.

This system advantageously downsizes or eliminates dedicated ice protection systems such as electric heaters, fluid conduits, thumpers or other mechanical ice removal devices, etc. This may reduce the cost and weight of the aircraft while simultaneously reducing the number of power-consuming devices and simplifying the control structures to yield a simpler, more efficient and more failsafe design. In some embodiments, lift propellers may be operated in a similar manner to shed ice accretions.

Furthermore, lift propellers may be periodically rotated during stationary periods in cruise flight such that a different lift propeller blade is facing forward. By dividing the amount of forward-facing time substantially evenly between, e.g., each blade of a two-bladed lift propeller, a three-bladed lift propeller, etc., the asymmetry of ice accretion on the blades may be minimized. The periodic rotation of asymmetric ice accretions may enable operational capability, such as enabling transition and vertical flight after an icing encounter where the stowed propellers are needed and may have accreted ice.

Embodiments of the present disclosure may additionally provide systems for managing ice accretions on the surface of a VTOL aircraft such as, e.g., an air inlet. For example, an electric aircraft may comprise electric engines that are lubricated or cooled by an oil flow path. The oil flow path may pass over moving components of a motor assembly, such as rotors, gears, etc. to lubricate and/or cool the components. The oil flow path may further be configured to flow over, or be thermally coupled to, non-moving components such as an inverter, to absorb heat from the components. The oil flow path may pass through a heat exchanger configured to thermally couple the heat exchanger to the motor assembly. The heat exchanger may discharge the accumulated heat to an air flow from the air inlet. By adding an additional segment to the oil flow path, the heated oil from the motor assembly may be directed across problem areas that are vulnerable to ice accretion. For example, it has been found that the lower lip of an air inlet may be more susceptible to ice accretion than other parts of the inlet such as, e.g., an upper inlet. The oil flow path may therefore bypass, e.g., the upper lip of the air inlet to target the heated oil at problem areas without incurring unnecessary penalties in the form of added weight, conduit piping, oil volume, oil pump size, pressure loss in the flow path, or ice-melting capacity of the heated oil.

Embodiments of the present disclosure may additionally provide electrical systems for managing ice accretions. In some embodiments, ice management systems may utilize the electrical or mechanical power of the propeller to wirelessly generate heat in a moving component of the propeller assembly, such as, e.g., propeller blades or spinner. For example, in some embodiments, a permanent magnet or electromagnet on a stationary part of the propeller assembly may be configured to induce a flow of current in a winding or generate eddy current heating in a sheet of conductive material. The current and/or heat may be distributed throughout an ice-prone surface by a system of, e.g., electrically and/or thermally conductive wiring. In some embodiments, an AC circuit may be configured to selectively generate current in a coil embedded within, e.g., the blade or spinner, which may then be distributed by the system of conductive wiring.

Figure 1B:
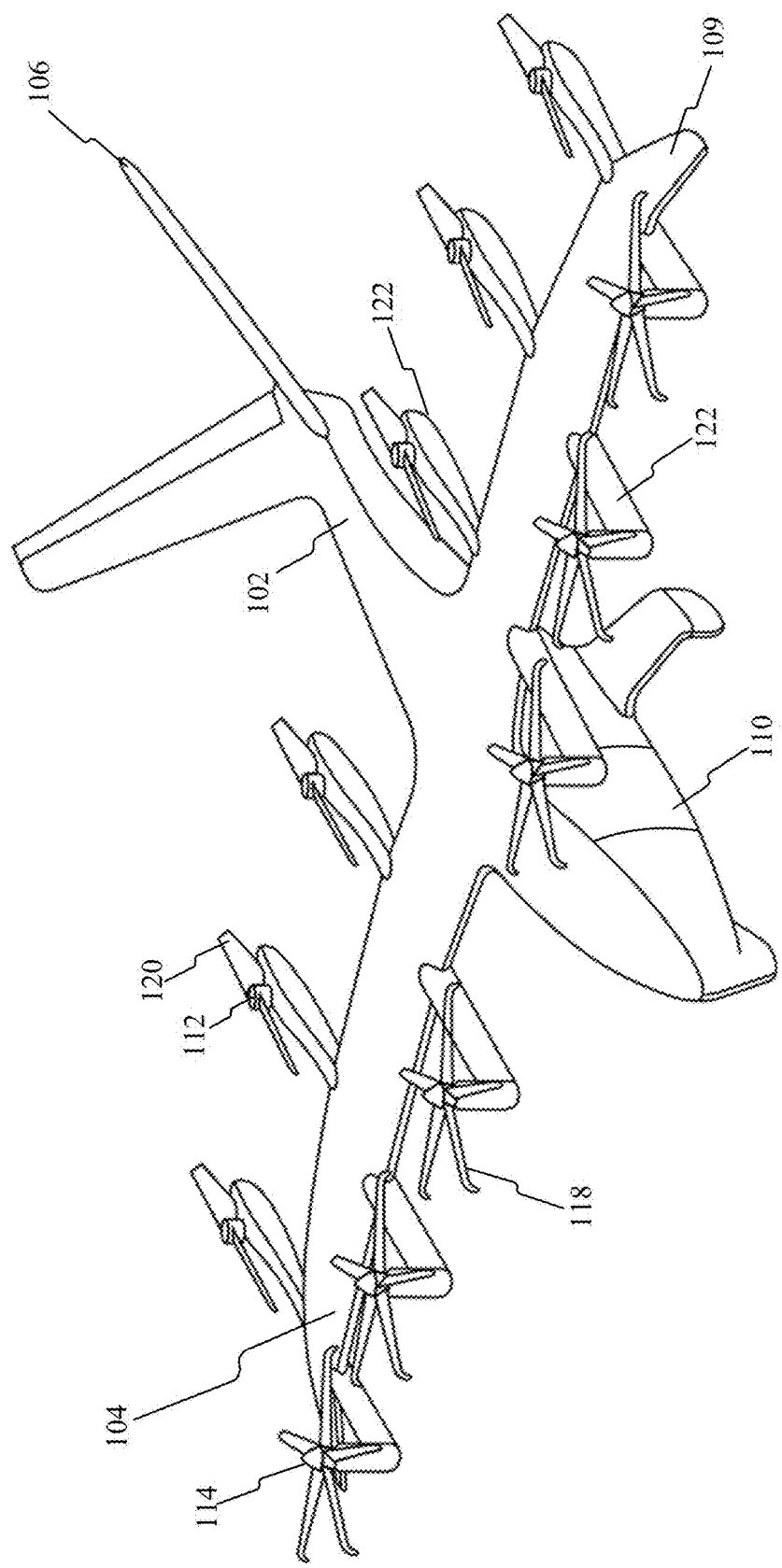
FIG. 1B illustrates an example VTOL aircraft in a lift configuration, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims. For instance, the descriptions of VTOL aircraft 100 of FIGS. 1A and 1B given below are merely examples of the types of distributed propulsion aircraft that may implement ice management systems and methods according to embodiments of the present disclosure. In some embodiments, for example, an aircraft may comprise more or fewer lift propellers, or more or fewer tilt propellers, or the lift or tilt propellers may be mounted or operated in ways other than what is shown in FIGS. 1A and 1B. In some embodiments, for instance, an aircraft may comprise, e.g., all lift propellers or all tilt propellers. In some embodiments, a lift propeller that is designed for use only in the lift configuration may nevertheless be tiltable or otherwise moveable for stowing in the cruise configuration. In some embodiments, lift propellers or tilt propellers may be mounted to booms in front of or behind a wing, may be located between a front and a rear wing, or may be mounted to another body of the aircraft, such as a fuselage, strut, or a leading edge, trailing edge, upper surface, lower surface, or tip of wing, tail, etc. The ice management systems and methods described herein may be applicable to many different propeller and aircraft designs, as will be appreciated by persons having ordinary skill in the art.

FIGS. 1A and 1B illustrate a VTOL aircraft 100 in a cruise configuration and a vertical take-off, landing and hover configuration (also referred to herein as a "lift" configuration), respectively, consistent with embodiments of the present disclosure. The aircraft 100 may include a fuselage 102, wings 104 mounted to the fuselage 102, tail 106, and one or more rear stabilizers 106 mounted to the tail 106 or the rear of the fuselage 102. A plurality of lift propellers 112 may be mounted to wings 104 and configured to provide lift for vertical take-off, landing and hover. A plurality of tilt propellers 114 may be mounted to wings 104 and may be tiltable between the cruise configuration in which they provide forward thrust to aircraft 100 for horizontal flight, as shown in FIG. 1A, and the lift configuration in which they provide a portion of the lift required for vertical take-off, landing and hovering, as shown in FIG. 1B. As used herein, a lift configuration may refer to a tilt propeller orientation in which the tilt propeller thrust is providing primarily lift to the aircraft. A cruise configuration may refer to a tilt propeller orientation in which the tilt propeller thrust is providing primarily forward thrust to the aircraft. Alternatively, a cruise configuration may refer to a configuration in which a lift propeller is stowed.

In some embodiments, lift propellers 112 may be configured for providing lift only, with all propulsion being provided by the tilt propellers. Accordingly, lift propellers 112 may be in fixed positions and may only generate thrust during take-off, landing and hover. Meanwhile, tilt propellers 114 may be tilted to lift configurations in which their thrust is directed vertically for providing additional lift.

For forward flight, tilt propellers 114 may tilt from their lift configurations to their cruise configurations. In other words, the pitch and tilt angle of tilt propellers 114 may be varied from an orientation in which the tilt propeller thrust is directed vertically (to provide lift during vertical take-off, landing and hover) to an orientation in which the tilt propeller thrust is directed horizontally (to provide forward thrust to aircraft 100). The tilt propellers may tilt about axes that may be perpendicular to the forward direction of the aircraft 100. When the aircraft 100 is in full forward flight during the cruise configuration, lift may be provided entirely by wings 104. Meanwhile, lift propellers 112 may be shut off or may be actively stowed. The blades 120 of lift propellers 112 may be locked in low-drag positions for aircraft cruising. In some embodiments, lift propellers 112 may each have two blades 120 that may be locked for cruising in minimum drag positions in which one blade is directly in front of the other blade as illustrated in FIG. 1A. In some embodiments, lift propellers 112 have more than two blades. In some embodiments, tilt propellers 114 include more blades 118 than lift propellers 112. For example, as illustrated in FIGS. 1A-B, lift propellers 112 may each include, e.g., two blades and tilt propellers 114 may each include, e.g., five blades. In some embodiments, tilt propellers 114 may have, e.g., from 2 to 5 blades.

In some embodiments, the aircraft may include only one wing 104 on each side of fuselage 102 (or a single wing that extends across the entire aircraft) and at least a portion of lift propellers 112 may be located rearward of wings 104 and at least a portion of tilt propellers 114 may be located forward of wings 104. In some embodiments, all of lift propellers 112 may be located rearward of wings 104 and all of tilt propellers 114 may be located forward of wings 104. According to some embodiments, all lift propellers 112 and tilt propellers 114 may be mounted to the wings—i.e., no lift propellers or tilt propellers may be mounted to the fuselage. In some embodiments, lift propellers 112 may be all located rearwardly of wings 104 and tilt propellers 114 may be all located forward of wings 104. According to some embodiments, all lift propellers 112 and tilt propellers 114 may be positioned inwardly of the wing tips 109.

In some embodiments, lift propellers 112 and tilt propellers 114 may be mounted to wings 104 by booms 122. Booms 122 may be mounted beneath wings 104, on top of the wings, and/or may be integrated into the wing profile. In some embodiments, one lift propeller 112 and one tilt propeller 114 may be mounted to each boom 122. Lift propeller 112 may be mounted at a rear end of boom 122 and tilt propeller 114 may be mounted at a front end of boom 122. In some embodiments, lift propeller 112 may be mounted in a fixed position on boom 122. In some embodiments, tilt propeller 114 may mounted to a front end of boom 122 via a hinge. Tilt propeller 114 may be mounted to boom 122 such that tilt propeller 114 is aligned with the body of boom 122 when in the cruise configuration, forming a continuous extension of the front end of boom 122 that minimizes drag for forward flight.

In some embodiments, aircraft 100 may include, e.g., one wing on each side of fuselage 102 or a single wing that extends across the aircraft. According to some embodiments, the at least one wing 104 is a high wing mounted to an upper side of fuselage 102. According to some embodiments, the wings include control surfaces, such as flaps, ailerons or flaperons. According to some embodiments, the wings may have curved wing tips 109 for reduced drag during forward flight.

In some embodiments, rear stabilizers 106 include control surfaces, such as one or more rudders, one or more elevators, and/or one or more combined rudder-elevators. The wing(s) may have any suitable design. For example, the wings have a tapering leading edge or a tapering trailing edge. In some embodiments, the wings may have a substantially straight leading edge in the central section of wings 104.

Aircraft 100 may include at least one door 110 for passenger entry and exit. In some embodiments, the door 110 may be located beneath and forward of wings 104 as seen in FIGS. 1A and 1B.

Further discussion of VTOL aircraft may be found in U.S. Patent Publication No. 2021/0362849, which is incorporated by reference in its entirety.

As discussed above, embodiments primarily address ice accretion on VTOL aircraft propellers and VTOL aircraft surfaces with ice management systems, but can be applied more broadly to other types of aircrafts.

A. Example Ice Management System Embodiments

Figure 2:
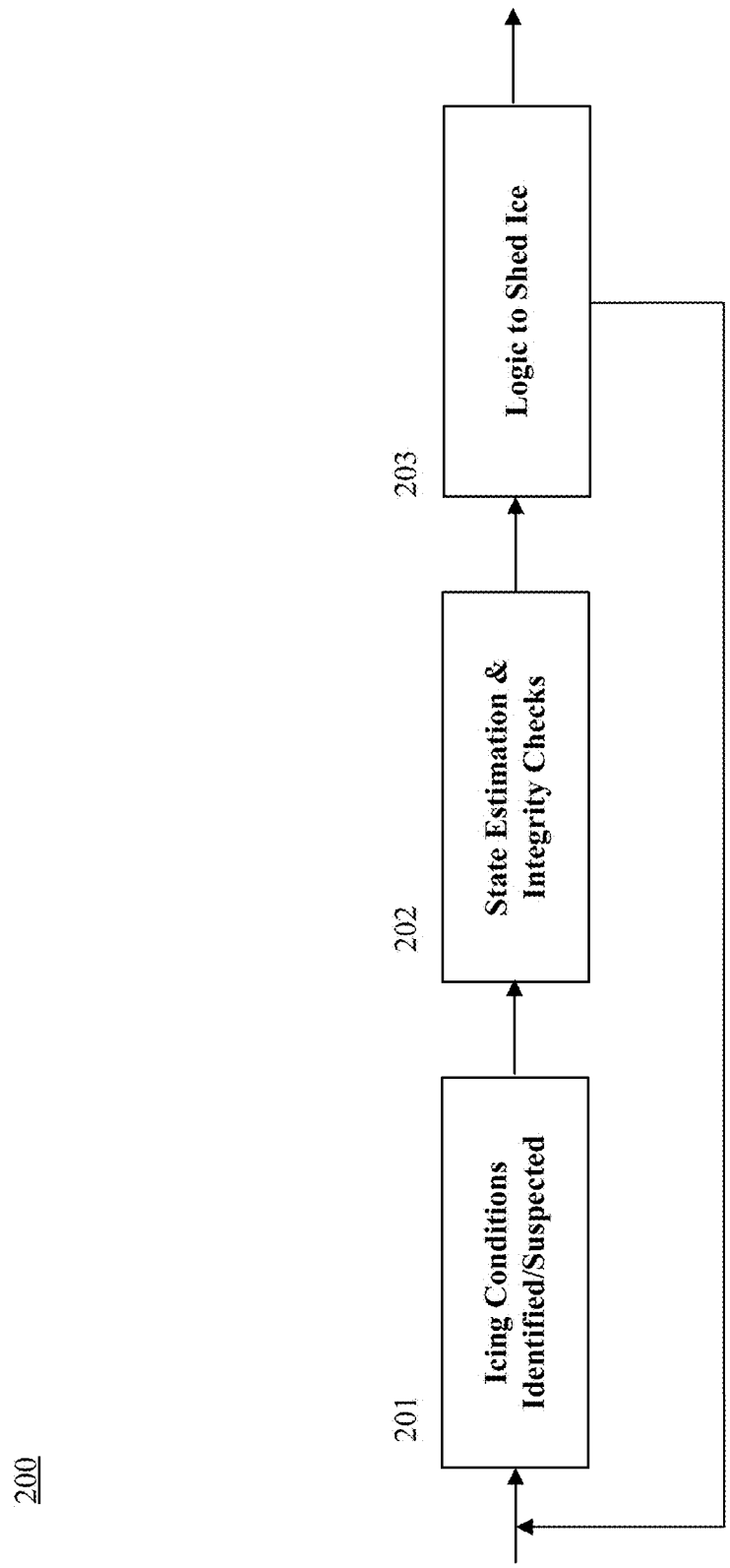
FIG. 2 illustrates an example ice management system for a distributed propulsion electric aircraft, consistent with embodiments of the present disclosure.

FIG. 2 illustrates an example ice management system 200, consistent with disclosed embodiments. Ice management system 200 may comprise part of, e.g., a distributed propulsion electric aircraft, such as VTOL aircraft 100 of FIGS. 1A and 1B. Ice management system 200 may comprise a memory storing instructions and a processor configured to execute the instructions to perform the various functions of the ice management system. For example, ice management system 200 may comprise a portion of a flight control system (FCS) or related control architecture. Ice management system 200 may comprise: an icing conditions identification module 201; a state estimator 202, and an ice shedding logic module 203. Icing conditions identification module 201 may be configured to determine that an icing condition is present, or that a probability of icing has exceeded a predetermined threshold. Icing conditions identification module 201 may comprise, e.g., a primary ice detector, a pilot-operated manual switch, or an icing estimator. An icing estimator may comprise a portion of the FCS configured to determine the likelihood of an icing condition based on, e.g., weather data, geospatial information, information received from an authority service such as the Federal Aviation Administration (FAA), or aircraft sensor data. In some embodiments, an accelerometer within the electric engine, propeller or another module may be used to determine an icing condition, as discussed further below with respect to FIG. 12. In some embodiments, a motor position sensor within the electric engine, propeller or another module may be used to determine an icing condition, as discussed further below with respect to FIGS. 13 and 14. In some embodiments, motion position sensor may comprise e.g., a resolver. The icing conditions identification module 201 may be configured to determine an icing condition based on an icing state input (such as an input signal from manual switch module 301 or primary ice detector module 302 as discussed with respect to FIG. 3A below). Icing conditions comprise a state in which at least one of, e.g., the air surrounding an aircraft contains droplets of supercooled liquid water, the average droplet size meets a predetermined size measurement, air temperature reaches a predetermined value, ice formation is detected on the aircraft, ice formation is observed on the aircraft, or other similar conditions. The icing state input may indicate that icing conditions have been identified or are suspected. The icing state input may be determined from detection systems on the aircraft, on the ground, from a weather service or other third party, or a combination of such detection systems. In some embodiments, the icing state input may be based on a primary ice detector. For example, the primary ice detector may comprise a magnetostrictive ice detector or an optical ice detector. Further, icing conditions may be determined based on sensors monitoring the aircraft surface, sensors monitoring aircraft physical properties, sensors monitoring surrounding environmental conditions, and similar sensors. In some embodiments, an electric engine accelerometer may be utilized to measure acceleration rates to determine if the propeller has icing build up. In other disclosed embodiments, the icing state input may be based on an input from the flight control system or a pilot, such as through a manual switch. The manual switch may be activated by a pilot monitoring conditions. For example, the pilot may activate the manual switch due to temperature, visible moisture, ice accretions on a reference surface, altitude, or similar properties. The manual switch may comprise a pilot operable interface such as a button, switch, touchscreen interface, voice command, or any other system for inputting a command from a human user of the electric aircraft.

When an icing condition is identified, icing conditions identification module 201 may input a signal to state estimator 202. State estimator 202 may comprise one or more processors configured to execute code for determining an aircraft state. For example, the one or more processors may form a portion of the flight control system, and the code may comprise a state estimation algorithm used to determine flight parameters of an aircraft based on the fusion of sensor data from a plurality of sensors. State estimator 202 may be configured to determine the aircraft state based on predetermined parameters such as values of, e.g., airspeed, altitude, roll, pitch or yaw angle, control surface inclination, etc., in order to determine whether it is safe, feasible or otherwise acceptable to perform an ice management operation. Such values may be determined, e.g., by detection or by inferring the values from flight control commands. For example, a roll angle may be determined based on a sensor configured to detect the roll angle, or it may be inferred based on a flight control command to maneuver the aircraft into the roll angle. The state estimator 202 may provide an estimate of the internal state of the aircraft from measurements of inputs and outputs of the aircraft. In some embodiments, the state estimator 202 may be configured to perform integrity checks of the aircraft and to isolate or limit the functionality of ice management operations such that the operations are performed only when it is acceptable to do so, or performed only to an acceptable magnitude or degree based on a present aircraft state. For example, state estimator 202 may limit ice management operations to when the aircraft is within a specific range of angles of, e.g., yaw, pitch, or roll, such as, e.g., +/−5 degrees, +/−10 degrees, +/−15 degrees, etc. In some embodiments, the range of angles deemed acceptable may vary with other related factors such as airspeed, inclination, etc. In some embodiments, state estimator 202 may limit ice management operations based on, e.g., a state of a powered lift enabled switch (such as when the powered lift enabled switch is OFF), an aircraft operating speed being below a maximum speed threshold, or similar properties. Additionally, the state estimator 202 may be configured to perform system and signal checks. For example, the state estimator 202 may confirm that all necessary propellers for performing the ice management are operational and valid.

The aircraft state may be determined based on, e.g., an aircraft speed, aircraft mode, aircraft propeller angle, outside condition, or similar parameters. In some embodiments, the propeller modulation may be performed only when the aircraft state meets predefined parameters such as threshold values of, e.g., control margin status, current bank angle, load factor, vertical airspeed vs. commanded airspeed, altitude, propulsion system integrity, signal integrity, flight mode or the like. In some embodiments, the ice management system 200 may include a processor configured to determine the aircraft state from the state estimator 202.

State estimator 202 may be configured to input a command to ice shedding logic module 203 based on, e.g., the determined aircraft state and the icing conditions input. Ice shedding logic module 203 may be configured to generate effector commands to induce one or more ice management cycles. For example, effector commands may comprise command signals for actuators, electric motors, or other control devices to modulate one or more parameters of, e.g., a propeller (such as propeller blade pitch angle), motor (such as RPM), or tilt actuator (such as tilt angle of the tilt propeller system). As further discussed below, the modulation of these parameters using the effector commands may induce an ice management cycle, and the particular effector commands that are selected may depend on the type of ice management operation that is being performed. In some embodiments, for example, a flight control system may access a library, reference table or other data structure, or use a model, defining a correspondence between one or more of the various propeller modulation parameters and a plurality of effector commands. This correspondence may then be used to generate a plurality of effector commands for implementing an ice management cycle. An ice management cycle may include, e.g., ice shedding, prevention, or compensation. Ice shedding may involve the removal of existing ice on the aircraft. Ice prevention may include averting ice from forming on the aircraft. Ice compensation may include reducing or counteracting ice formation on the aircraft. The ice management cycle may last for a predetermined time, or for an interval of time that varies from one cycle to the next, or may continue until a predetermined event occurs, such as until a predetermined parameters is met.

Figure 3A:
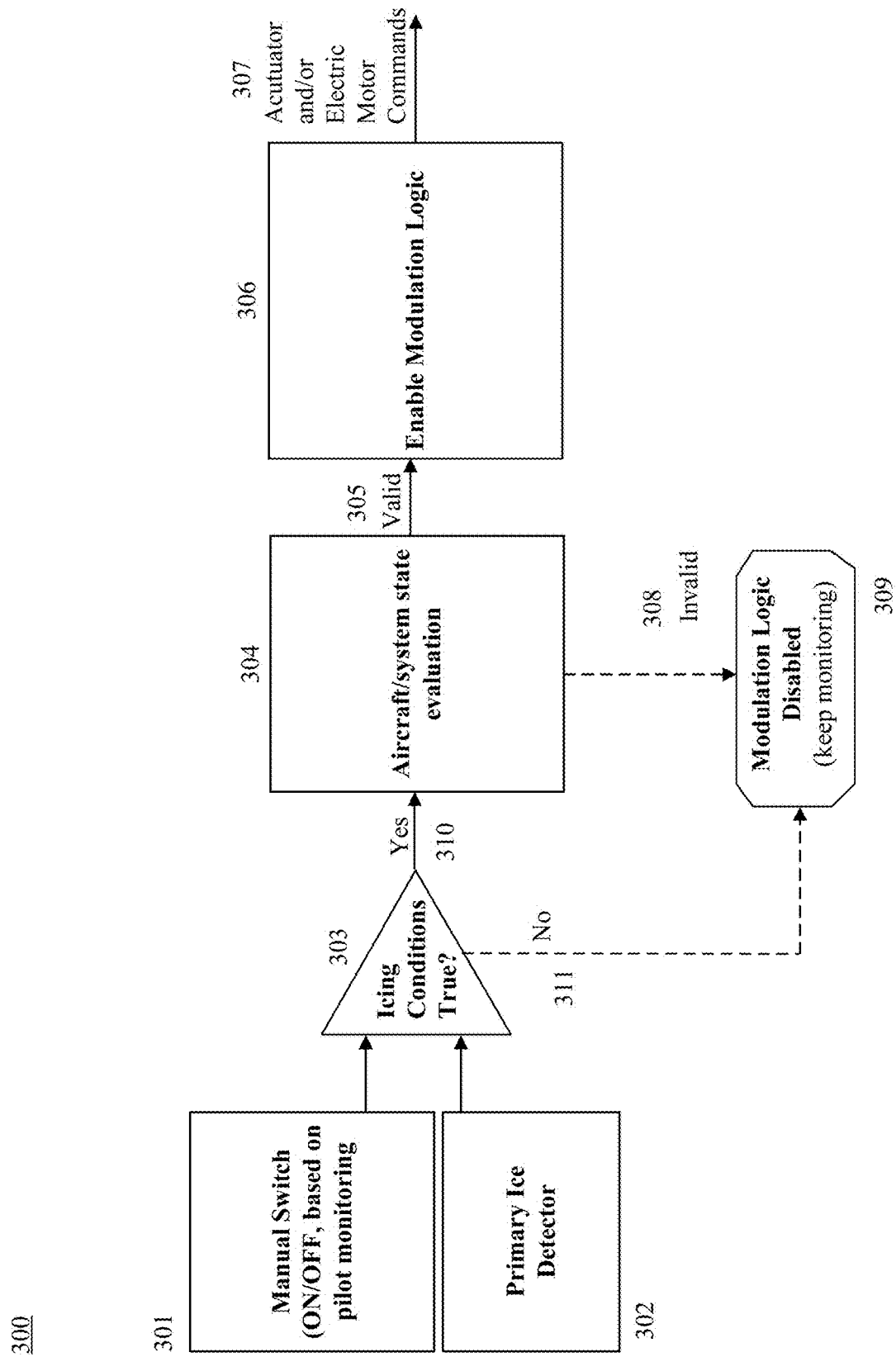
FIG. 3A illustrates an example ice management system for a distributed propulsion electric aircraft, consistent with embodiments of the present disclosure.

FIG. 3A illustrates an example ice management system 300, consistent with disclosed embodiments. Ice management system 300 may comprise part of e.g., a distributed propulsion electric aircraft, such as VTOL aircraft 100 of FIGS. 1A and 1B. In some embodiments, ice management system 300 may correspond to ice management system 200 of FIG. 2. In some embodiments, ice management system 300 may comprise a portion of a flight control system (FCS) or related control architecture. Ice management system may comprise: a manual switch module 301, a primary ice detector module 302, an icing conditions identification module 303 configured to output a valid icing condition 310 or an invalid icing condition 311, a state estimator 304 configured to output a valid aircraft state input 305 or an invalid aircraft state 308, an ice shedding logic module 306 configured to output effector commands 307, and a modulation logic disabled module 309.

Manual switch module 301 may comprise a manual ON/OFF switch as discussed above. The manual switch may be activated by a pilot monitoring conditions. For example, the pilot may activate the manual switch to indicate that an icing condition exists, such as when the outside air temperature (OAT) is at zero degree Celsius. The manual switch module 301 may determine an icing state input for the icing state conditions identification module 303.

Primary ice detector module 302 may comprise, e.g., a primary ice detector. For example, the primary ice detector may comprise a magnetostrictive ice detector, optical ice detector, or any detector that may be used to indicate icy conditions.

The icing conditions identification module 303 may determine an icing condition based on an icing state input from, e.g., the manual switch module 301 or primary ice detector module 302 as discussed above. In some embodiments, the icing conditions identification module 303 may output a valid icing condition 310. A valid icing condition may indicate that an icing condition exists, while an invalid icing condition may indicate that an icing condition does not exist. There may be different "valid" icing conditions for different types or severities of icing conditions, for which ice management operations may differ as well. The valid icing condition 310 may be input to the state estimator 304. In some embodiments, the icing state identification module 303 may output an invalid icing condition 311, where the invalid icing condition 311 is the input to the modulation logic disabled module 309.

The state estimator 304 may be configured to receive a valid icing condition input 310 from the icing conditions identification module 303 and output a valid aircraft state 305 to the enable modulation logic module 306. A valid aircraft state 305 may indicate that the aircraft is in an acceptable state of flight to perform a propeller modulation for ice management, while an invalid aircraft state 308 may indicate that the aircraft is not in an acceptable state of flight to perform a propeller modulation for ice management. In some embodiments, the state estimator 304 may be configured to input a valid icing state condition 310 from the icing conditions identification module 303 and output an invalid aircraft state 308 to the modulation logic disabled module 309.

The enable modulation logic module 306 may be configured to receive a valid aircraft state input 305 from the state estimator 304 and determine an appropriate propeller modulation parameter based on, e.g., information of the aircraft state or icing conditions. The propeller modulation parameter may comprise, e.g., a status, state, rate, angle, speed, mode, or other aircraft property that may be modulated. For example, the propeller modulation parameter may be tip Mach number, revolutions per minute (RPM), collective pitch angle, blade pitch angle, torque, or propeller tilt angle. The enable modulation logic module 306 may generate a plurality of effector commands 307, corresponding to the propeller modulation parameter. The effector commands 307 may be sent to effectors of the aircraft, such as electric engines or control surfaces, for example via the flight control system. In some embodiments, the flight control system may be configured to generate the plurality of effector commands at repeating time intervals. Repeating time intervals may include periodically performing a propeller modulation for a predetermined duration. For example, when a propeller modulation parameter is a propeller speed parameter such as tip Mach number (ratio of the speed of a propeller tip to the speed of sound in the surrounding air) or revolutions per minute (RPM), the ice management operation may comprise increasing the RPM for, e.g., 2 seconds every 15 seconds, every 2 minutes, every 5 minutes, or any other suitable combination of frequency and duration as appropriate for the particular aircraft type, aircraft state and icing condition. The propeller modulation parameter may be determined based on the valid icing condition 310 and the valid aircraft state 305.

The modulation logic disabled module 309 may be configured to disable propeller modulation logic when it is determined that such propeller modulation is, e.g., unsafe or unnecessary. For example, the modulation logic disabled module 309 may receive an invalid icing condition input 311 from icing conditions identification module 303 indicating that propeller modulation is unnecessary. Alternatively or additionally, the modulation logic disabled module 309 may receive an invalid aircraft state input 308 from state estimator 304 indicating that propeller modulation is unsafe or otherwise undesirable. The modulation logic disabled module 309 may be configured to prevent execution of an instant ice management operation while the ice management system 300 continues to operate.

Figure 3B:
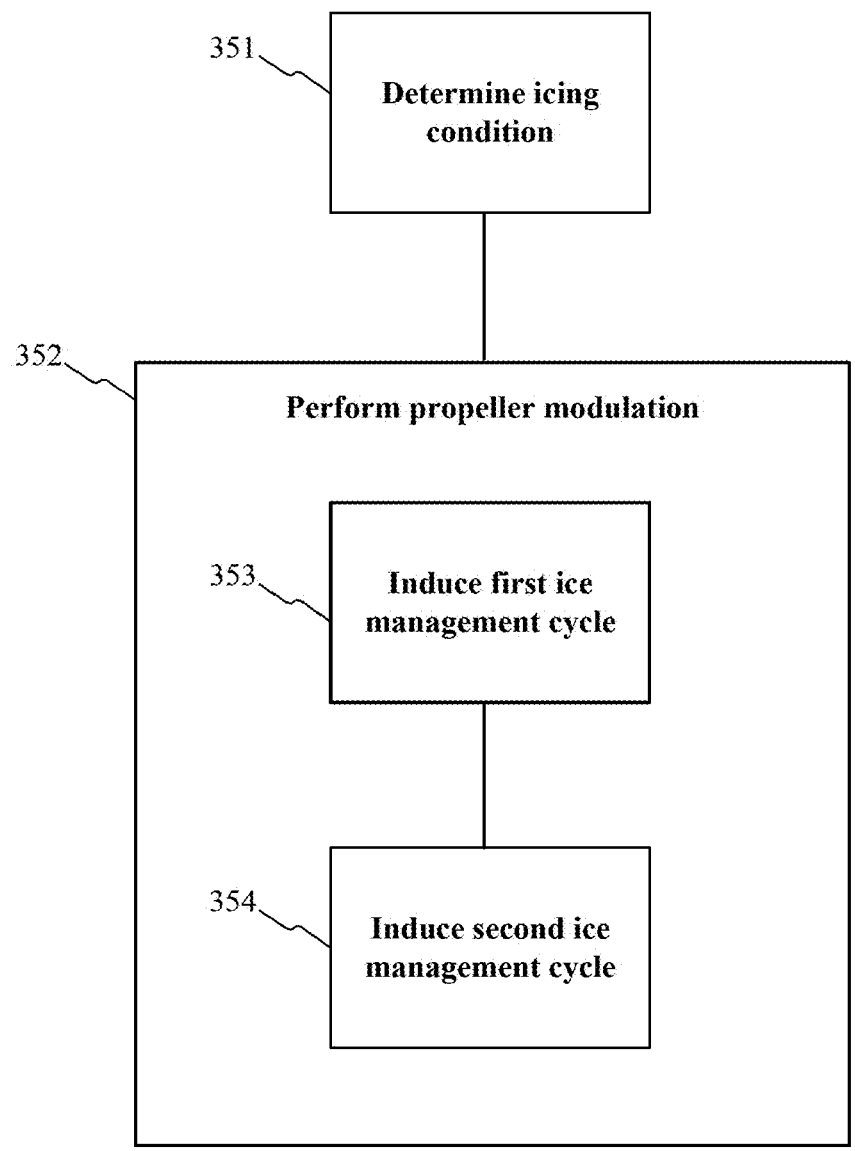
FIG. 3B illustrates an example ice management method for a distributed propulsion electric aircraft, consistent with embodiments of the present disclosure.

FIG. 3B illustrates an example ice mitigation method 350, consistent with embodiments of the present disclosure. Method 350 may be performed, e.g., in a flight control system comprising ice management systems 200 or 300 of FIG. 2 or 3A. At step 351, the ice management system may determine that an icing condition exists. As discussed throughout this disclosure, an icing condition may be determined based on, e.g., ice detection, or it may be inferred based on other factors such as a likelihood of icing in a given environment.

At step 352, the ice management system may perform a propeller modulation based on the determined icing condition. For example, the selection of a specific propeller modulation may be made based on factors such as the nature of the determined icing condition or the flight characteristics at the time the icing condition is determined. to be produce a first ice mitigation cycle. For example, if it is determined that rapidly altering the propeller blade pitch, or increasing engine RPM, etc., will effectively manage the determined icing condition and can be safely performed under the present flight characteristics, then such a propeller modulation may be selected.

As discussed further below, performing the propeller modulation may comprise a step 353 of inducing a first ice management cycle and a step 354 of inducing a second ice management cycle. The first ice management cycle may comprise modulating a first set of one or more propellers (such as a first propeller or a first symmetric pair of propellers) while other propellers remain constant or perform a compensating modulation to ensure that a flight remains undisturbed. The second ice management cycle may comprise modulating a second set of one or more propellers (such as a second propeller or a second symmetric pair of propellers) while other propellers remain constant or perform a compensating modulation. The first ice management cycle and the second ice management cycle may occur at different time intervals. In this way, the various propellers may "take turns" managing the icing conditions without causing a significant disruption to a flight.

FIGS. 4A-4D illustrate example ice management cycles 402-404 and 410-419 as compared to an example normal flight condition 401, according to disclosed embodiments. The ice management cycles may be performed according to, e.g., ice management systems 200 or 300 of FIGS. 2 and 3A. Arrows 440 in FIGS. 4A-4D may be representative of a relative magnitude of a modulation parameter such as, e.g., propeller speed. For example, as illustrated in the normal condition of forward flight 401 in which an ice management cycle is not occurring, the propeller speeds of each tilt propeller may be equal, while other configurations may illustrate magnitudes above or below the normal condition seen at 401. For example, some propellers may increase their propeller speed above that shown in the normal condition 401 to shed ice, while other propellers may compensate for any changes in thrust by reducing their propeller speeds below that shown in the normal condition 401. In some embodiments, a plurality of effector commands may be executed to induce a first ice management cycle 402 in a first symmetric pair of propellers 405 of the electric aircraft, and a second ice management cycle 403 in a second symmetric pair of propellers 406 of the electric aircraft, the first ice management cycle 402 occurring at a first time interval that is different from a second time interval of the second ice management cycle 403. A symmetric pair of propellers may include symmetric pairs of tilt propellers or lift propellers. In some embodiments, symmetric pairs of propellers may be symmetric about the body of the aircraft. In some embodiments, the first symmetric pair of propellers 405 and the second symmetric pair of propellers 406 may comprise pairs of tilt propellers. In some embodiments, the first symmetric pair of propellers 405 may include a first outermost propeller from a first side of a body of the aircraft and a second outermost propeller from a second side of the body of the aircraft. The first side of the body of the aircraft and the second side of the body of the aircraft may refer to laterally opposite sides of the body of the aircraft, such as on opposite wings. In some embodiments, the second symmetric pair of propellers 406 may include a third propeller inward of the first propeller on the first side of the body of the aircraft and a fourth propeller inward of the second propeller on the second side of the body of the aircraft.

Disclosed embodiments include management cycles occurring at different time intervals. In some embodiments, the first management cycle 402 may occur at a different time interval than the second management cycle 403. For example, different time intervals may comprise multiple distinct intervals with no overlap, or may indicate time intervals having different starting or stopping points with some overlap. For example, one pair of propellers may ramp up while another pair of propellers winds down, such that their ice management cycles overlap. In some embodiments, the plurality of effector commands 307 may be configured to induce the first ice management cycle 402 and the second ice management cycle 403 in non-overlapping time intervals. A different first and second time interval may include different start and stop times, different durations of the ice management cycle, different timespans, different periods of time, and the like.

Disclosed embodiments include additional ice management cycles corresponding to additional symmetric pairs of propellers. In some embodiments, the plurality of effector commands is further configured to induce a third ice management cycle 404 in a third symmetric pair of propellers 407 of the electric aircraft, the third ice management cycle 404 occurring at a third time interval, the third time interval being different from the first time interval and the second time interval. In some embodiments, the third symmetric pair of propellers 407 may include a fifth propeller between the first propeller and the third propeller on the first side of the body of the aircraft and a sixth propeller between the second propeller and the fourth propeller on the second side of the body of the aircraft. It should be understood that the ice management cycles are identified as first, second and third for differentiation purposes and not to indicate a particular order.

Disclosed embodiments include changing the propeller modulation value of one set of propellers by a prescribed value. For example, the propeller modulation parameter may comprise RPM, and during the first ice management cycle 402, the RPM of the first symmetric pair of propellers 405 may be increased by a pre-determined amount during the first time interval. For example, the RPM may be increased in order to achieve a predetermined tip Mach number of the propeller blades such as, e.g., 0.5, 0.6, or higher, or another value that is sufficient to mitigate or prevent the icing condition. For example, under ordinary flight conditions, a typical eVTOL or another distributed electric propulsion aircraft may operate at low Mach numbers of, e.g., around 0.3 or 0.4, to avoid generating excessive noise. However, according to embodiments of the present disclosure, RPM may be temporarily modulated to higher values in a pair of propellers. For example, when only one pair of propellers is modulated at a time, ice may be managed without generating an unacceptable level of noise or a significant disturbance to flight characteristic. In some embodiments, modulation may take place in more than one pair but less than all pairs. In some embodiments, all pairs of propellers that are configured for forward flight may be simultaneously modulated for a short duration, despite the increase to noise or disturbance to flight characteristics. In some embodiments, the modulation may be compensated by the operations in other propellers, or by actuating flight control surfaces.

In some embodiments, the RPM of the first symmetric pair of propellers 405 may be increased by at least, e.g., 50 percent or 80 percent. In some embodiments, the RPM of the first symmetric pair of propellers 405 may be increased to at least, e.g., 50 percent or 80 percent of a maximum available RPM during the first time interval. In some embodiments, other symmetric propellers may decrease their RPM to compensate for the increased RPM of the first symmetric pair of propellers during first ice management cycle 402, as indicated by the relatively shorter arrows at pairs 406 and 407. In some embodiments, other compensating operations may be performed, such as actuating control surfaces, so that the ice management cycles may be performed without any substantial disruption to the flight trajectory or passenger experience.

In some embodiments, the propeller modulation parameter may comprise blade pitch angle, and during the first ice management cycle 402, the blade pitch angle of the first symmetric pair of propellers 405 may change by at least, e.g., 5, 10, or 20 degrees during the first time interval. For example, a blade pitch angle may be changed to induce higher aerodynamic blade loading. By way of example, in some embodiments, a blade pitch angle may be changed to a second blade pitch angle from a first blade pitch angle by, e.g., +/−5 degrees for a period of, e.g., more than 10 seconds, such as about 30 seconds or more. In some embodiments, the first ice management cycle 402 may include changing the blade pitch angle of the first symmetric pair of propellers 405 by at least 5 degrees at least 4 times during the first time interval. The first interval may be, e.g., less than 5 seconds, less than 10 seconds, or may include any other duration of time. Rapidly varying the blade pitch angle may cause ice to shake loose or be exposed to varying airflows.

In some embodiments, the propeller modulation parameter may comprise torque, and the first ice management cycle 402 may include changing a torque value of the first symmetric pair of propellers 405 by a predetermined amount during the first time interval. In some embodiments, an ice management cycle may comprise rapid back and forth accelerations to shake ice buildup from the propeller blades. For example, an electric engine in a distributed propulsion system may be capable of reversing direction, braking, or otherwise decelerating a propeller to induce such rapid changes. For example, in some embodiments, such braking or decelerating may comprise rotating a propeller in a single direction while intermittently decelerating and accelerating to induce a series of rapid starting and stopping motions to shed ice, while in some embodiments, the rotation direction may be periodically reversed. In some embodiments, an electric engine may use regenerative braking to harvest energy from the propellers while also achieving a negative acceleration to manage ice. In some embodiments, the first ice management cycle 402 may include increasing the torque of the first symmetric pair of propellers 405 by at least, e.g., 50 percent or 80 percent. In some embodiments, the first ice management cycle 402 may include increasing the torque of the first symmetric pair of propellers 405 from an initial torque value to within, e.g., 50 percent or 80 percent of a maximum torque, and decreasing the torque of the first symmetric pair of propellers 405 to below, e.g. 50, 30, 20, or 10 percent of a maximum torque during the first time interval. For example, the initial torque value may be the torque value that is being applied prior to altering the torque value at the beginning of an ice management cycle.

Figure 4A:
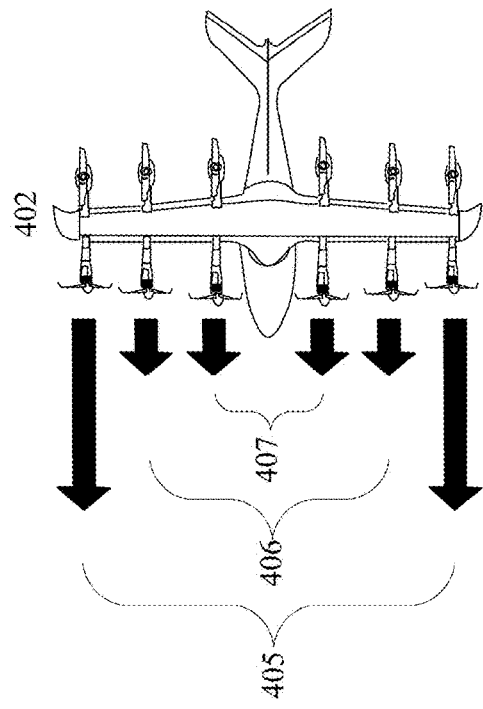
FIGS. 4A-4D illustrate example ice management cycles, consistent with embodiments of the present disclosure.
Figure 4A:
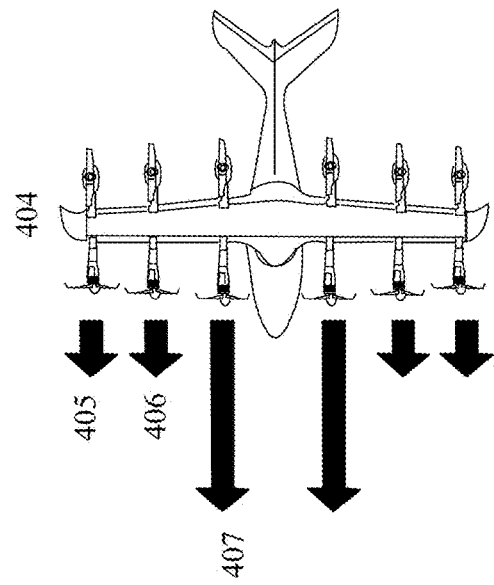
Figure 4A:
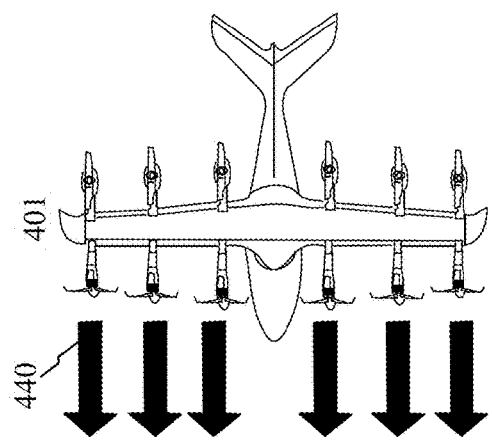
Figure 4A:
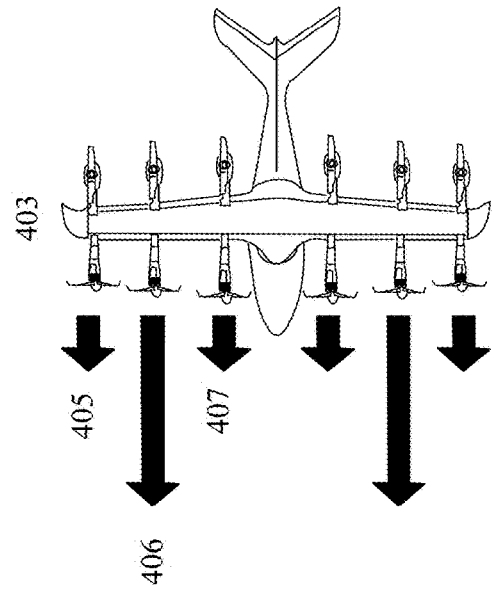
Figure 4B:
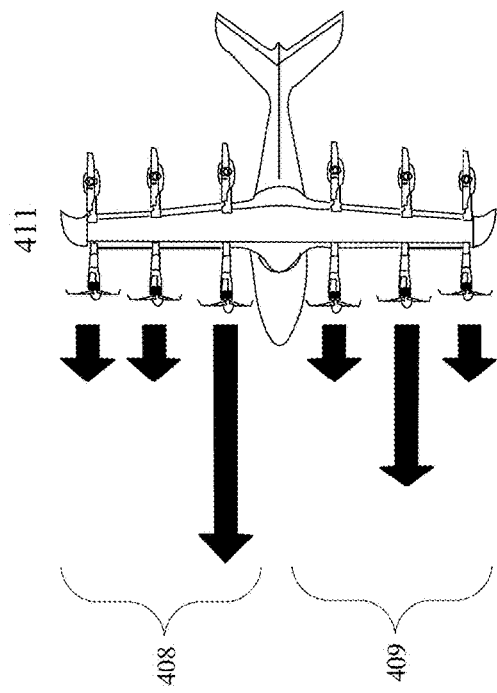
Figure 4B:
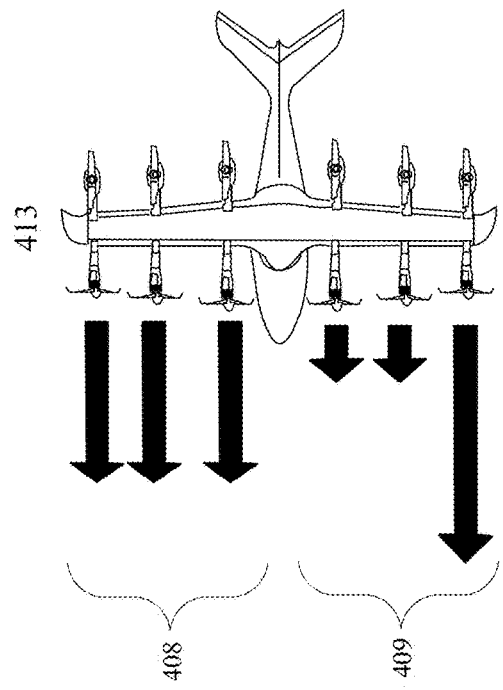
Figure 4B:
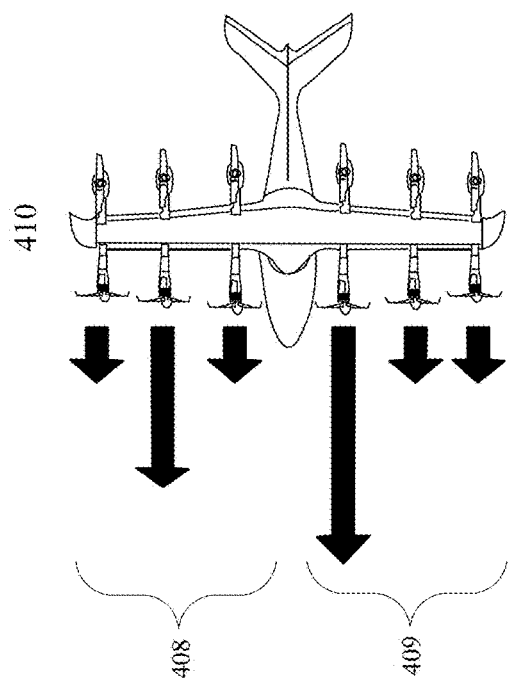
Figure 4B:
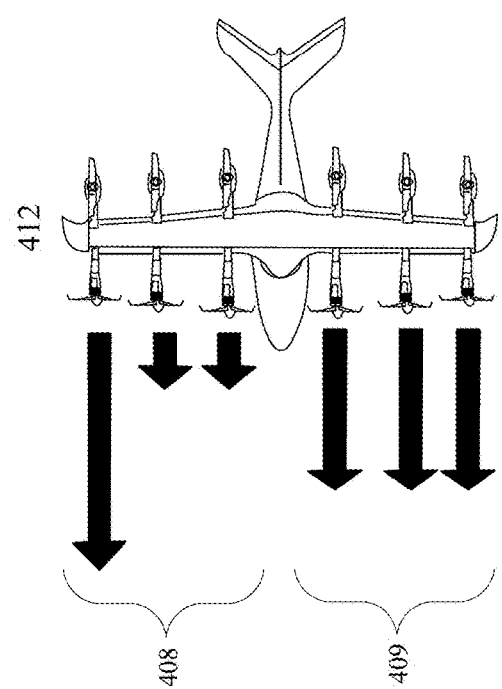

In some embodiments, the propeller modulation parameter may be a propeller tilt angle, and the first ice management cycle 402 may include changing the propeller tilt angle of the first symmetric pair of propellers 405 by a predetermined amount, such as at least 5, 10, 20, or 30 degrees, during the first time interval. A tilt angle may be changed to, e.g., produce an edgewise or axial flow of air over a propeller blade. This may be advantageous for ice shedding trajectory optimization. In some embodiments, the first ice management cycle 402 further includes increasing a second RPM of the second symmetric pair of propellers 406 during the first time interval, or performing another compensating operation as discussed above. Alternatively, a tilt angle modulation may serve as a compensation to another ice shedding cycle, or two complimentary ice shedding cycles may be performed together. For example, changing a tilt angle may produce a thrust vector having a vertical component, which may help to compensate a reduced lift from a simultaneous modulation occurring in the same or another pair of propellers. Some examples of such combined propeller modulation parameters are illustrated at FIG. 4D.

Further ice modulation cycles may be performed on other symmetric pairs of propellers in a manner corresponding to the description of the first symmetric pair of propellers 405. Further, while the ice management cycles are illustrated with respect to tilt propellers, embodiments of the present disclosure are not limited to this. For example, in some embodiments, lift propellers may be modulated according to the propeller modulation parameters above, alternatively or in addition to the tilt propellers.

Additionally, modulations need not be performed in symmetric pairs. FIG. 4B illustrates a further set of ice management cycles 410-413, consistent with embodiments of the present disclosure. As shown in FIG. 4B, modulation cycles may occur in symmetric sets rather than symmetric pairs. That is, a net thrust or other parameter from a first set 408 of propellers on a first side of a body of the aircraft may be substantially equal to a second net thrust or other parameter from a second set 409 of propellers on a second side of the body of the aircraft. Meanwhile, individual modulation parameters on symmetric pairs may not be equal in magnitude. Examples of such modulations are illustrated in ice management cycles 410-413.

As seen in ice management cycle 410, a middle propeller of the first set 408 may be modulated to a first RPM (or other modulation) value, and the innermost propeller of the second set 409 may be modulated to a second, higher RPM (or other modulation) value. Because the two modulated propellers are located at different distances from a center of the aircraft, they may exert different torques about a vertical (out of the page in FIG. 4B) axis for a given amount of thrust. By modulating the two propellers by different amounts, the net effect from the first and second sets 408 and 409 of propellers may be balanced. Ice management cycle 411 illustrates an opposite modulation to ice management cycle 410, in which a middle propeller of the second set 409 may be modulated to the first RPM value, and the innermost propeller of the first set 408 may be modulated to the second, higher RPM value.

As seen in ice management cycle 412, a single large propeller modulation, such as an outermost propeller of the first set 408 may be offset by a uniform propeller modulation of all propellers of the second set 409. This may allow the first and second sets 408 and 409 of propellers to balance each other while minimizing the number of propellers that require high-magnitude modulation. Ice management cycle 413 illustrates an opposite modulation to ice management cycle 412, in which an outermost propeller of the second set 409 may be offset by a uniform propeller modulation of all propellers of the first set 408.

In some embodiments, it may be preferable to modulate the propellers in symmetric sets rather than symmetric pairs, as discussed above, because the more complex modulation distributions may be tailored such that modulation can be performed during aircraft states that might otherwise be considered invalid or suboptimal, such as while banking. In some embodiments, the modulation may not be symmetric at all, to allow for modulation during such aircraft states. For example, in some embodiments, an aircraft state/evaluation system (such as e.g., 304 in FIG. 3A) may determine a state to be invalid for symmetric pair modulation, but may nevertheless determine the aircraft state to be valid for an alternate modulation, such as a symmetric set modulation or an asymmetric modulation.

Figure 4C:
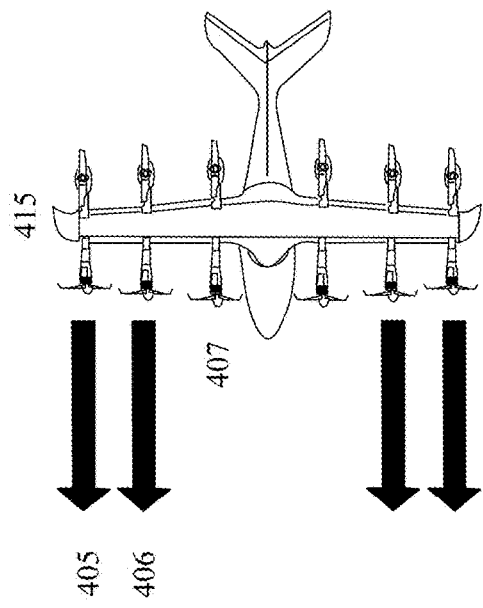
Figure 4C:
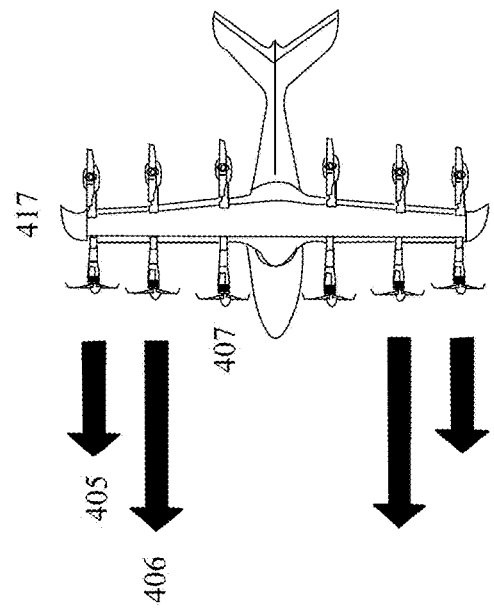
Figure 4C:
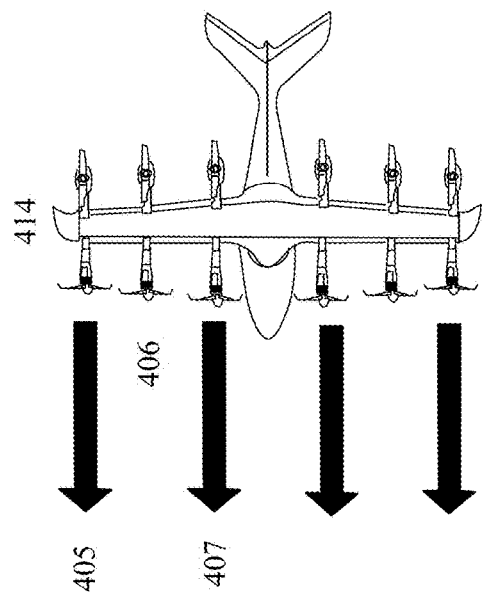
Figure 4C:
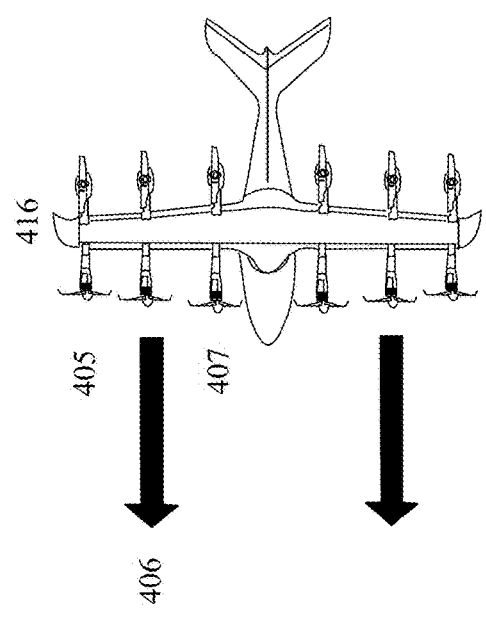
Figure 4D:
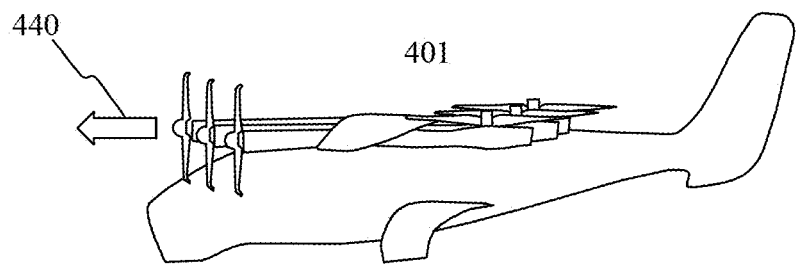
Figure 4D:
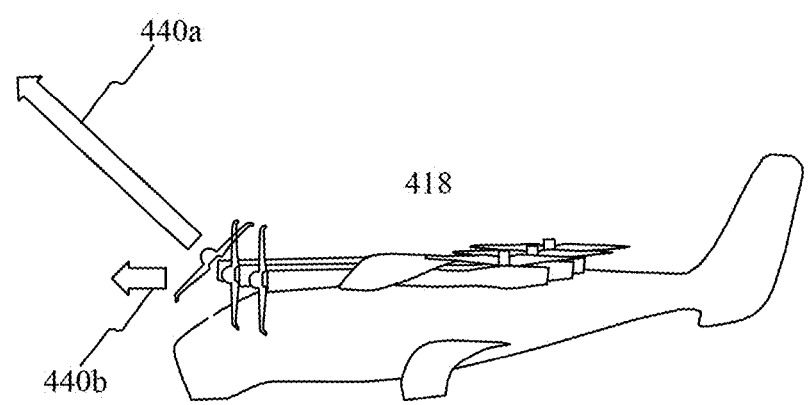
Figure 4D:
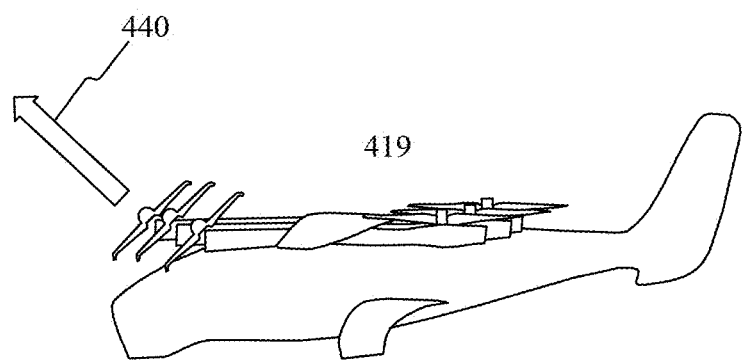

FIG. 4C illustrates a further set of ice management cycles 414-417, consistent with embodiments of the present disclosure. Rather than performing periodic modulations of relatively short duration, symmetric pairs of propellers may be placed into an extended ice shedding mode. For example, in some embodiments a first symmetric pair of propellers may be maintained at a high speed such that ice is continually prevented from forming, while a second symmetric pair may be shut down entirely. This may allow some symmetric pairs of propellers, such as propeller pairs 405 and 407 as seen at management cycle 414, to avoid ice accretion altogether by operating continuously at a level that prevents or reduces ice accretion. Meanwhile other propeller pairs, such as propeller pair 406 as seen at management cycle 414, can be shut down and disregarded. The same may be true for ice management cycle 415, in which propeller pairs 405 and 406 may be operated continuously at a level that prevents or reduces ice accretion while propeller pair 407 may be shut down. Alternatively, as shown in ice management cycle 417, propeller pairs 405 and 406 may be operated continuously at two different levels that prevent or reduce ice accretion while propeller pair 407 may be shut down.

In some embodiments, a single propeller pair may operate while others are shut down. For example, in ice management cycle 416, propeller pair 406 may be operated continuously while propeller pairs 405 and 407 are both shut down. In some embodiments, the propellers that are shut down in ice management cycles 414-417 may be periodically modulated according to the embodiments discussed above to prevent excessive ice accretion, and may shut down at other times. For example, when the propeller pair is a pair of lift propellers, the lift propellers may be shut down for extended periods when stowed in the cruise configuration. Therefore, in some embodiments a propeller modulation may comprise periodically spinning one or more lift propellers while in the cruise configuration and then returning them to the stationary stowed position. Similarly, when the propellers comprise tilt propellers that are shut down as discussed above, the propellers may be periodically modulated to prevent excessive or unbalanced ice accretion.

Ice management cycles 414-417 may concentrate RPM and engine heat generation in a small number of propellers, which may be advantageous when used in conjunction with other ice management techniques (such as transferring engine heat to ice-prone surfaces or generating electric heating from propeller motion, both of which are discussed below). Furthermore, while the drawings illustrate three pairs of tilt propellers three pairs of lift propellers, embodiments are not limited to this. Additionally, while some modulation parameters are tailored to specific propeller types, such as tilters, lifters, and variable pitch propellers, other parameters are general to many types. Therefore, ice management cycles according to embodiments of the present disclosure may be practiced using any suitable number or type of propellers in a distributed propulsion system, such as a VTOL or CTOL aircraft.

Similarly, as discussed above, one or more propeller modulation parameters may be used together for a combined ice management effect or for providing compensating modulations. FIG. 4D illustrates example ice management cycles 418 and 419 as compared to normal operation period 401 which have propellers positioned in a predominantly axial flow orientation. Arrows 440 in FIG. 4D may be representative of a relative magnitude of a modulation parameter such as, e.g., propeller speed. For example, ice mitigation cycle 418 may comprise tilting one or more tilt propellers to a desired tilt angle to induce edgewise airflow along the propeller blades. At the same time, as indicated by arrows 440a, RPM may be increased on the same one or more tilt propellers to perform multiple ice shedding cycles together as discussed above. Alternatively or additionally, other propeller modulation parameters may be simultaneously performed, such as, e.g., modulating blade pitch or propeller torque, etc. Also, one or more further tilt propellers may be modulated to compensate for these propeller modulations. For example a further one or more tilt propellers may have their RPM reduced as shown by shorter arrows 440b. Further, as shown at ice management cycle 419, all propellers may be modulated simultaneously using multiple propeller modulation parameters to mitigate ice while maintaining a desired trajectory. For example, as shown, all tilt propellers are tilted from their forward orientation as compared to normal operation period 401.

B. Example Embodiments for Managing Asymmetric Ice Accretion

Asymmetric ice accretions may arise in propellers that are in a fixed position during flight. For example, when lift propellers remain stationary during cruise flight, more ice accretion may form on a forward-facing blade than on an aft facing blade, resulting in asymmetric ice buildup. If asymmetric ice accretions are present on fixed position propellers and the propellers are then activated, the asymmetric ice accretions could create an adverse propeller imbalance and flight safety risk. Disclosed embodiments include ice management cycles in which fixed propellers, such as lift propellers, are periodically rotated so that ice accretions are evenly distributed and/or reduced (e.g., minimized).

Figure 5:
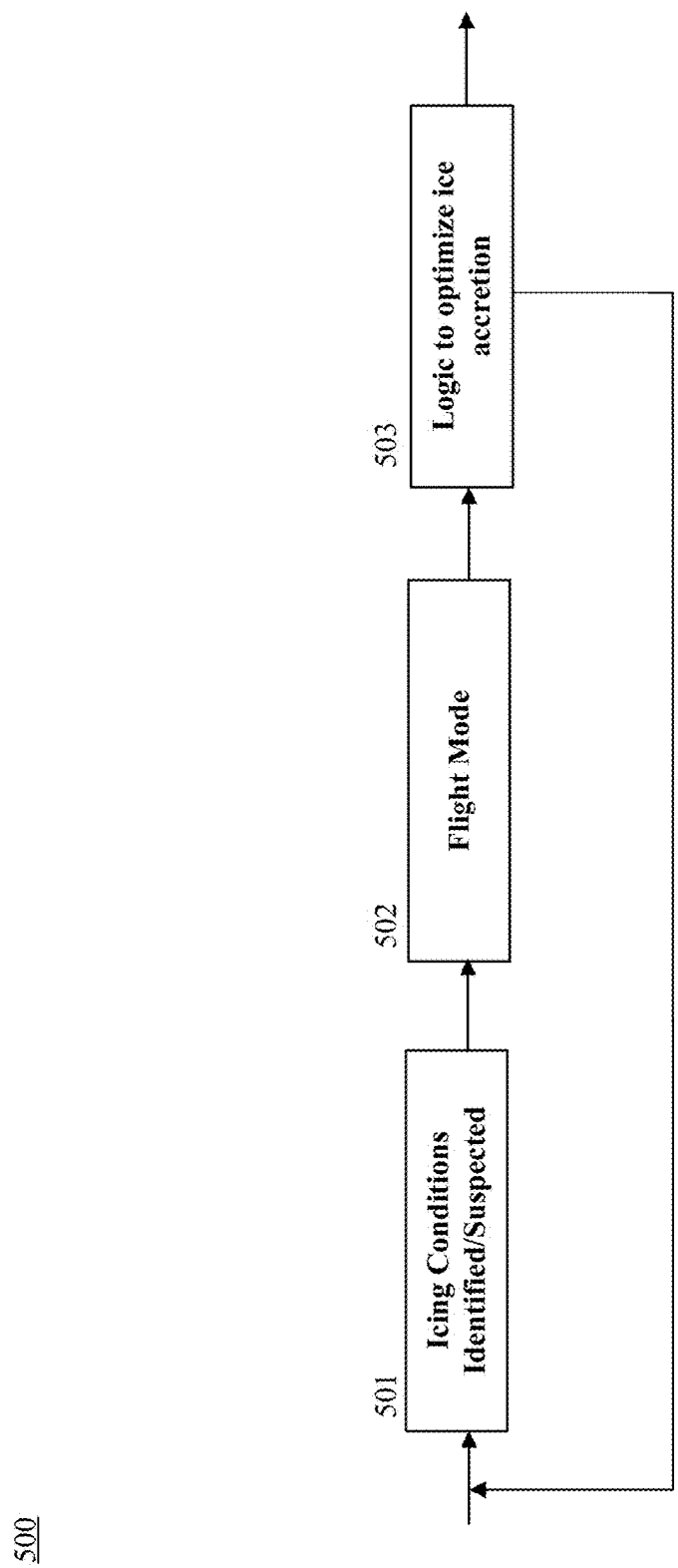
FIG. 5 illustrates an example system for managing asymmetric ice accretion, consistent with embodiments of the present disclosure.

FIG. 5 illustrates an example system for managing asymmetric ice accretion 500, consistent with embodiments of the present disclosure. Ice management system 500 may comprise part of, e.g., a distributed propulsion electric aircraft, such as VTOL aircraft 100 of FIGS. 1A and 1B. Ice management system 500 may be similar to ice management 200 of FIG. 2, but may apply to ice management of lift propellers. For example, ice management system 500 may comprise a portion of a flight control system (FCS) or related control architecture. In some embodiments, ice management system 500 may correspond to, form part of, or be integrated with ice management systems 200 and 300 of FIGS. 2-3. Ice management system 500 may comprise: an icing conditions identification module 501; a state estimator 502, and an ice shedding logic module 503. Icing conditions identification module 501 may comprise a primary ice detector or manual switch. The icing conditions identification module 501 may be configured to determine an icing condition based on an icing state input. State estimator 502 may be configured to determine an aircraft state.

Ice shedding logic module 503 may be configured to generate effector commands to induce a plurality of ice management cycles. The ice shedding logic module 503 may also send effector commands 307 to periodically rotate propellers. For example, for the two-bladed configuration illustrated in the figures, ice shedding logic module 503 may send an effector command 307 to rotate a propeller by approximately 180 degrees. In some embodiments, such as a three-bladed lift propeller, ice shedding logic module 503 may send an effector command 307 to rotate a propeller by approximately 60, 90 or 120 degrees. In general, lift propellers may be periodically rotated during stationary periods in cruise flight such that a different lift propeller blade is facing forward, for example is some embodiments by a multiple of 30 degrees for propellers having, e.g., 2, 3, 4, or 6 blades. By dividing the amount of forward-facing time substantially evenly between, e.g., each blade of a two-bladed lift propeller, a three-bladed lift propeller, etc., the asymmetry of ice accretion on the blades may be minimized. Alternatively, at least some propeller blades may be rotated slowly and continuously to evenly distribute ice accretions. For example, in some embodiments the propeller blades may be rotated between 6 and 120 RPM, or slower than other propeller blades.

Figure 6:
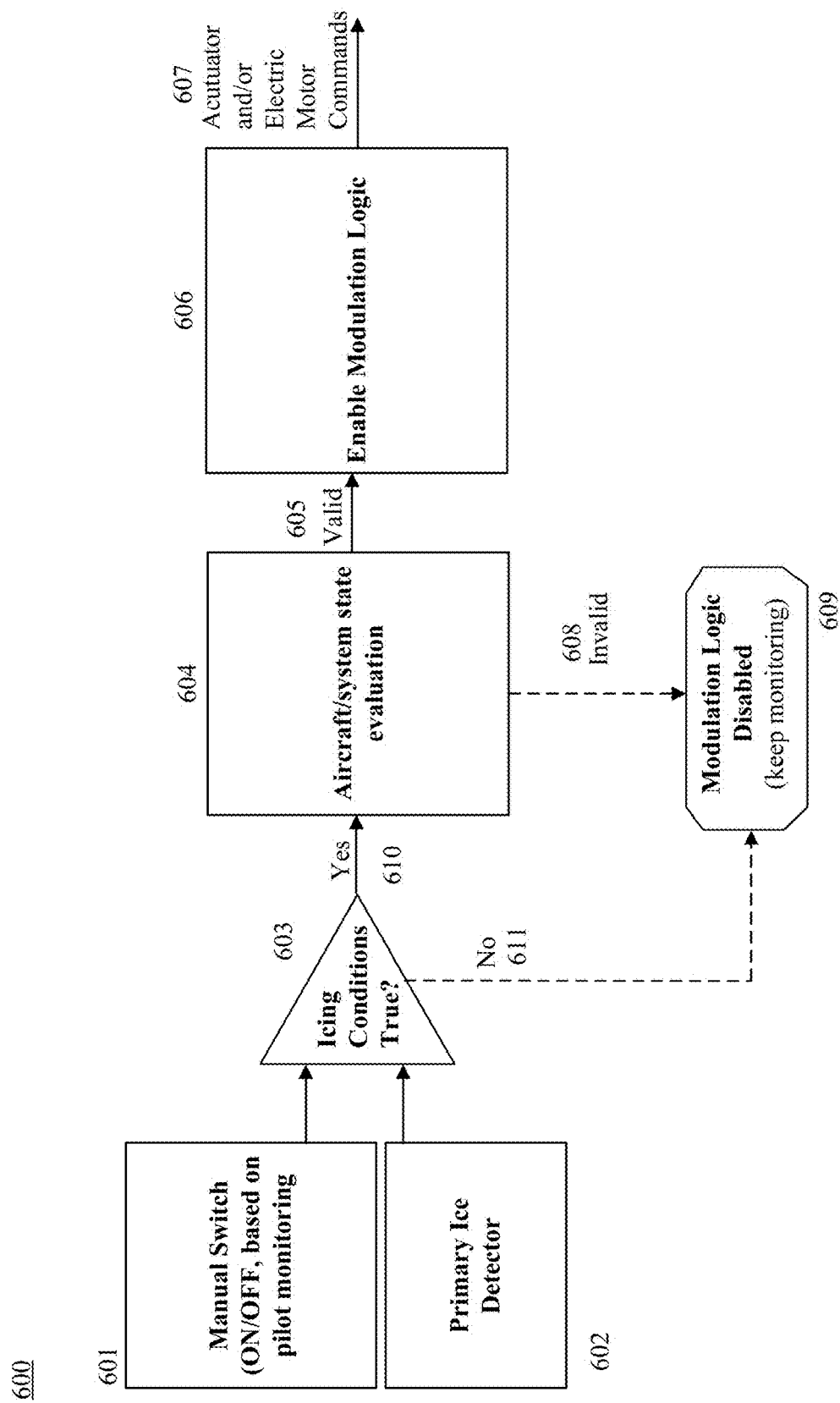
FIG. 6 illustrates an example system for managing asymmetric ice accretion, consistent with embodiments of the present disclosure.

FIG. 6 illustrates an example ice management system 600 for managing asymmetric ice accretion, consistent with disclosed embodiments. Ice management system 600 may comprise part of e.g., a distributed propulsion electric aircraft, such as VTOL aircraft 100 of FIGS. 1A-B. Ice management system 600 may be similar to ice management 300 of FIG. 3A, but may apply to ice management of lift propellers. Ice management system 600 may comprise a portion of a flight control system (FCS) or related control architecture. Ice management system may comprise: a manual switch module 601, a primary ice detector module 602, an icing conditions identification module 603 configured to output a valid icing condition 610 or an invalid icing condition 611, a state estimator 604, a valid aircraft state input 605 configured to output a valid aircraft state input 605 or an invalid aircraft state 608, an ice shedding logic module 606 configured to output effector commands 607, and a modulation logic disabled module 609.

Manual switch module 601 may comprise a manual ON/OFF switch. The manual switch may be activated by a pilot monitoring conditions. The manual switch module 601 may determine an icing state input for the icing state conditions identification module 603 based on the state of the manual switch.

The primary ice detector module 602 may comprise a primary ice detector, such as a magnetostrictive ice detector or an optical ice detector. The ice detector module 602 may determine an icing state input for the icing state conditions identification module 603.

The icing conditions identification module 603 may determine an icing condition based on an icing state input from the manual switch module 601 and primary ice detector module 602.

The state estimator 604 may be configured to input a valid icing condition 610 from the icing conditions identification module 603 and output a valid aircraft state input 605 to the enable modulation logic module 606.

The enable modulation logic module 606 may determine an appropriate propeller modulation parameter based on, e.g., information of the aircraft state or icing conditions, and generate a plurality of effector commands 607, corresponding to the propeller modulation parameter. The effector commands 607 may be sent to effectors of the aircraft, such as electric engines or control surfaces, for example via the flight control system. The effector commands 607 may include commands for inducing ice accretion management cycles and ice accretion management cycles with asymmetric ice accretion embodiments.

The modulation logic disabled module 609 may be configured to input an invalid icing condition 611, invalid aircraft state 608, or both an invalid icing condition 611 and invalid aircraft state 608. The modulation logic disabled module 609 continuously monitors the icing condition state and aircraft state.

Figure 7A:
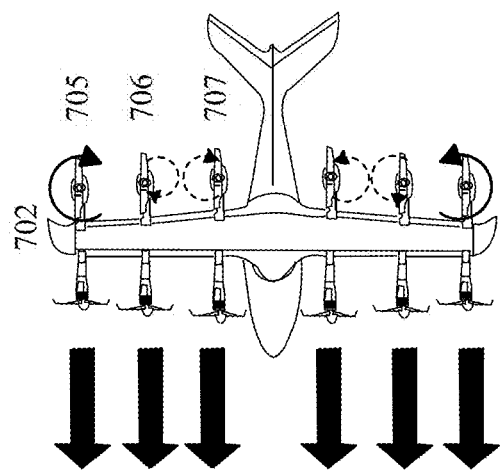
FIGS. 7A-7E illustrate example ice management cycles, consistent with embodiments of the present disclosure.
Figure 7A:
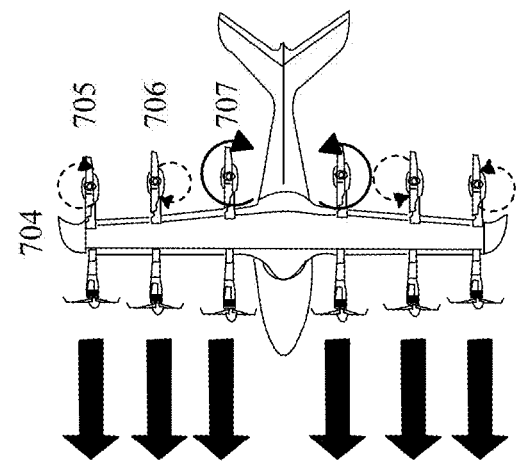
Figure 7A:
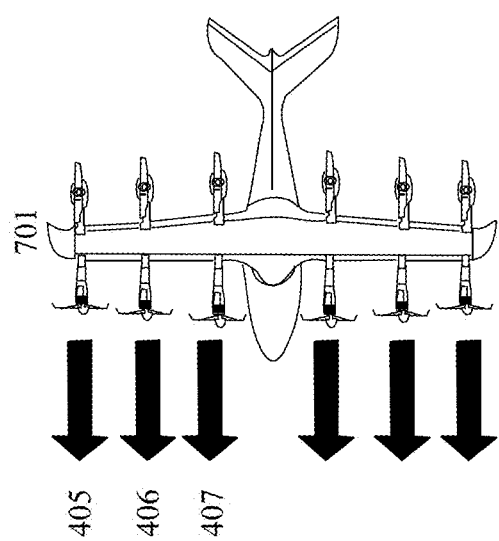
Figure 7A:
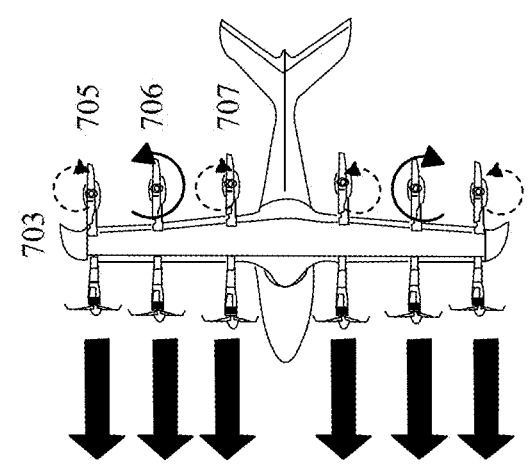
Figure 7B:
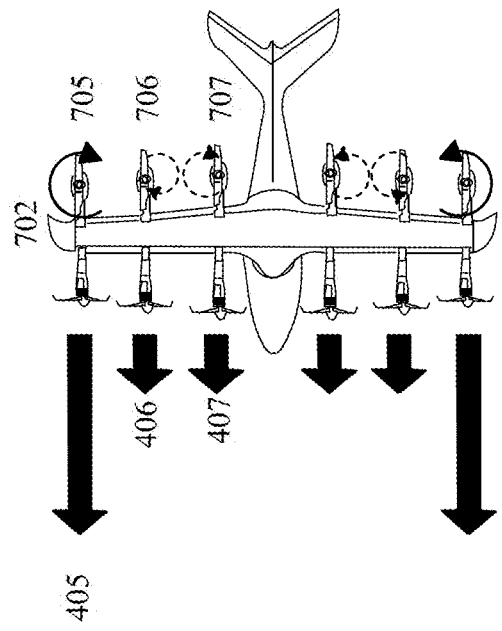
Figure 7B:
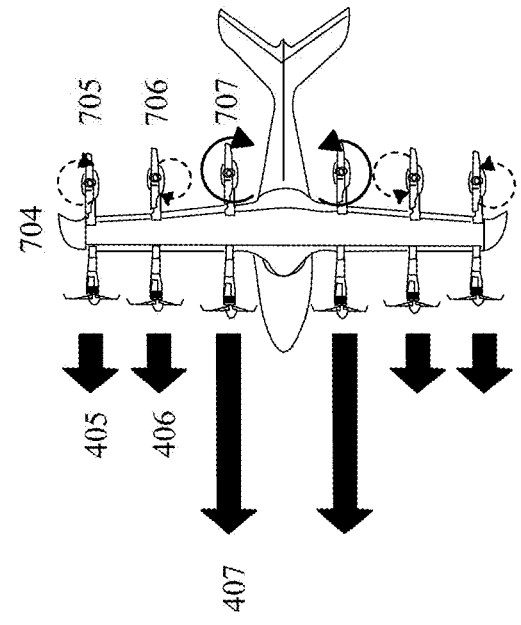
Figure 7B:
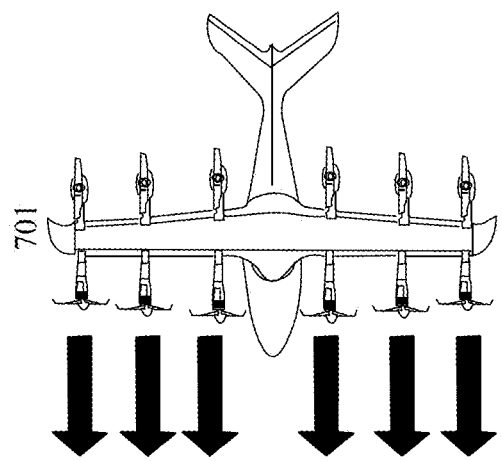
Figure 7B:
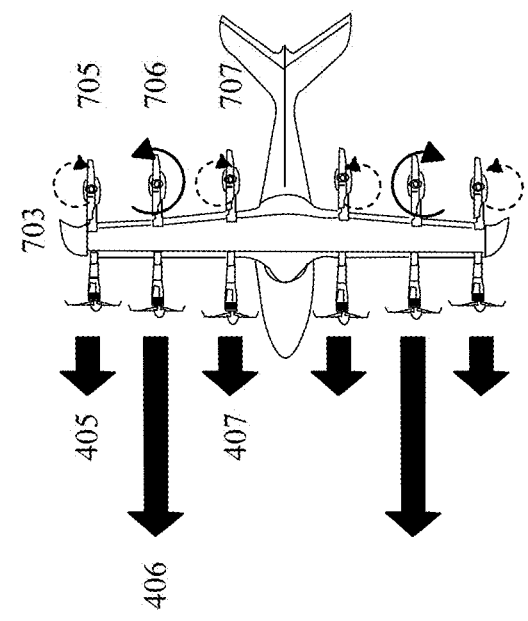
Figure 7C:
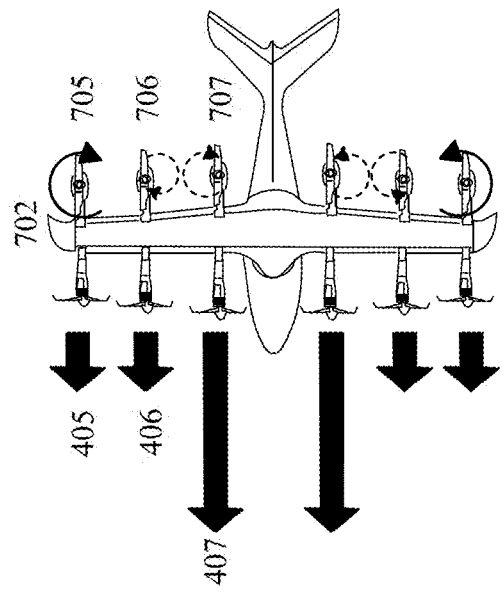
Figure 7C:
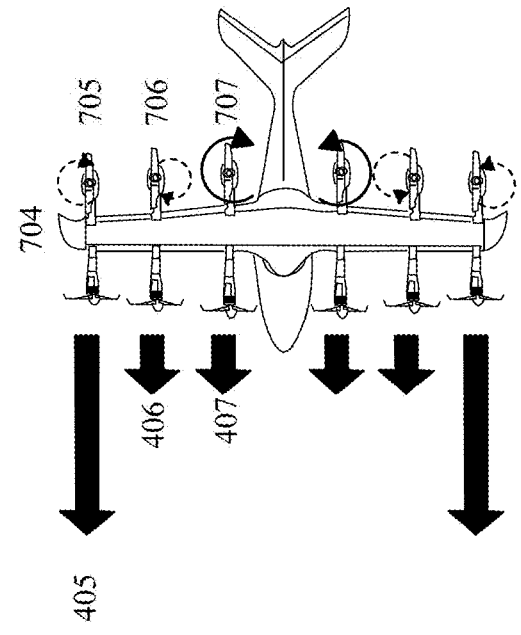
Figure 7C:
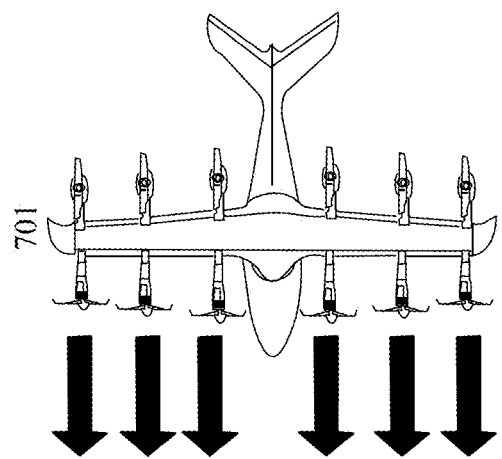
Figure 7C:
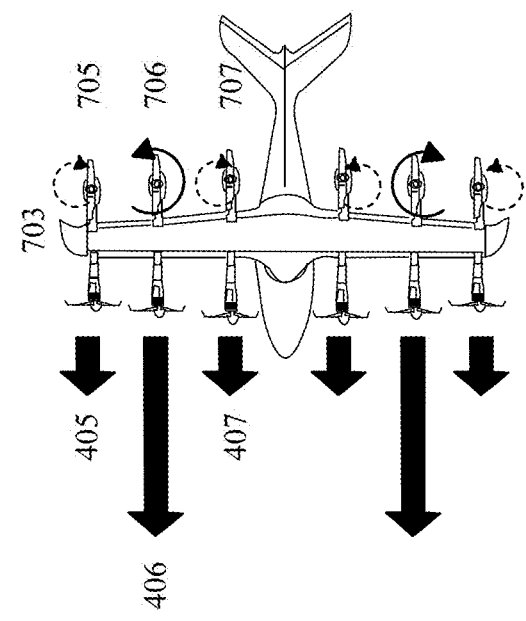
Figure 7D:
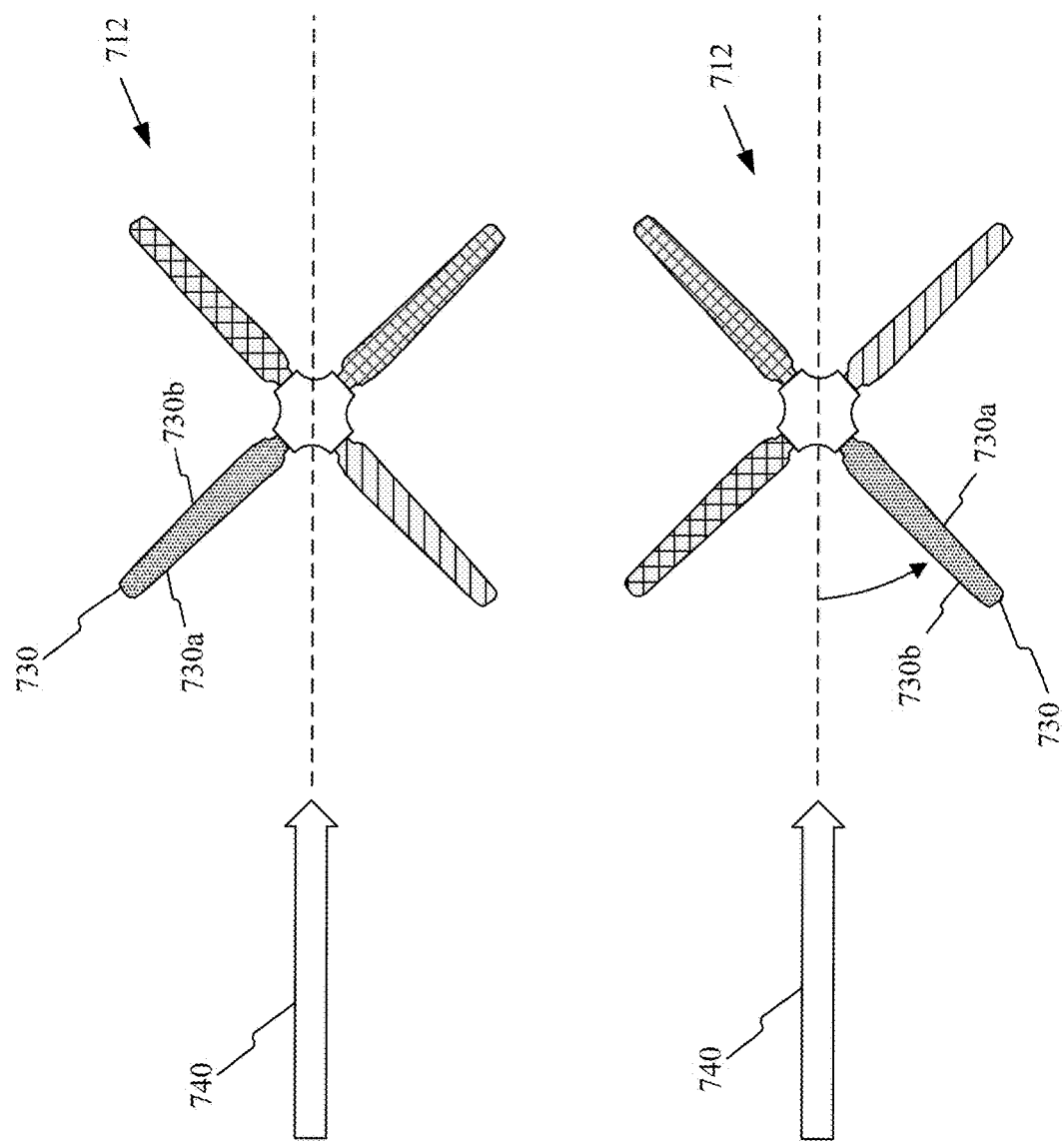
Figure 7E:
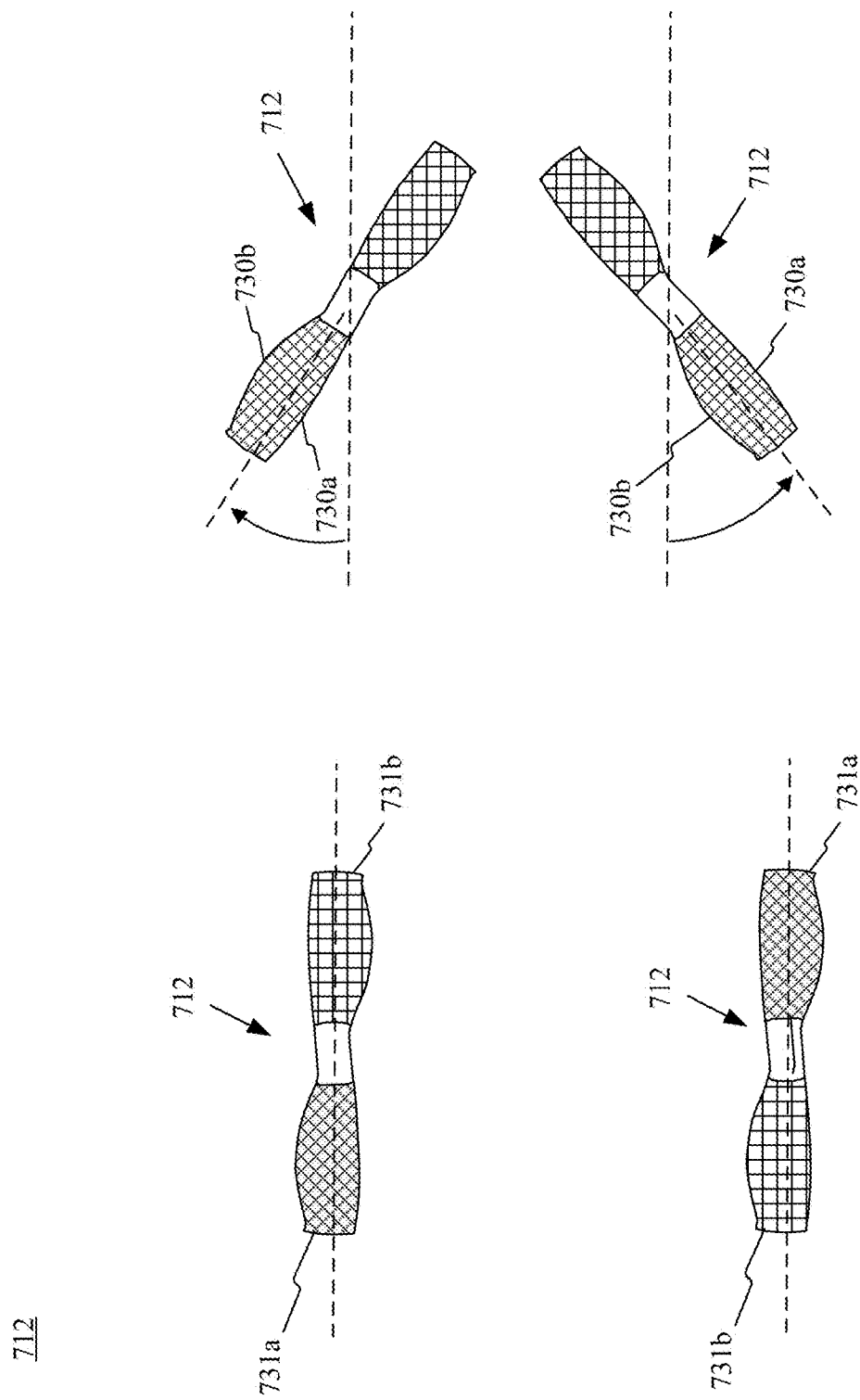

FIGS. 7A-7E illustrate example ice management cycles, such as first, second, and third lifter ice management cycles 702-704, as compared to a normal operation period 701, consistent with embodiments of the present disclosure. Unlike the modulation cycles of FIGS. 4A-4D, which may be performed on lift propellers as discussed above, lifter ice management cycles 702-704 may be designed to manage asymmetric ice accretion. Asymmetric ice accretion may occur on lift propellers during cruise flight while they remain fixed in a stowed position for extended periods, for example, due to one blade facing forward into the airflow while others are facing away or at an angle. Lifter ice management cycles 702-704 may be performed using, e.g., an ice management system 500 and 600 of FIGS. 5-6. Embodiments of FIG. 7A illustrate examples in which lift propeller modulation is performed while tilt propellers operate normally, while FIGS. 7B and 7C illustrate those same operations when performed concurrently with tilt propeller modulation. FIGS. 7D and 7E illustrate example lift propellers in various angular positions for, e.g., providing uniform ice accretion.

In some embodiments, the first lifter ice management cycle 702 may include rotating a first symmetric pair of outmost lift propellers 705 between a first angular position and a second angular position. For example, the first angular position may correspond to a first propeller blade on each pair pointing substantially toward a front of the aircraft, and the second angular position may correspond to a second propeller blade on each pair pointing substantially toward the front of the aircraft. The second propeller blade may be a next propeller blade in a rotational direction or there may be intervening blades. For example, the first angular position may be offset from the second angular position by integer multiples of, e.g., about 180, 60, 45, or 36 degrees for propellers having 2, 3, 4, or 5 blades respectively. Some examples are shown at FIGS. 7D and 7E for four-bladed and two-bladed configurations, respectively. However, in some embodiments, propellers may not have a uniform angular spacing between each pair of adjacent propeller blades. It should be understood that the angular spacings described above are merely examples, and that the chosen angular rotation may depend on, e.g., the spacing and curvatures of the propeller blades. Similarly to the first lifter ice management cycle 702, the second lifter ice management cycle 703 may include rotating a second symmetric pair of middle lift propellers 706 between the first angular position and the second angular position. The third lifter ice management cycle 704 may include rotating a third symmetric pair of innermost lift propellers 707 between the first angular position and the second angular position. In some embodiments, more than one symmetric pair of lift propellers may be rotated simultaneously.

In some embodiments, ice management may be performed using an oscillator coupled to a propeller at, e.g., a propeller shaft, hub, blade or other component. The oscillator may be configured to vibrate the lift propeller at a selected resonant frequency of the propeller blade. This may cause the propeller blade to vibrate strongly enough to break ice that has formed on it. While this may be an advantageous way to deal with stationary propellers such as lifters, it should be understood that oscillators could be applied to tilters in some embodiments.

As illustrated in FIG. 7A, symmetric pairs of tilt propellers 405-407 may continue to operate normally, similar to normal operation period 401 shown in FIG. 4A, while the lift propellers are rotated between different angular positions. However, in some embodiments, at the same time that the lift propellers are being modulated, the plurality of effector commands 607 may modulate the symmetric pairs of tilt propellers 405, 406, or 407 to manage ice or to offset a disturbance created by the modulation of the lift propellers. For example, as seen in FIG. 7B, the plurality of effector commands 607 may induce the first lifter ice management cycle 702 while concurrently performing, e.g., first ice management cycle 402 as discussed with respect to FIG. 4A. Similarly, second lifter ice management cycle 703 may be performed while concurrently performing, e.g., second ice management cycle 403 as discussed with respect to FIG. 4A. Further, third lifter ice management cycle 704 may be performed while concurrently performing, e.g., third ice management cycle 404 as discussed with respect to FIG. 4A. Performing these concurrent cycles allows modulation of a tilt propeller that is directly in front of a corresponding modulated lift propeller.

Alternatively, as shown in FIG. 7C, in some embodiments the tilt propeller modulation may be spatially offset from lifter modulation, such that a modulated tilt propeller is not always directly in front of the modulated lift propeller. For example, first lifter ice management cycle 702 may be performed while concurrently performing, e.g., third ice management cycle 404 as discussed with respect to FIG. 4A. Further, third lifter ice management cycle 704 may be performed while concurrently performing, e.g., first ice management cycle 402 as discussed with respect to FIG. 4A. Even so, the middle lift and tilt propellers 706 and 406 may still be modulated concurrently. For example, second lifter ice management cycle 703 may be performed while concurrently performing, e.g., second ice management cycle 403 in the same way discussed with respect to FIG. 7B above.

FIGS. 7D and 7E illustrate example configurations and angular positions for ice management on a lift propeller 712, consistent with embodiments of the present disclosure. Lift propeller 712 may comprise a plurality of propeller blades 730. For example, as illustrated in FIG. 7D, lift propeller 712 may comprise four blades, while in FIG. 7E, lift propeller 712 may comprise two blades. As discussed above, other numbers of blades are possible, and the embodiments described herein are not limited to the illustrated configurations. Propeller 712 may be periodically rotated in continuous or alternating directions to expose various blade surfaces to the forward airflow at various angles of incidence. For example, propeller 712 may initially be stowed in a first angular position, wherein a leading edge 730a is exposed to forward airflow 740. In this position, the leading edge 730a will accumulate more ice than a trailing edge 730b. Therefore, propeller 712 may be actuated to a second angular position (such as, e.g., approximately 90 degrees from the first angular position as discussed above), so that the trailing edge 730b is now exposed to the forward airflow 740. The process may be repeatedly performed so that all leading and trailing edges 703a and 730b accumulate similar amounts of ice, as discussed above. For example, for a four bladed lift propeller, the propeller may rotate such that rear-facing blades become forward facing blades. For example, the difference between a first angular position may be, e.g., approximately 180 degrees or 270 degrees. In some embodiments these angular positional movements may be accompanied by intermittent ice shedding operations such as spinning, vibrating, heating, etc. the blades 730 to remove ice.

As shown in FIG. 7E for, e.g., a two-bladed lift propeller 712, the difference between the first angular position and the second angular position may be, e.g., 180 degrees as discussed above. For example, propeller 712 may initially be stowed in a first angular position, wherein a first blade tip 731a is exposed to forward airflow. In this position, the first blade tip 731a will accumulate more ice than a second blade tip 731b. Therefore, propeller 712 may be actuated to a second angular position (such as, e.g., approximately 180 degrees from the first angular position as discussed above), so that the second blade tip 731b is now exposed to the forward airflow. Alternatively or additionally, as shown at the right of FIG. 7E, a two bladed propeller may be positioned at an angle with respect to the forward direction of motion so that a leading edge 730a or a trailing edge 730b may be exposed to the forward airflow.

Figure 8A:
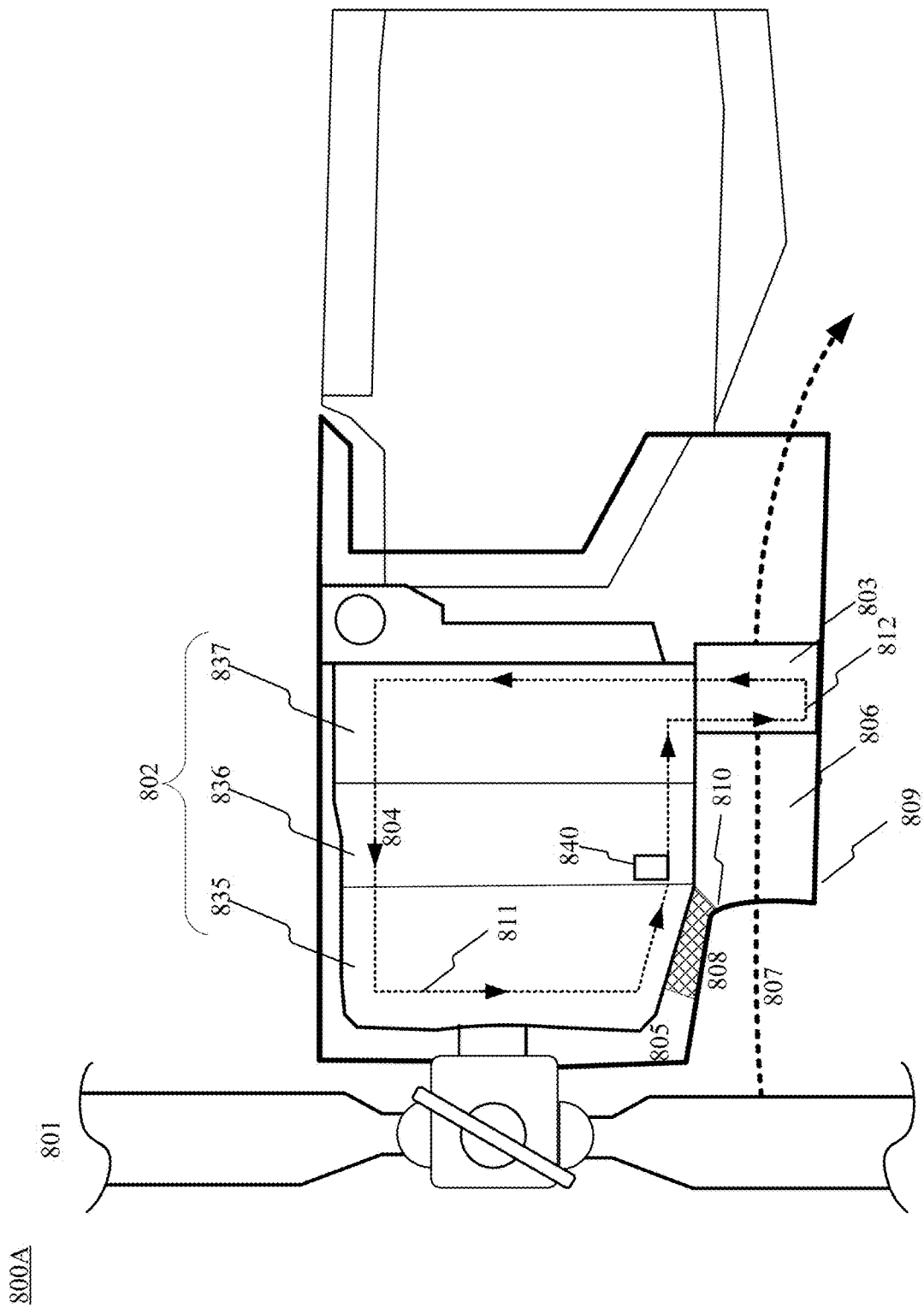
FIGS. 8A-8C illustrate example systems for managing ice accretion on a surface of an electric aircraft, consistent with embodiments of the present disclosure.
Figure 8B:
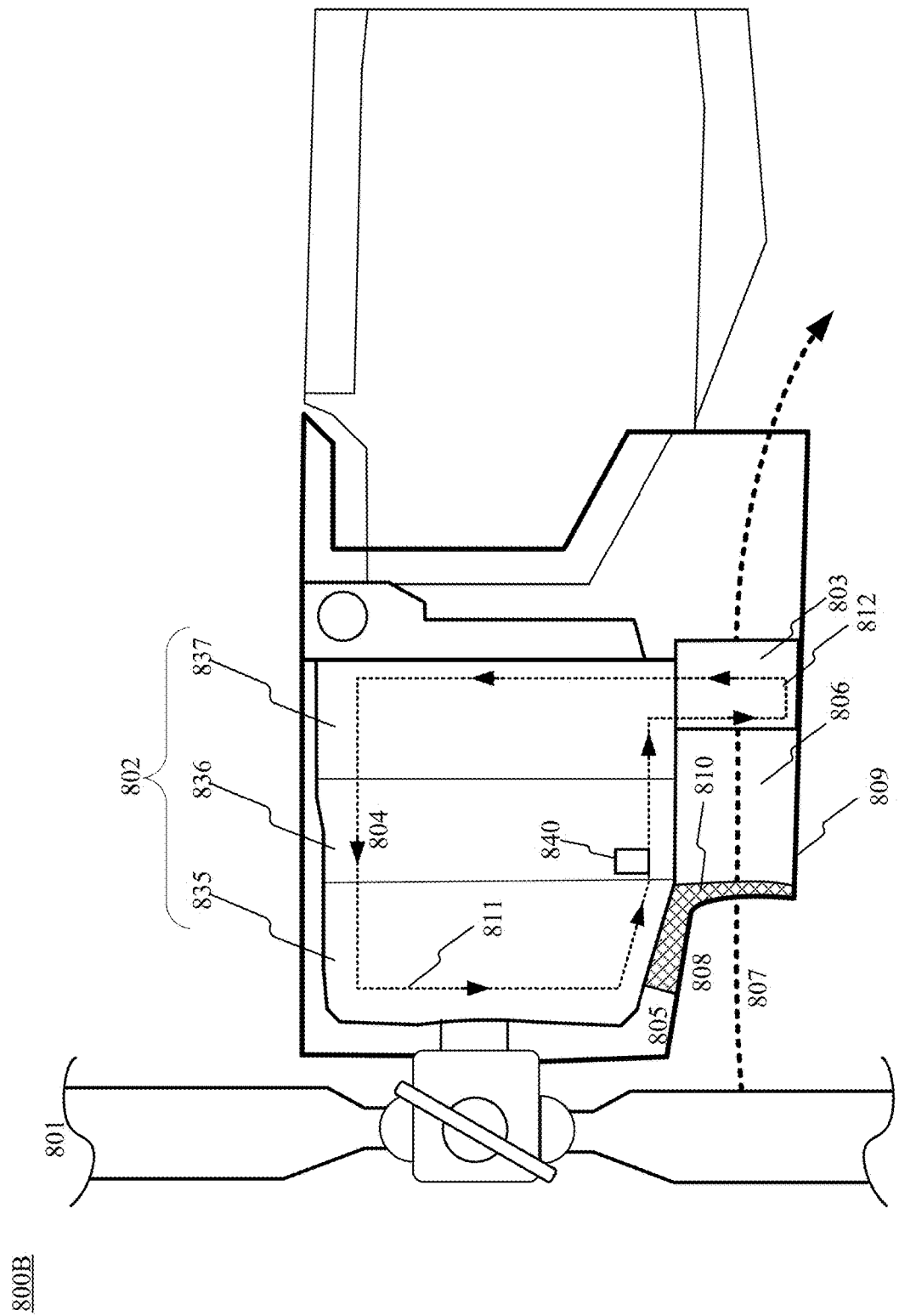
Figure 8C:
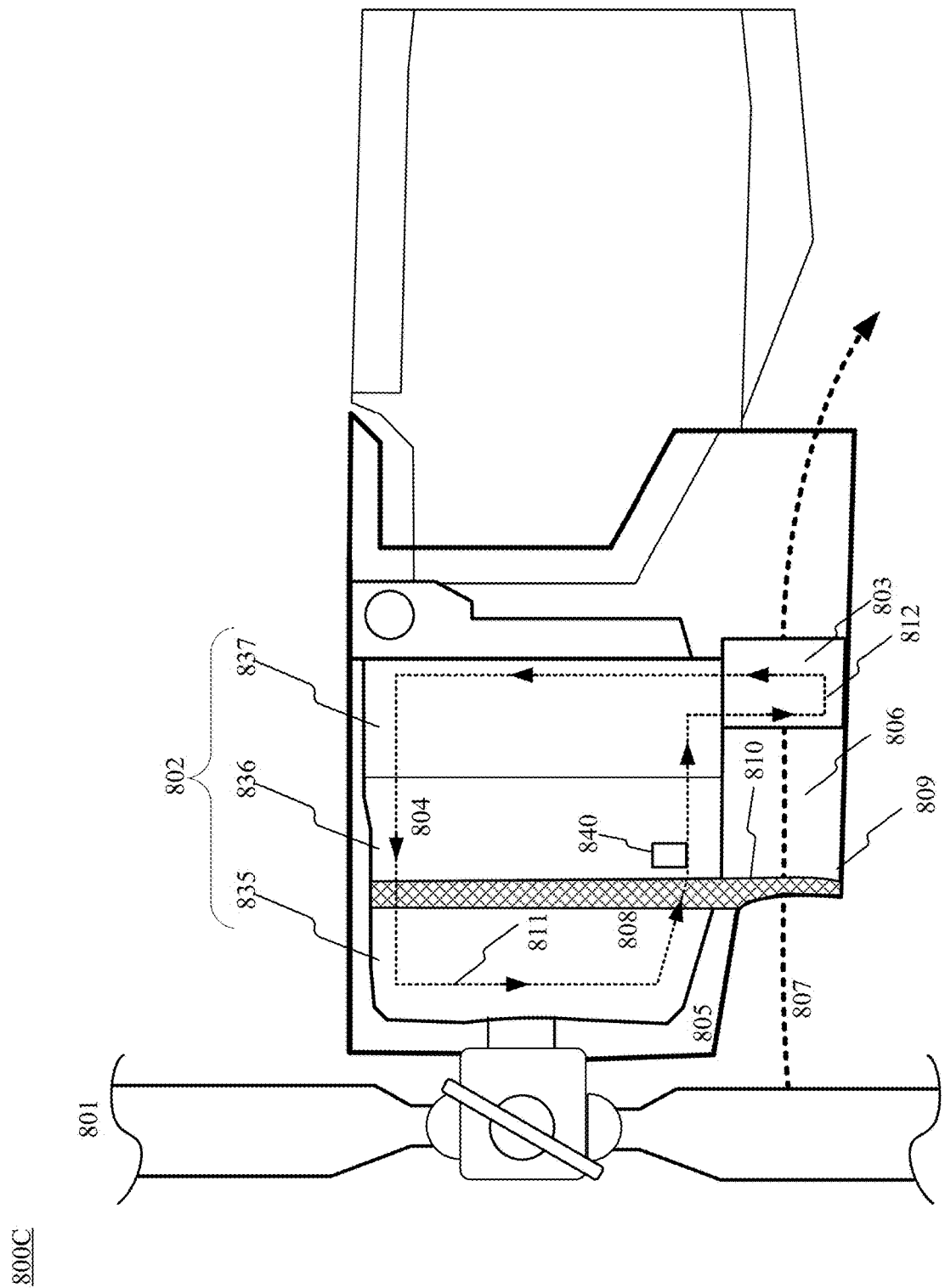

C. Example Embodiments for Managing Ice Accretion on Air Inlets and Other Surfaces FIGS. 8A-8C illustrate example propeller systems 800A-800C configured to manage ice accretion on a surface of an electric aircraft consistent with disclosed embodiments. Propeller systems 800A-800C may comprise part of, e.g., an electric aircraft, such as VTOL aircraft 100 of FIGS. 1A and 1B. Propeller systems 800A-800C may comprise: a propeller 801, a motor assembly 802, a heat exchanger 803, an oil flow path 804 comprising first and second segments 811 and 812, pump 840, and a nacelle 805. Motor assembly 802 may comprise various subsystems such as, e.g., a motor 835, a gearbox 836, or an inverter 837. While components of the motor assembly are illustrated in a certain order, embodiments of the present disclosure are not limited to this. For example, in some embodiments, gearbox 836 may be located closer to propeller 801 than motor 835, or inverter 837 may be arranged at another location.

Disclosed embodiments include the motor assembly 802 coupled to the propeller 801. The oil flow path 804 may be configured to thermally couple the heat exchanger 803 to the motor assembly 802. The nacelle 805 may be mechanically coupled to the motor assembly 802, where the nacelle 805 may include an air inlet 806. In some embodiments, being mechanically coupled to the motor assembly may comprise being directly connected to the motor assembly. The oil flow path 804 may pass over, or be thermally coupled to, components within the subsystems of the motor assembly 802 to lubricate and/or cool the components. It should be understood that oil flow 804 is illustrated in a highly schematic fashion to show that, in some embodiments, the flow path 804 may reach, or be in thermal communication with, each subsystem of motor assembly 802. It should not be interpretated necessarily as a circumferential loop nor as a single continuous flow in series. For example, in some embodiments oil may be divided and distributed to various components to lubricate the components and collect heat from them, after which the oil may be collected at a sump (not shown, discussed below with respect to FIG. 15) and cycled though again by, e.g., a pump 840. For example, pump 840 may comprise, e.g., a gear-driven pump. For example, pump 840 may be coupled to gearbox 836 so that pump 840 is operated when motor assembly 802 is active. Alternatively, pump 840 may comprise an independent pump that may powered by, e.g., inverter 837. In some embodiments, oil may be forced to flow through oil flow path 804 without the use of a dedicated pump.

The oil flow path 804 may pass through heat exchanger 803 to thermally couple heat exchanger 803 to motor assembly 802. For example, Heat exchanger 803 may discharge the accumulated heat to an air flow 807 from the air inlet 806. The air inlet 806 may include a lower lip 809 with respect to a forward flight configuration. The lower lip 809 may be farther from the motor assembly 802 than the upper lip 810, where the upper lip 810 is opposite of the lower lip 809.

The oil flow path 804 may comprise a first segment 811 and a second segment 812. In some embodiments, oil flow path 804 may comprise a third segment (not shown in FIGS. 8A and 8B). The first segment 811 may pass through the motor assembly 802. The second segment 812 may pass through the heat exchanger 803. The third segment may pass along the lower lip 809. In some embodiments, the oil flow path 804 may bypass the upper lip 810.

Some embodiments may comprise a thermally conductive material 808 between the motor assembly 802 and the upper lip 810. The thermally conductive material 808 may be configured to conduct heat from the motor assembly 802 to the upper lip 810. Additionally, or alternatively, in some embodiments, the nacelle 805 may include a first material and the thermally conductive material 808 may comprise a second material different from the first material. The second material may have a higher coefficient of thermal conductivity than the first material. The second material with the higher coefficient of thermal conductivity may allow heat to be transferred from one location to another more rapidly or efficiently than the first material, while the first material of the nacelle may be desired for other features, such as cost, manufacturability, weight, or durability.

In some embodiments, as with the propeller system 800B shown in FIG. 8B, the thermally conductive material 808 may extend along two lateral sides of the air inlet 806 between the upper lip 810 and the lower lip 809 to conduct heat around air inlet 806. In some embodiments, the thermally conductive material may encircle the air inlet 806. Alternatively, as with the propeller system 800C shown in FIG. 8C, the thermally conductive material 808 may extend from inside the motor assembly 802 to outside the motor assembly 802 to better conduct heat that is generated inside the motor assembly. The thermally conductive material 808 extending from inside the motor assembly 802 to outside the motor assembly 802 may comprise, e.g., a plate extending from inside the motor assembly 802 to outside the motor assembly 802. The plate may be arranged between two modules of the motor assembly, such as between a motor and gearbox, or between a gearbox and inverter. Alternatively or additionally, thermally conductive material 808 may wrap around motor assembly 802.

FIGS. 9A-9H illustrate example propeller systems 900A-900H configured to manage ice accretion on a surface of an electric aircraft, consistent with disclosed embodiments. Propeller systems 900A-900H may comprise part of, e.g., an electric aircraft, such as VTOL aircraft 100 of FIGS. 1A and 1B. Propeller systems 900A-900H may comprise: a propeller 901, a motor assembly 902 comprising, e.g., a motor 935, gearbox 936, and inverter 937, a heat exchanger 903, an oil flow path 904 comprising first, second and third segments 911-913, pump 940, a nacelle 905, where the nacelle 905 may include an air inlet 906 comprising an upper lip 910 and a lower lip 909 and configured to direct airflow 907 into the heat exchanger 903, and one or more valves 914.

The lower lip 909 may be positioned opposite to, and lower than, upper lip 910 with respect to gravity when the propeller 901 is orientation in a forward flight configuration. The lower lip 909 may be located farther from the motor assembly 902 than the upper lip 910 along a radial direction R of propeller 901.

As indicated by the dashed line and arrows, the oil flow path 904 may circulate through various portions of motor assembly 902 and nacelle 905. For example, oil flow path 904 may include a first segment 911, second segment 912, and third segment 913. The first segment 911 may pass through the motor assembly 902. The second segment 912 may pass through the heat exchanger 903. The third segment 913 may pass along the lower lip 909. In some embodiments, the third segment 913 may run along a lower surface of the nacelle 905 with respect to a forward flight configuration. The third segment 913 may further branch out of the second segment 912 in an oil flow direction 904 and return to the second segment 912 in the oil flow direction 904. For example, in FIG. 9A, the oil flow direction 904 is in the direction the arrows point. In further embodiments, the first segment 911 may feed into the second segment 912 in the oil flow direction 904 and return from the second segment 912 in the oil flow direction 904.

In some embodiments, the third segment 913 may branch out from a relatively hot side of the oil flow path and return to a relatively cooler side of the oil flow path. For example, third segment 913 may branch out from second segment 912 near an inlet side of heat exchanger 903, and return near an outlet side of heat exchanger 903.

Propeller system 900A may further comprise a first flow control valve 914. The first flow control valve 914 may be configured to regulate an oil flow rate through the third segment 913. In some embodiments, the first flow control valve 914 may be configured to selectively shut of an oil flow to or from the third segment 913. In further embodiments, the Propeller system 900A may comprise a second flow control valve 915. The first flow control valve may be located at an inlet side of the third segment 913, and the second flow control valve 915 may be located at an outlet side of the third segment 913. In some embodiments, the flow control valves may be configured to selectively increase or decrease a flow rate through the third segment 913. For example, the flow may be turned on or off, or the flow rate may be adjusted up or down, based on determined icing conditions as discussed above, or based on a dedicated air inlet ice sensor. In some embodiments, the first or second flow control valves 914/915 may comprise a check valve or other unidirectional flow device configured to keep oil flowing in a desired direction. In general, any segment or junction between segments may comprise such flow control valves.

In addition to ice management, additional oil flow path segments such as third segment 913 may advantageously provide more cooling surfaces to discharge heat from the oil. This may reduce demands on a heat exchanger, thereby allowing for a reduction in size of the heat exchanger or an improvement in overall cooling efficiency. However, as noted above, it may also introduce greater complexity, conduits, oil volume and pump mass. Thus, as discussed above, in some embodiments it may be beneficial to limit additional oil flow path segments for targeting those surfaces that are most prone to ice accretion, and similarly, offer the best additional cooling surface area. For example, in some embodiments it may be advantageous to target a lower lip of an air inlet if ice buildup is more common there.

Figure 9A:
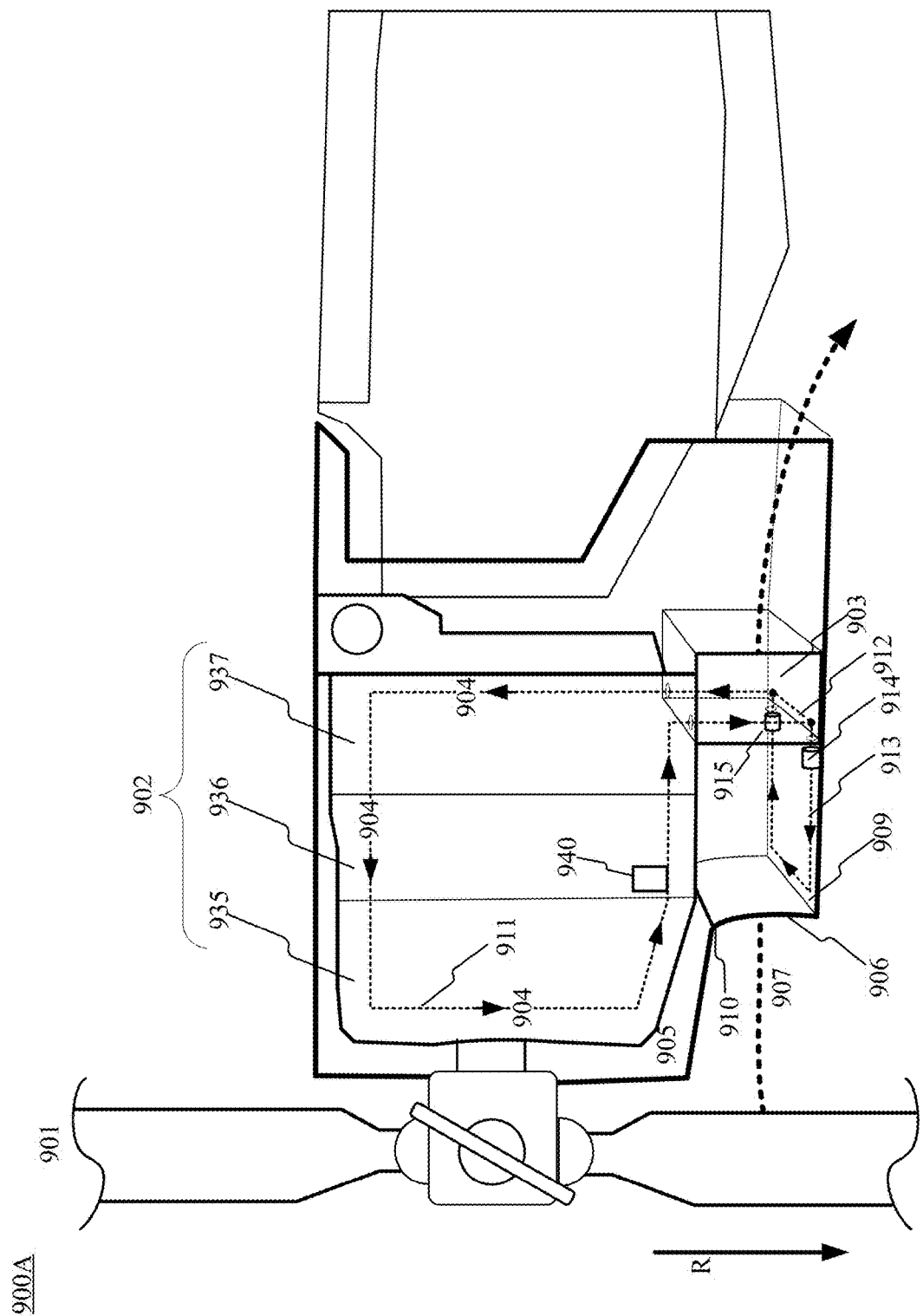
FIGS. 9A-9H illustrate example systems for managing ice accretion on a surface of an electric aircraft, consistent with embodiments of the present disclosure.

In FIG. 9A and other figures, third segment 913 may be illustrated as branching off between, e.g., a pump 940 and heat exchanger 903. However, embodiments of the present disclosure are not limited to this. For example, as discussed above with respect to FIG. 8A, there may be no pump 940, or it may not be coupled to gearbox 936, or may be located elsewhere. Furthermore, in some embodiments, a third segment may extend from, e.g., an outlet side of heat exchanger 903. In some embodiments, for example. A third segment may run in series from an outlet side of heat exchanger 903 to, e.g., inverter 937 or another part of the oil flow path 904.

Figure 9B:
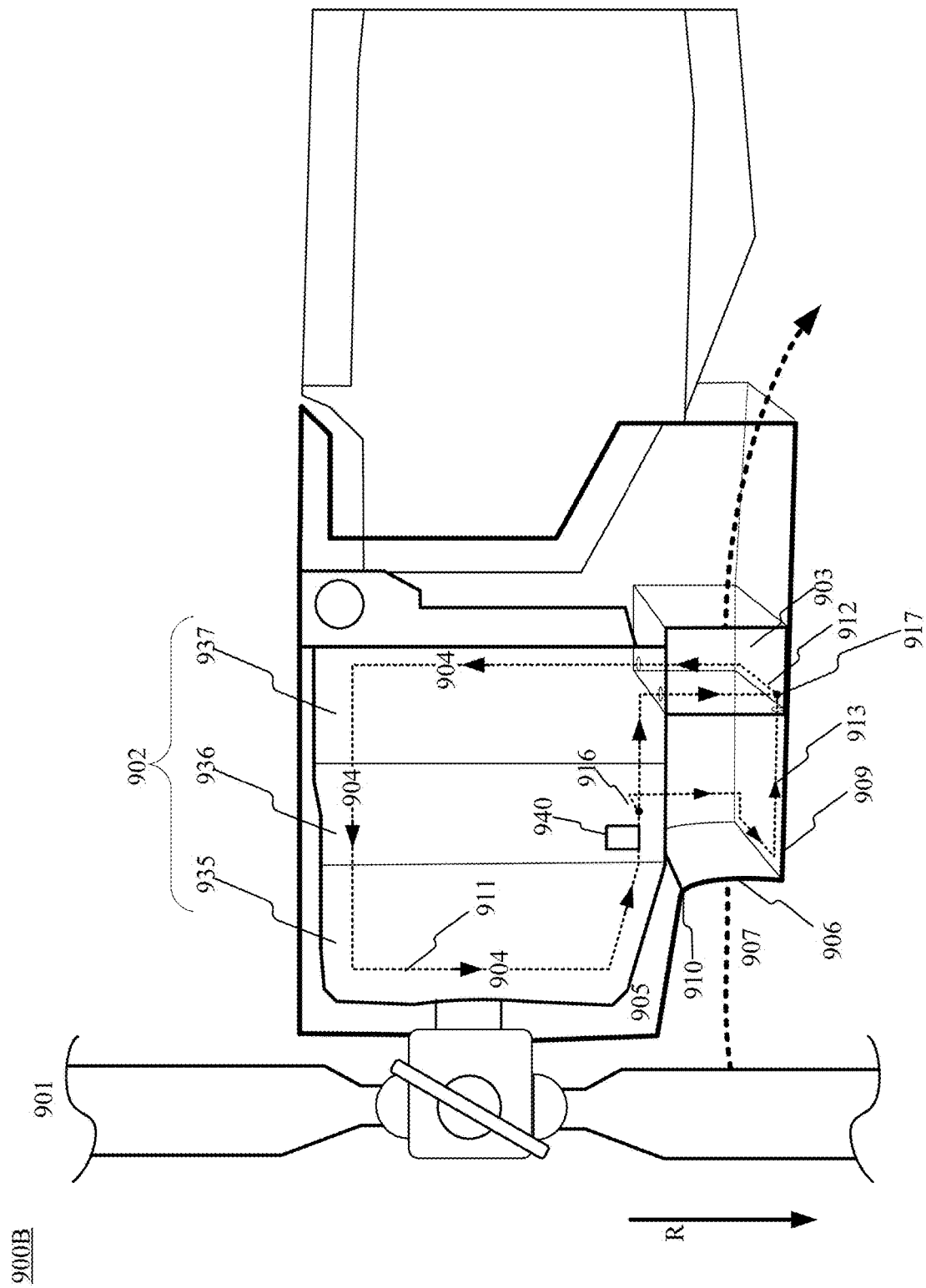

FIG. 9B illustrates an example propeller system 900B configured to manage ice accretion on a surface of an electric aircraft, consistent with disclosed embodiments. Propeller system 900B may comprise part of, e.g., an electric aircraft, such as VTOL aircraft 100 of FIGS. 1A and 1B. For example, Propeller system 900B may comprise components discussed above with respect to FIG. 9A, as well as further components discussed below.

The oil flow path 904 may include a first segment 911, second segment 912, and third segment 913. The first segment 911 may pass through the motor assembly 902. The second segment 912 may pass through the heat exchanger 903. The third segment 913 may pass along the lower lip 909. The third segment 913 may branch out of the first segment 911 in an oil flow 904 direction at a first segment exit point 916. In some embodiments, first segment exit point 916 may be arranged on an output side of pump 940. The third segment 913 may feed into the second segment 912 in the oil flow 904 direction. For example, as in FIG. 9B, the third segment 913 may feed into the second segment 912 in the direction of the arrows. In further embodiments, the third segment 913 may return to the first segment 911 in the oil flow 904 direction at a third segment exit point 917, the third segment exit point 917 being downstream in the oil flow 904 direction of the first segment exit point 916.

Figure 9C:
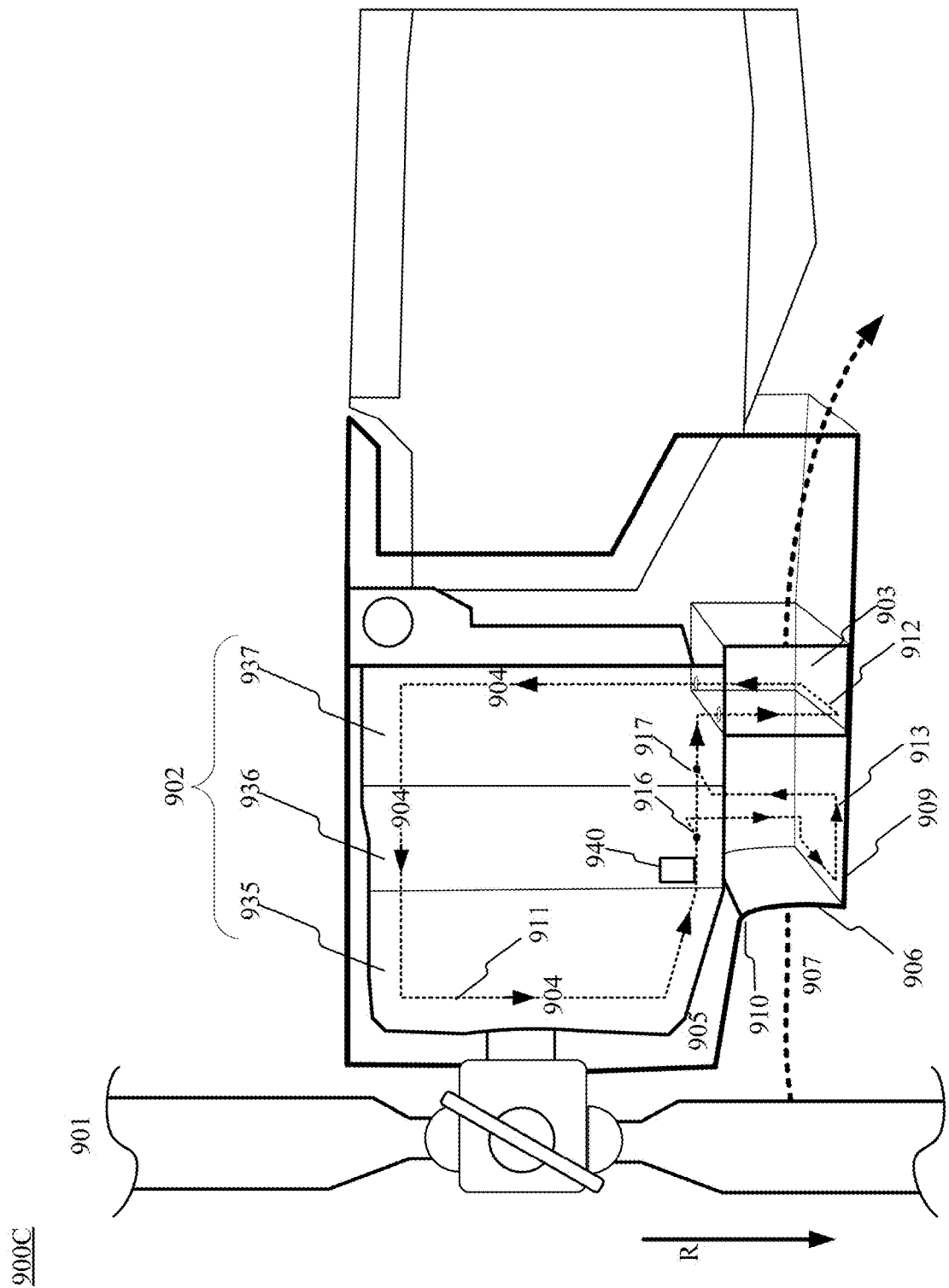

FIG. 9C illustrates an example propeller system 900C configured to manage ice accretion on a surface of an electric aircraft, consistent with disclosed embodiments. Propeller system 900C may comprise part of, e.g., an electric aircraft, such as VTOL aircraft 100 of FIGS. 1A and 1B. Propeller system 900C may comprise components discussed above with respect to FIGS. 9A-9B, as well as further components discussed below.

The oil flow path 904 may include a first segment 911, second segment 912, and third segment 913. The first segment 911 may pass through the motor assembly 902. The second segment 912 may pass through the heat exchanger 903. The third segment 913 may pass along the lower lip 909. The third segment 913 may branch out of the first segment 911 in an oil flow 904 direction at a first segment exit point 916. The third segment 913 may return to the first segment 911 in the oil flow 904 direction at a third segment exit point 917. The third segment exit point 917 may be downstream in the oil flow 904 direction of the first segment exit point 916. In some embodiments, third segment exit point 917 is upstream of the second segment 912 in the oil flow 904 direction.

Figure 9D:
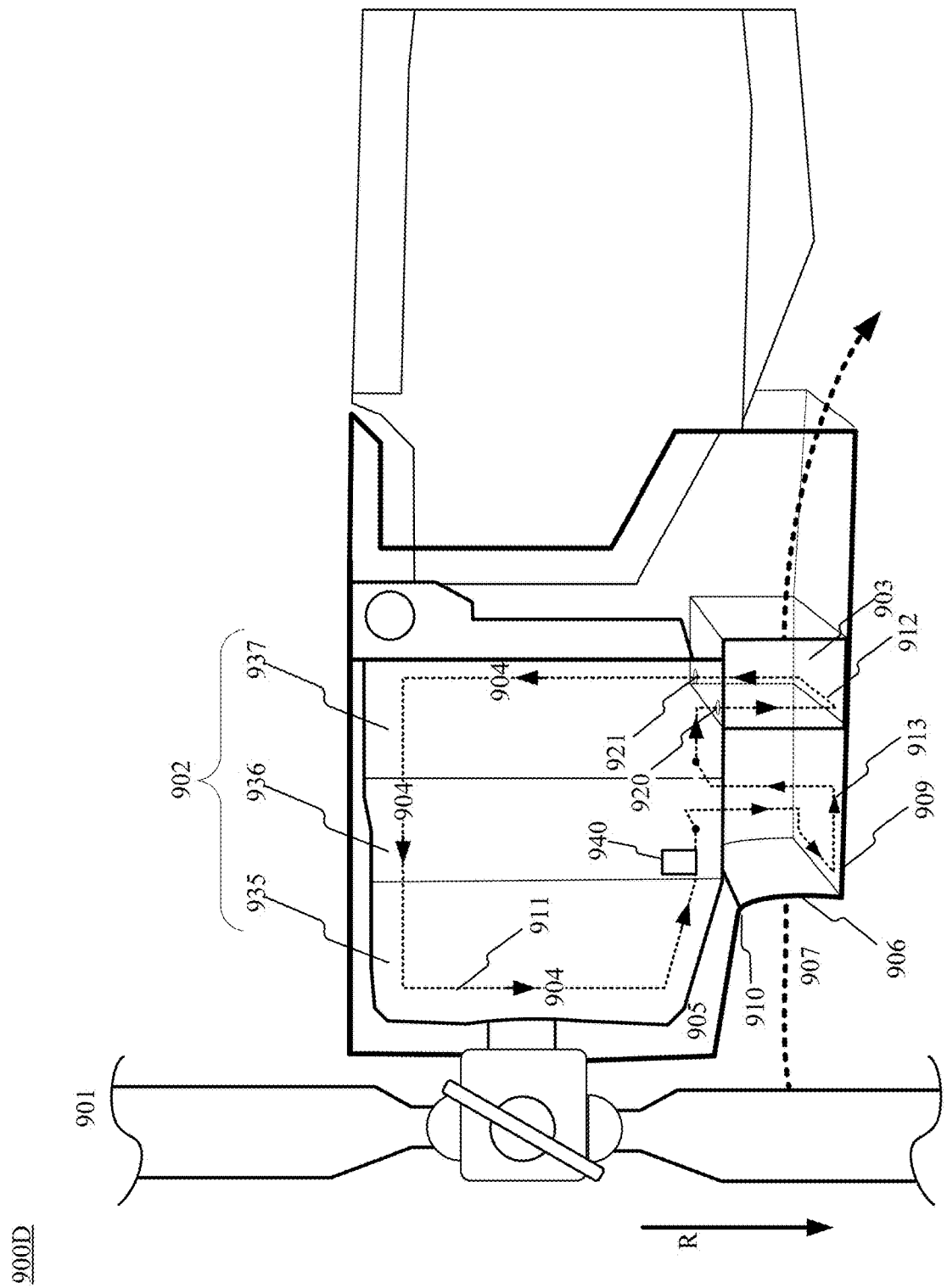

FIG. 9D illustrates an example propeller system 900D configured to manage ice accretion on a surface of an electric aircraft, consistent with disclosed embodiments. Propeller system 900D may comprise part of, e.g., an electric aircraft, such as VTOL aircraft 100 of FIGS. 1A and 1B. Propeller system 900D may comprise components discussed above with respect to FIGS. 9A-9C, as well as further components discussed below.

The oil flow path 904 may include a first segment 911, second segment 912, and third segment 913. The first segment 911 may pass through the motor assembly 902. The second segment 912 may pass through the heat exchanger 903. The third segment 913 may pass along the lower lip 909. In some embodiments, the third segment 913 may be connected in series within the first segment 911. Stated another way, in some embodiments, a first portion of the first segment 911 may feed into the third segment 913, and the third segment 913 may feed into a second portion of the first segment 911. An alternative series connection is shown at FIG. 9H, in which third segment 913 runs along the lower surface of air inlet 906 and nacelle 905 into heat exchanger inlet 920, through the heat exchanger, and to heat exchanger outlet 921.

Figure 9E:
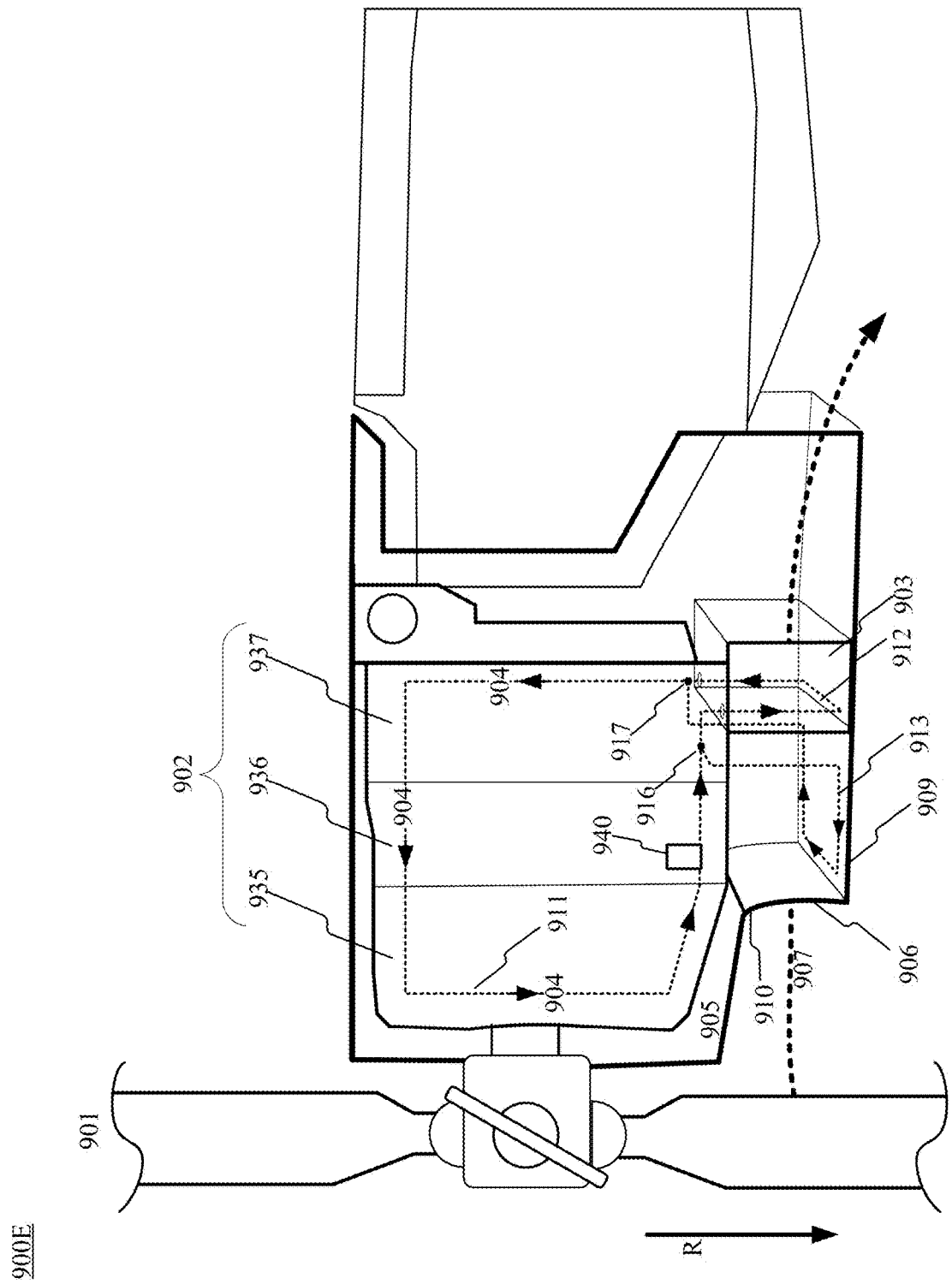

FIG. 9E illustrates an example propeller system 900E configured to manage ice accretion on a surface of an electric aircraft, consistent with disclosed embodiments. Propeller system 900E may comprise part of, e.g., an electric aircraft, such as VTOL aircraft 100 of FIGS. 1A and 1B. Propeller system 900E may comprise components discussed above with respect to FIGS. 9A-9D, as well as further components discussed below.

The oil flow path 904 may include a first segment 911, second segment 912, and third segment 913. The first segment 911 may pass through the motor assembly 902. The second segment 912 may pass through the heat exchanger 903. The third segment 913 may pass along the lower lip 909. In some embodiments, the third segment 913 may return to the first segment 911 in the oil flow 904 direction at a third segment exit point 917, which may coincide with, and alternatively be referred to as, a first segment entry point. The first segment entry point 917 may be downstream in the oil flow 904 direction of the first segment exit point 916. In some embodiments, first segment exit point 916 may be located near an inlet of heat exchanger 903. In some embodiments, first segment entry point 917 may be located near an outlet of heat exchanger 903. In some embodiments, the first segment entry point 917 may be upstream of the second segment 912 in the oil flow 904 direction. Additionally, in some embodiments, the first portion of the first segment 911 may feed into the third segment 913, and the third segment 913 may feed into a second portion of the first segment 911.

Figure 9F:
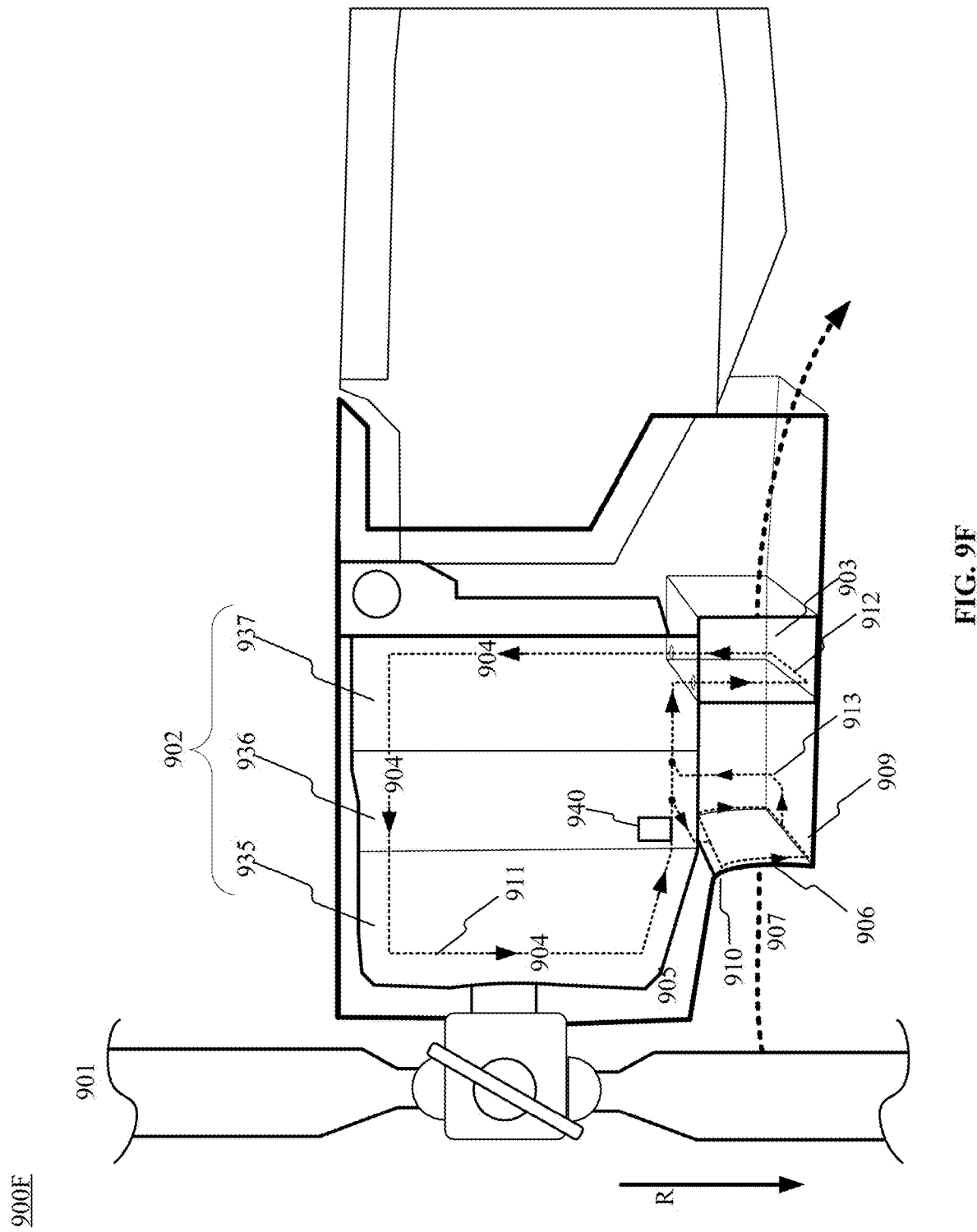

FIG. 9F illustrates an example propeller system 900F configured to manage ice accretion on a surface of an electric aircraft, consistent with disclosed embodiments. Propeller system 900F may comprise part of, e.g., an electric aircraft, such as VTOL aircraft 100 of FIGS. 1A and 1B. Propeller system 900F may comprise components discussed above with respect to FIGS. 9A-9E, as well as further components discussed below.

The oil flow path 904 may include a first segment 911, second segment 912, and third segment 913. The first segment 911 may pass through the motor assembly 902. The second segment 912 may pass through the heat exchanger 903. The third segment 913 may pass along the lower lip 909. In some embodiments, the third segment 913 may pass around substantially all of air inlet 906. For example, third segment 913 may divide into sub-segments at a first point of the air inlet 906, such as upper lip 910, and the sub-segments may merge at a second point of the air inlet 906, such as lower lip 909.

Figure 9G:
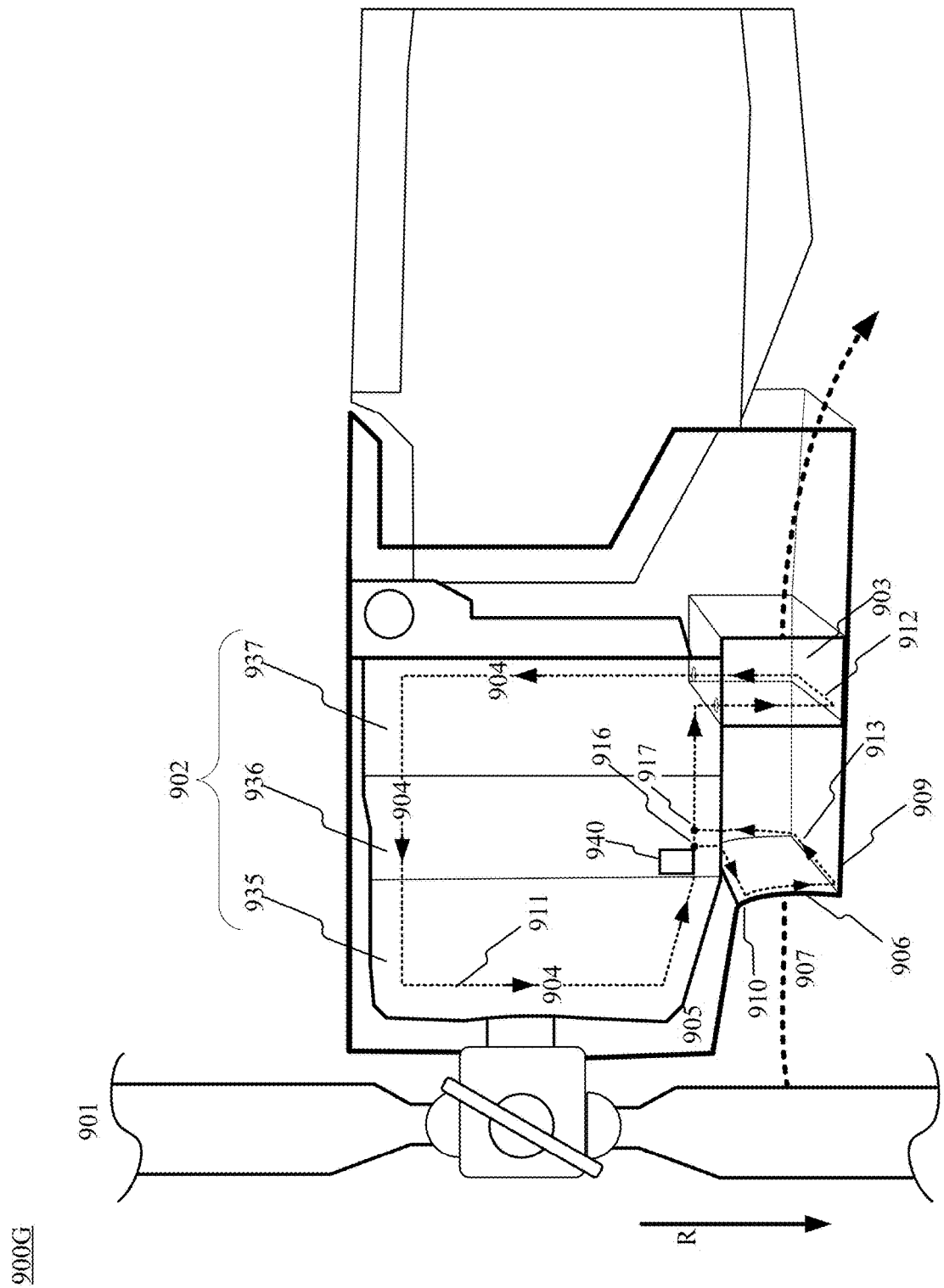
Figure 9H:
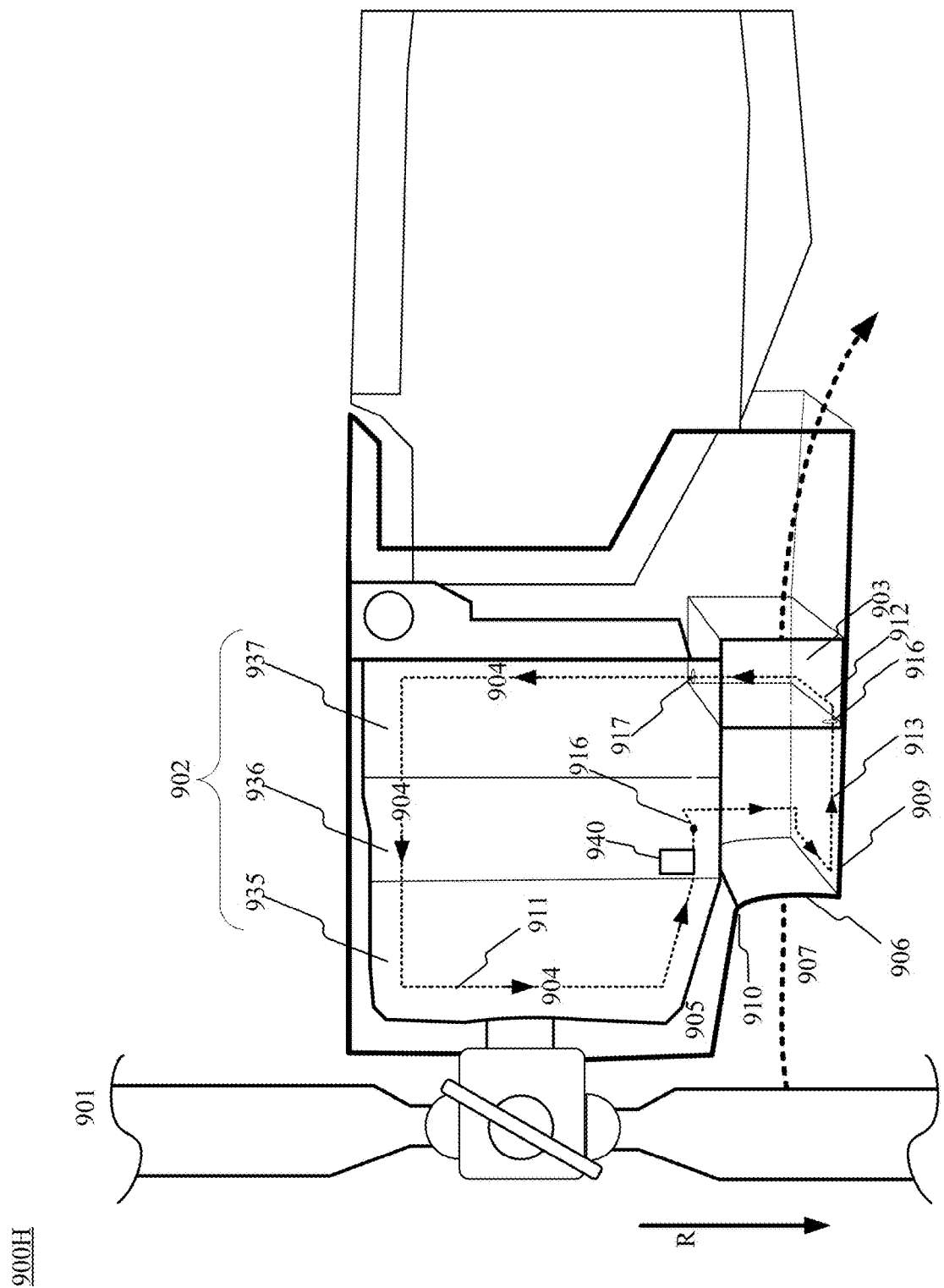

FIG. 9G illustrates an example propeller system 900G configured to manage ice accretion on a surface of an electric aircraft, consistent with disclosed embodiments. Propeller system 900G may comprise part of, e.g., an electric aircraft, such as VTOL aircraft 100 of FIGS. 1A and 1B. Propeller system 900G may comprise components discussed above with respect to FIGS. 9A-9F, as well as further components discussed below.

The oil flow path 904 may include a first segment 911, second segment 912, and third segment 913. The first segment 911 may pass through the motor assembly 902. The second segment 912 may pass through the heat exchanger 903. The third segment 913 may pass along the lower lip 909. In some embodiments, the third segment 913 may pass around substantially all of air inlet 906 in a single circuit.

FIG. 9H illustrates an example propeller system 900H configured to manage ice accretion on a surface of an electric aircraft, consistent with disclosed embodiments. Propeller system 900H may comprise part of, e.g., an electric aircraft, such as VTOL aircraft 100 of FIGS. 1A and 1B. Propeller system 900E may comprise components discussed above with respect to FIGS. 9A-9G, as well as further components discussed below.

The oil flow path 904 may include a first segment 911, second segment 912, and third segment 913. The first segment 911 may pass through the motor assembly 902. The second segment 912 may pass through the heat exchanger 903. The third segment 913 may pass along the lower lip 909. In some embodiments as shown in FIG. 9H, the third segment 913 may run along the air inlet 906 in series from first segment 911 into second segment 912.

Figure 10A:
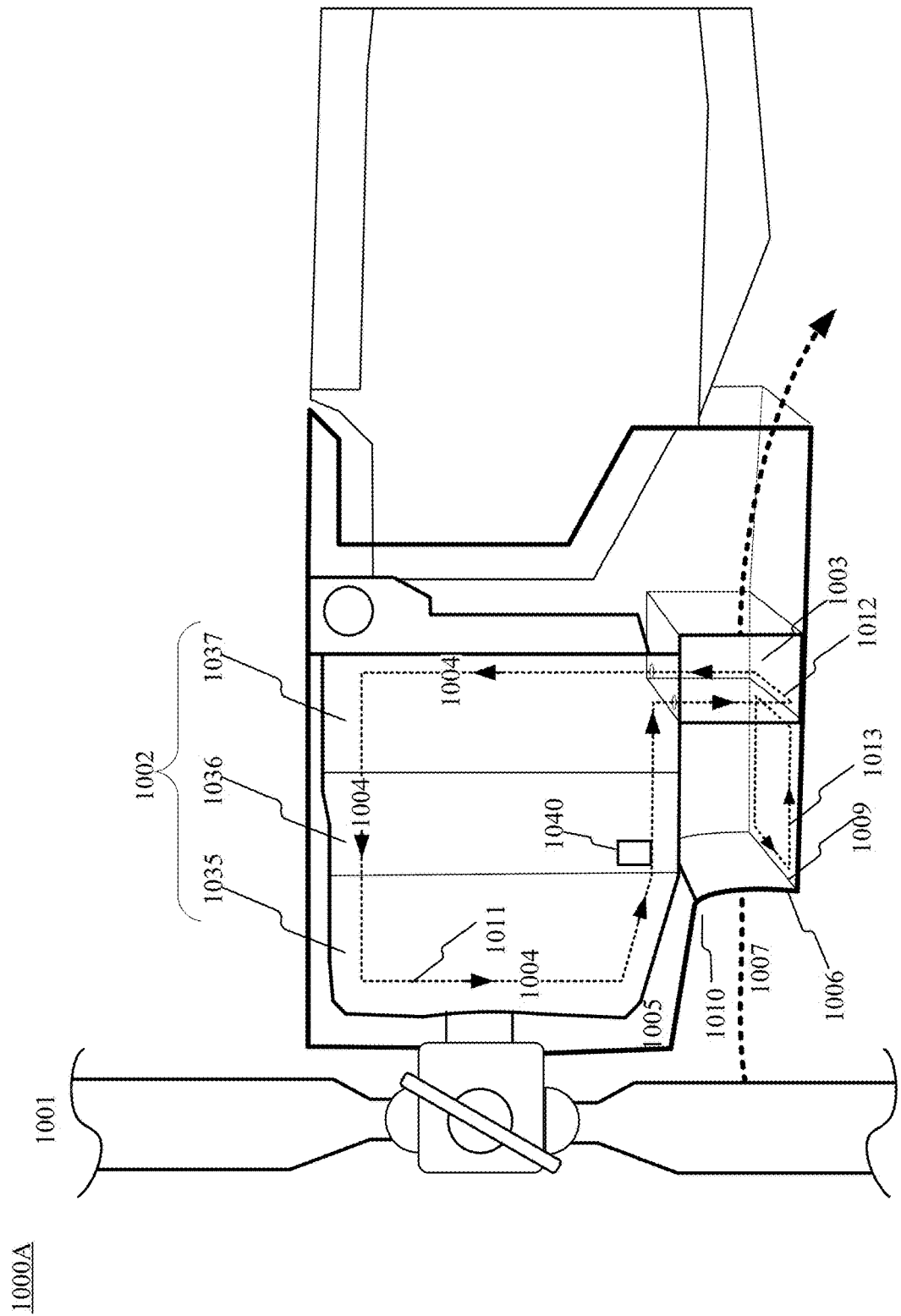
FIGS. 10A-10B illustrate example systems for managing ice accretion on a surface of an electric aircraft, consistent with embodiments of the present disclosure.
Figure 10B:
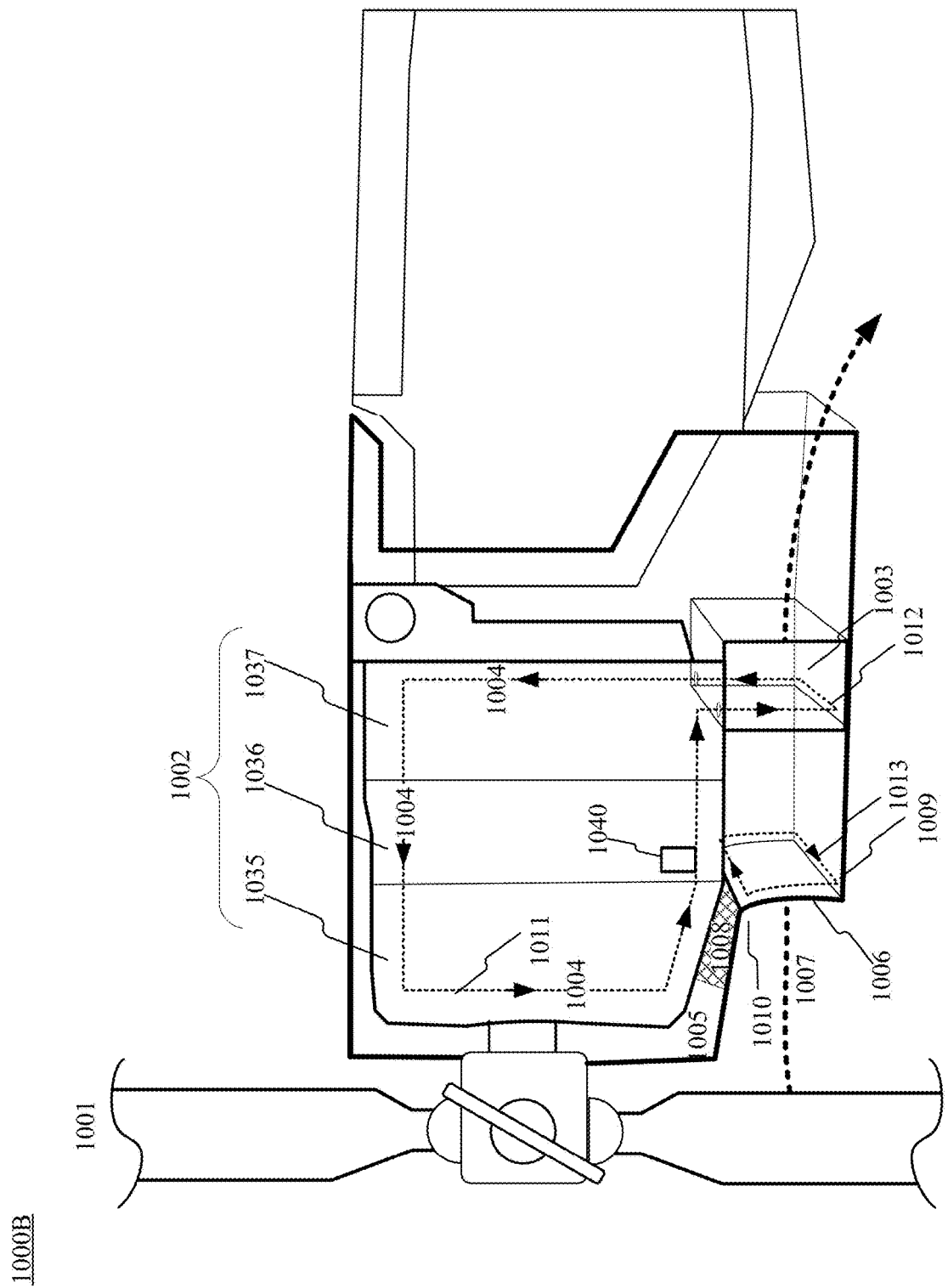

FIGS. 10A and 10B illustrate example propeller systems 1000A and 1000B, respectively, configured to manage ice accretion on a surface of an electric aircraft, consistent with disclosed embodiments. Propeller systems 1000A and 1000B may comprise part of, e.g., an electric aircraft, such as VTOL aircraft 100 of FIGS. 1A and 1B. Propeller systems 1000A and 1000B for managing ice accretion on a surface of an electric aircraft may comprise: a propeller 1001, a motor assembly 1002 comprising, e.g., a motor 1035, gearbox 1036, and inverter 1037, a heat exchanger 1003, an oil flow path 1004 comprising first and second segments 1011 and 1012, a pump 1040, a nacelle 1005, where the nacelle 1005 may include an air inlet 1006 comprising an upper lip 1010 and a lower lip 1009 and configured to direct airflow 1007 into the heat exchanger 1003, and a heat pipe circuit 1013.

Components of propeller systems 1000A and 1000B may be similar to components of propellers systems 900A-900H discussed above, with reference number leading with "10" instead of "9." For example, oil flow path 1004 of FIGS. 10A-10B may be similar to oil flow path 904 of FIGS. 9A-9H. Therefore, a description of some components may be omitted here. However, a notable difference in FIGS. 10A-10B is that the heating function previously performed by third segment 913 of oil flow path 904 may instead be performed by heat pipe circuit 1013.

For example, the oil flow path 1004 may be configured to thermally couple the heat exchanger 1003 to the motor assembly 1002. The oil flow path 1004 may include a first segment 1011 and a second segment 1012. Heat pipe circuit 1013 may comprise a heat pipe as a third segment that is independent of the oil flow path. For example, heat pipe circuit 1013 may be configured to circulate a phase change material. Use of a heat pipe may allow the air inlet to be heated without circulating oil to the inlet. This may reduce the total amount of oil contained in the aircraft, as well as reduce the risk of oil leakage.

The heat pipe circuit 1013 may be configured to collect heat from a heat source and discharge the heat to the lower lip 1009. The first segment 1011 of the oil flow path 1004 may pass through the motor assembly 1002 and the second segment 1012 may pass through the heat exchanger 1003. In some embodiments, as shown in FIG. 10A, the heat source may comprise heat exchanger 1003. For example, heat pipe circuit 1013 may be thermally coupled to heat exchanger 1003, such as by being placed in close thermal contact or by integrating heat pipe circuit into heat exchanger 1003. In some embodiments, as shown in FIG. 10B, the heat source may comprise the motor assembly 1002. In some embodiments, the heat source may comprise a thermally conductive material 1008 between the motor assembly 1002 and nacelle 1005.

Figure 11:
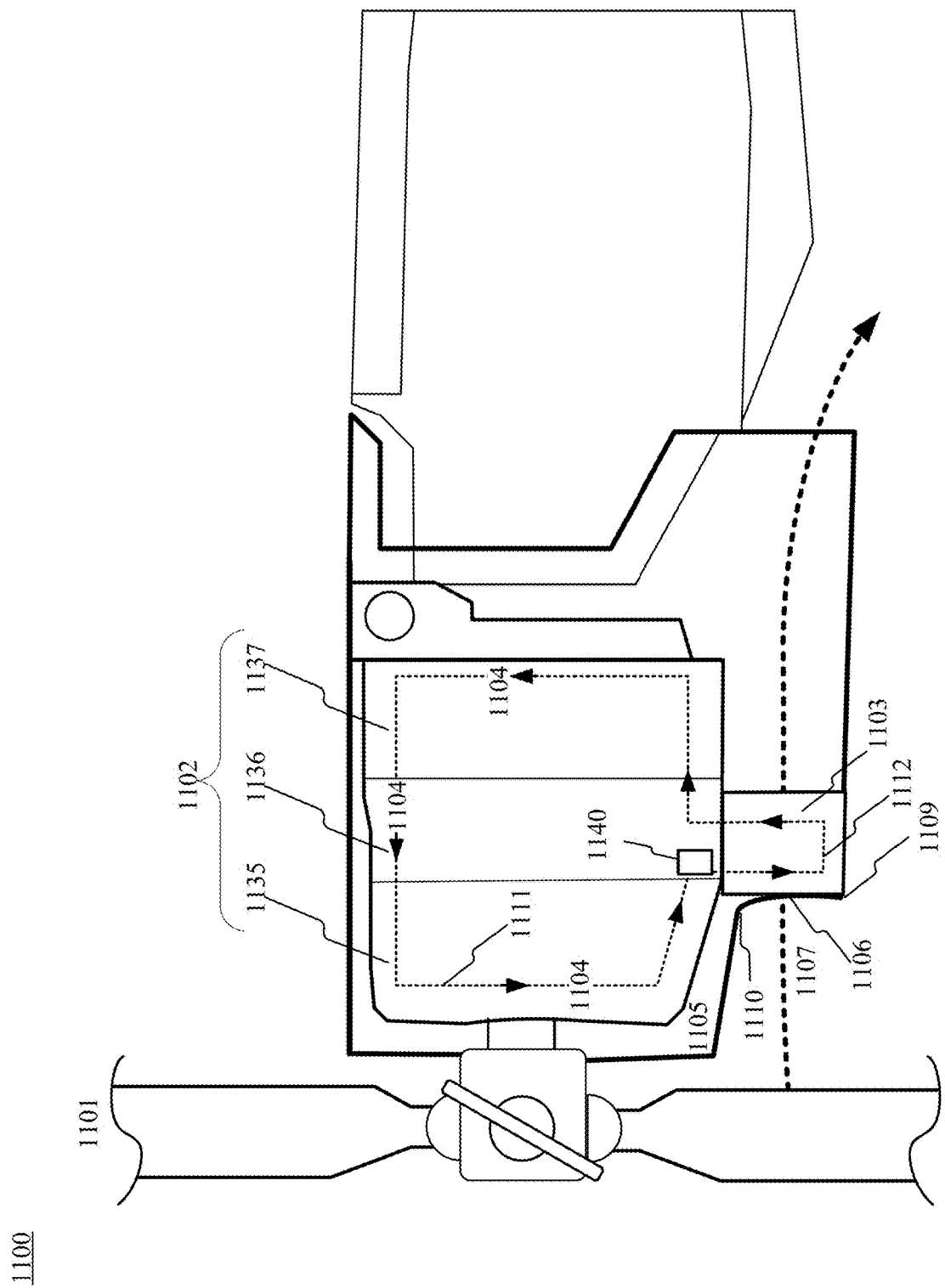
FIG. 11 illustrates an example system for managing ice accretion on a surface of an electric aircraft, consistent with embodiments of the present disclosure.

FIG. 11 illustrates an example propeller system 1100 configured to manage ice accretion on a surface of an electric aircraft, consistent with disclosed embodiments. Propeller system 1100 may comprise part of, e.g., an electric aircraft, such as VTOL aircraft 100 of FIGS. 1A and 1B. Propeller system 1100 may comprise: a propeller 1101, a motor assembly 1102 comprising, e.g., a motor 1135, gearbox 1136, and inverter 1137, a heat exchanger 1103, an oil flow path 1104 comprising first and second segments 1111 and 1112, a pump 1140, and a nacelle 1105 comprising an upper lip 1110 and a lower lip 1109 and configured to direct airflow 1107 into the heat exchanger 1103.

Components of propeller system 1100 may be similar to components of propellers systems 900A-900H 1000A, or 1000B discussed above, with reference numbers leading with "11" instead of "10" or "9." For example, oil flow path 1104 of FIG. 11 may be similar to oil flow path 1004 of FIGS. 10A-10B or oil flow path 904 of FIGS. 9A-9H. Therefore, a description of some components may be omitted here. In the embodiment of FIG. 11, a heat exchanger 1103 may be located at the mouth of inlet 1106, such as at upper lip 1110 or lower lip 1109, to thereby heat the upper or lower lip directly by thermal contact with heat exchanger 1103.

For example, the oil flow path 1104 may be configured to thermally couple the heat exchanger 1103 to the motor assembly 1102. The oil flow path 1104 may pass through the motor assembly 1102 and the heat exchanger 1103. The nacelle 1105 may comprise an air inlet 1106, where the heat exchanger 1103 is arranged at the air inlet 1106.

In FIG. 11, heat exchanger 1103 may be arranged at air inlet 1106 configured to passively prevent ice accretion without requiring additional oil flow segments. By arranging the heat exchanger 1103 directly at or near the inlet, icing may be prevented by thermal conduction between the heat exchanger 1103 and the air inlet 1106.

In some embodiments as discussed above, high accelerations of the propeller of the propeller may be used to remove icing. In some embodiments, propeller accelerations may further be used to determine that an icing condition exists.

Figure 12:
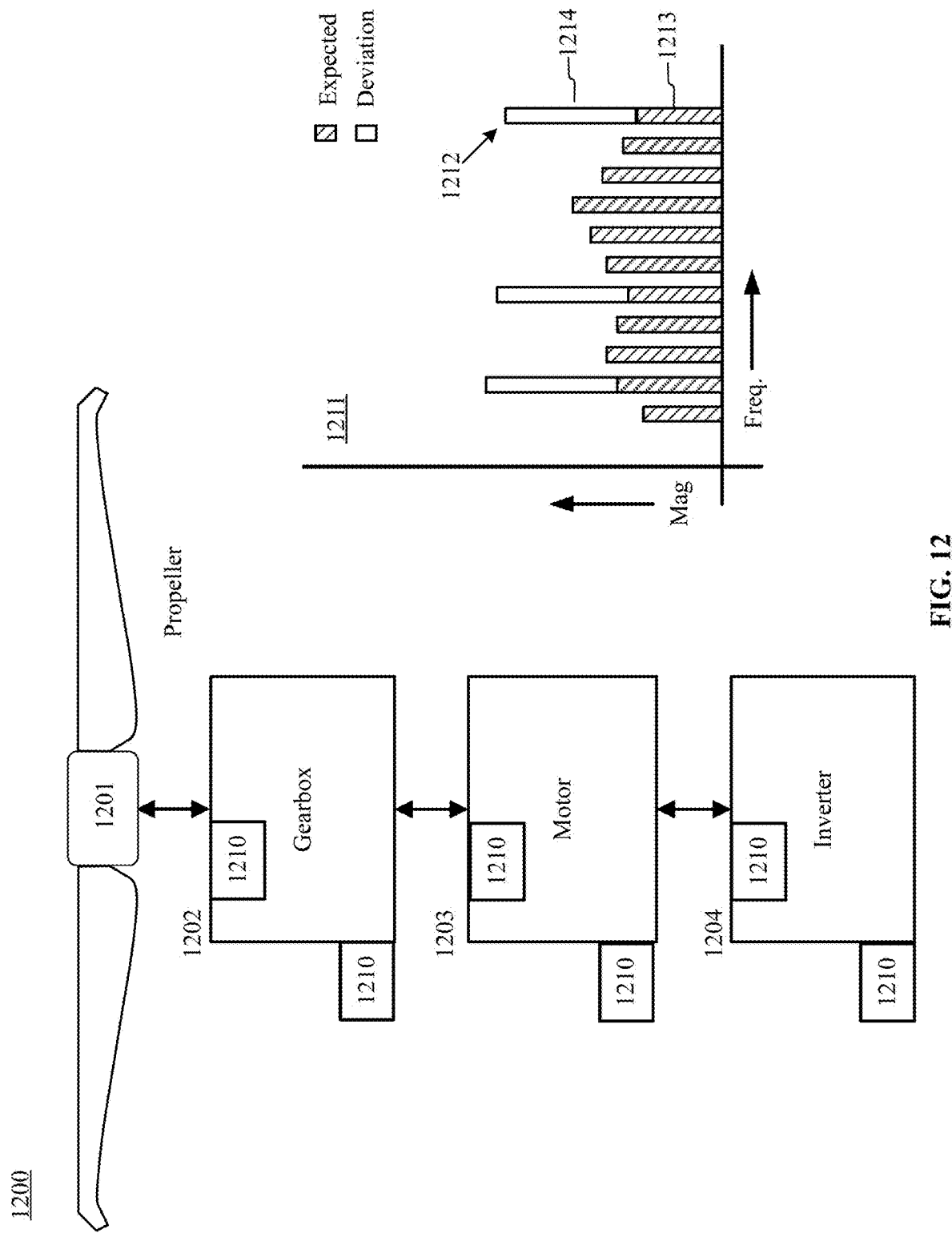
FIG. 12 illustrates an example system for determining an icing condition on a propeller of an electric aircraft, consistent with embodiments of the present disclosure.

FIG. 12 illustrates an example system 1200 for determining an icing condition on a propeller or other surface of an aircraft, consistent with disclosed embodiments. For example, the system 1200 may be employed to determine an icing conditions input as discussed above with respect to, e.g., FIG. 2, 3, 5, or 6. System 1200 may comprise part of, e.g., an electric aircraft, such as VTOL aircraft 100 of FIGS. 1A and 1B. System 1200 may comprise: a propeller 1201, a gearbox 1202, a motor 1203, an inverter 1204, and one or more accelerometers. For example, an accelerometer may be located in a module of a motor assembly, such as within gearbox 1202, motor 1203, or inverter 1204. Alternatively or additionally, and accelerometer may be located at a component of the propeller 1201 or at a connection between modules. As schematically illustrated, the accelerometer may be located externally or internally to the modules. Multiple accelerometers may be provided on a given module to e.g., monitor vibration or other dynamics in multiple degrees of freedom.

Accelerometers 1210 may be configured to e.g., monitor vibrations or other dynamics in the propulsion system. In some embodiments, multiple accelerometers 1210 may be provided on a given module to e.g., monitor these dynamics in multiple degrees of freedom, such as orthogonal x, y or z axes, or other degrees of freedom. In some embodiments, additional accelerometers may be provided for redundancy or to monitor torsional or other complex modes. Because ice accretion may alter the mass distribution of rotating components such as propeller blades, hub or shaft, a vibrational frequency profile 1211 may deviate from expected values for a given set of flight conditions. For example, the magnitude of vibration 1212 at a certain frequency value may comprise a normal or expected component 1213 (shown in hatched bars) and an additional aberration component 1214 (shown in white or blank bars) that may indicate an icing condition. Because ice accretion alters the mass distribution of rotating components such as propeller blades, hub or shaft, a deviation from expected values may indicate an icing condition. Stated another way, a deviation from the expected magnitude of vibration at a predetermined frequency for a known set of flight conditions may indicate a change in mass distribution resulting from ice accretion. In some embodiments such deviations may be inferred as resulting from an icing condition, for example, based on modelling that identifies ice-related deviations, or based on weather data, flight conditions or other factors indicating that a vibrational deviation likely results from an icing condition. In some embodiments, ice buildup may attenuate certain frequencies, or shift a natural vibrational mode to a frequency that is higher or lower than an expected value. Therefore, in some embodiments, determining an icing condition may comprise determining that a frequency is lower than expected, or that a natural mode has deviated from an expected value.

In some embodiments, the set of flight conditions under which monitoring takes place may correspond to normal flight conditions. In some embodiments, the flight conditions may be induced in order to probe for icing conditions. For example, a propeller speed, torque or other parameter may be modulated to produce conditions in which icing can be more easily detected by generating more pronounced or recognizable vibrations or other disturbances.

Additionally, some electric engine designs may limit the available torque slew rate (i.e., the time rate of change of engine torque), which may place constraints on the ability to use high propeller accelerations as a mechanism for measurement icing conditions or vibrations. For example, an electric aircraft engine may monitor propeller parameters using a flight control system that relies on secondary estimates instead of direct measurements. Using such a system, it may not be possible to operate an electric engine at its maximum capacity due to an inability of an estimator within the flight control system to accurately measure the acceleration, speed, torque, or other parameter. For example, an electric engine design may be limited to slew rates of, e.g., at or below 3000 N-m/sec at positive speeds at or above 50 RPM. While this may be acceptable for ordinary flight, it would be beneficial to enable an engine to perform accelerations outside a typical operation envelope for the purpose of, e.g., measuring ice accretion or monitoring system dynamics for other reasons. Therefore, in some embodiments a motor position sensor may be used to perform the measurements discussed above. An example motor position sensor is discussed with respect to FIG. 13 below.

Figure 13:
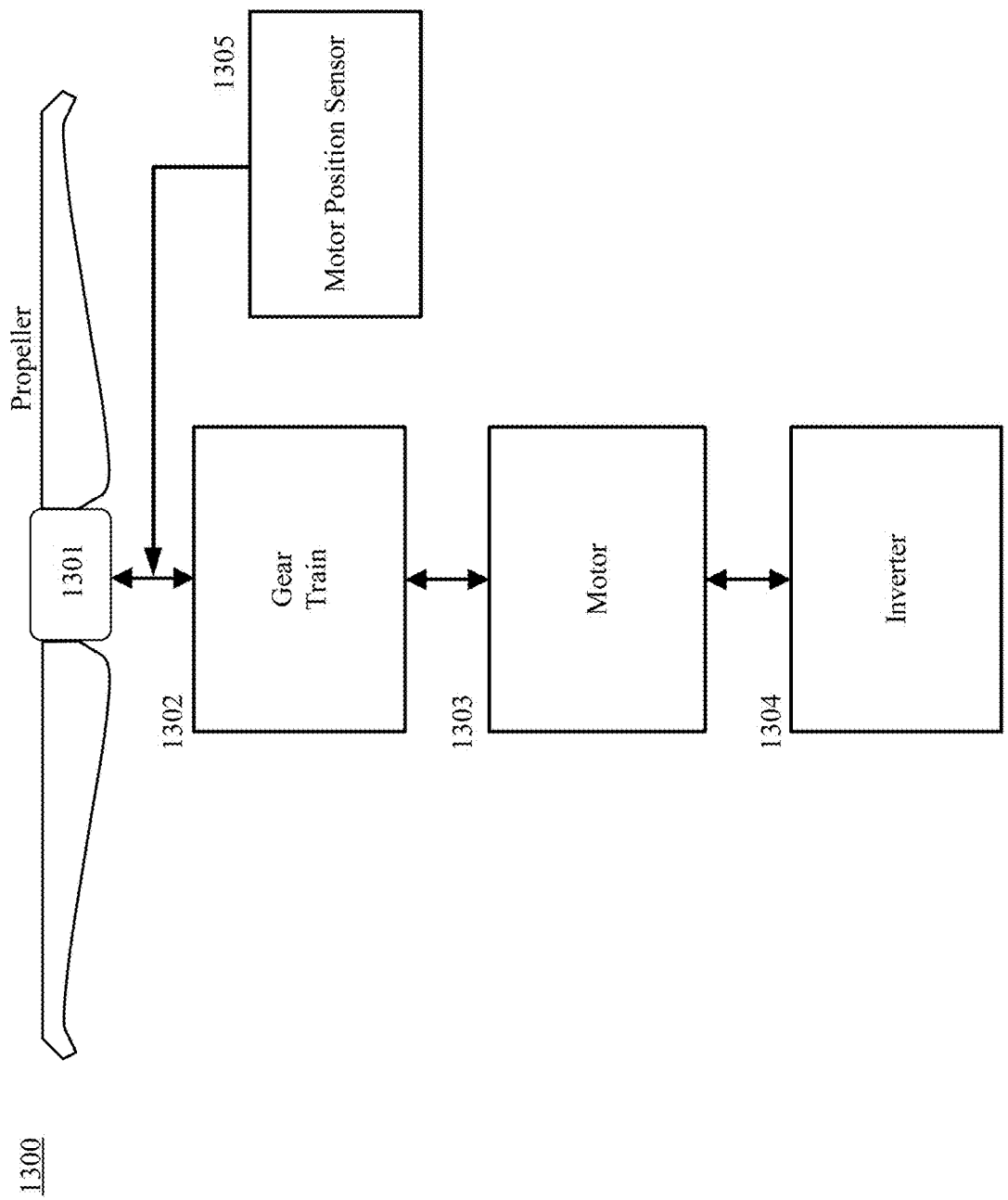
FIG. 13 illustrates an example system for determining an icing condition on a propeller of an electric aircraft, consistent with embodiments of the present disclosure.

FIG. 13 illustrates an example system 1300 for determining an icing condition on a propeller or other surface of an aircraft, consistent with disclosed embodiments, consistent with disclosed embodiments. System 1300 may comprise part of, e.g., an electric aircraft, such as VTOL aircraft 100 of FIGS. 1A and 1B. For example, system 1300 may comprise: a propeller 1301, a gearbox 1302, a motor 1303, an inverter 1304, and a motor position sensor 1305. Motor position sensor 1305 may be configured to directly measure angular position. For example, motor position sensor 1305 may be configured at, e.g., propeller 1301, or at an output of gearbox 1302 or motor 1303. In some embodiments, motor position sensor 1305 may comprise e.g., a resolver. Motor position sensor 1305 may be configured to directly measure angular position with a high precision and speed for greater feedback control of, e.g., propeller speed and torque. The addition of a motor position sensor can therefore support higher torque slew rates at increased propeller speeds, which may be used to achieve higher magnitudes of the modulation parameters discussed above in embodiments of the present disclosure.

Figure 14:
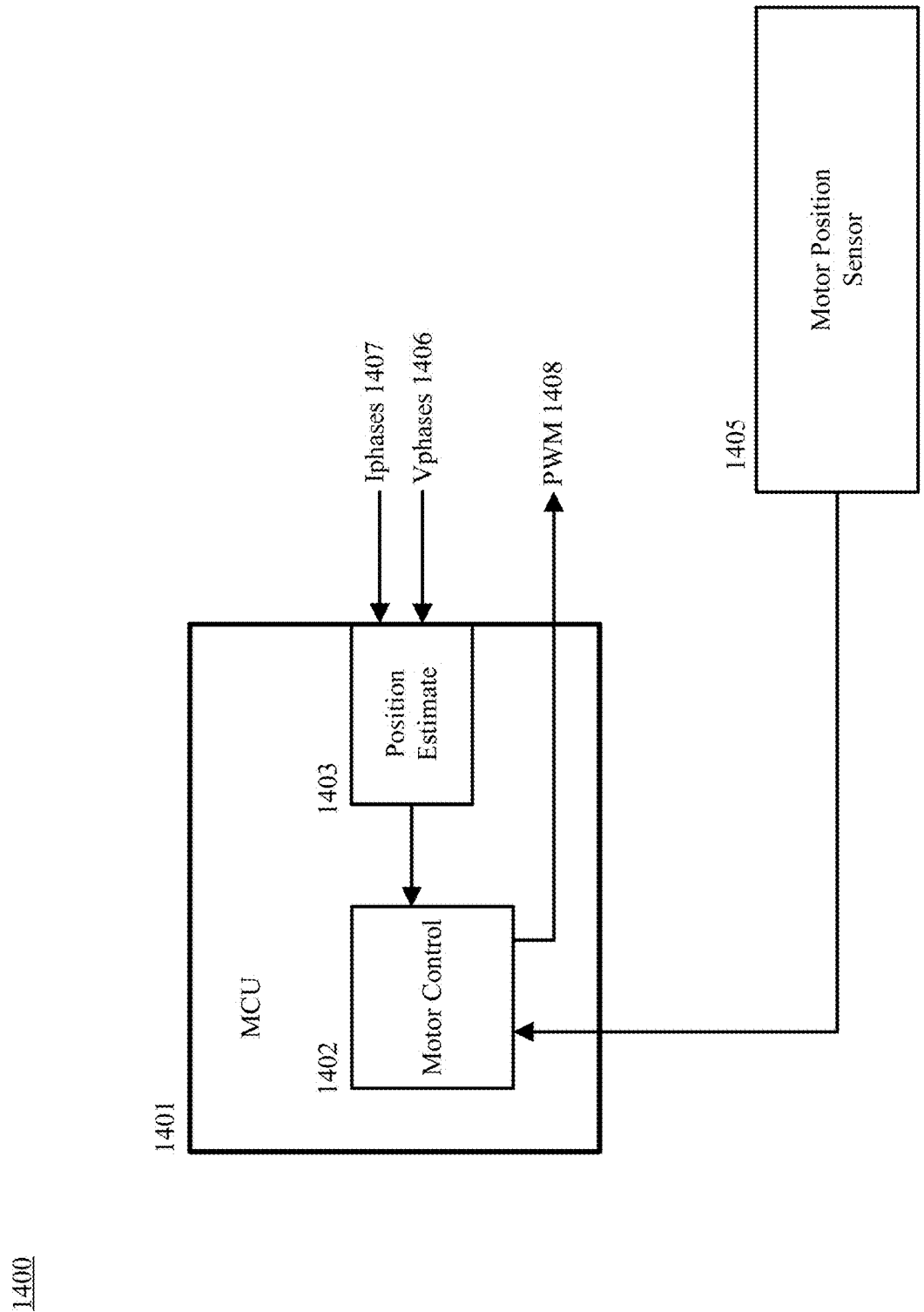
FIG. 14 illustrates an example system for determining an icing condition on a propeller of an electric aircraft, consistent with embodiments of the present disclosure.

FIG. 14 illustrates an example system for determining an icing condition on a propeller or other surface of an aircraft, consistent with disclosed embodiments. System 1400 may comprise part of, e.g., an electric aircraft, such as VTOL aircraft 100 of FIGS. 1A and 1B. For example, system 1400 may illustrate a control architecture using a motor position sensor as discussed above with respect to FIG. 13. System 1400 may comprise: a motor control unit (MCU) 1401 having a motor control module 1402 and a position estimate module 1403, and a motor position sensor 1405. Motor position sensor 1405 may correspond to, e.g., motor position sensor 1305 of FIG. 13. In some embodiments, motor position sensor 1405 may comprise e.g., a resolver. The position estimate module 1403 may input voltage phase information 1406 and current phase information 1407 from an electric engine, such as from inverter 1304 of FIG. 13. In some embodiments, the voltage phase information 1406 and current phase information 1407 may be generated from sensors on the phase connections of the inverter 1304 of FIG. 13. The position estimate module 1403 may estimate an angular position of a propeller, such as propeller 1301 of FIG. 13. The motor control module 1402 may receive a position estimate signal from position estimate module 1403 and a position measurement signal from motor position sensor 1405. The motor control module 1402 may output pulse-width modulation (PWM) command 1408 based on the position estimate signal and position measurement signal to perform high speed, accurate angular measurement of a propeller in a VTOL or other distributed propulsion aircraft.

In some embodiments, an oil path may flow through other ice-prone regions to serve the dual purpose of preventing ice accretion and providing a secondary heat exchange surface. For example, a spinner or propeller blade may be configured to circulate hot oil to serve as a main or auxiliary heat exchanger while managing accretion on those surfaces. In some embodiments, using such surfaces as a main heat exchanger may obviate the need to provide a dedicated heat exchanger at all. For example, the heat exchanger 1511 discussed below with respect to FIG. 15 may be eliminated in some embodiments when, e.g., spinner 1501 provides a sufficient heat exchange surface.

Figure 15:
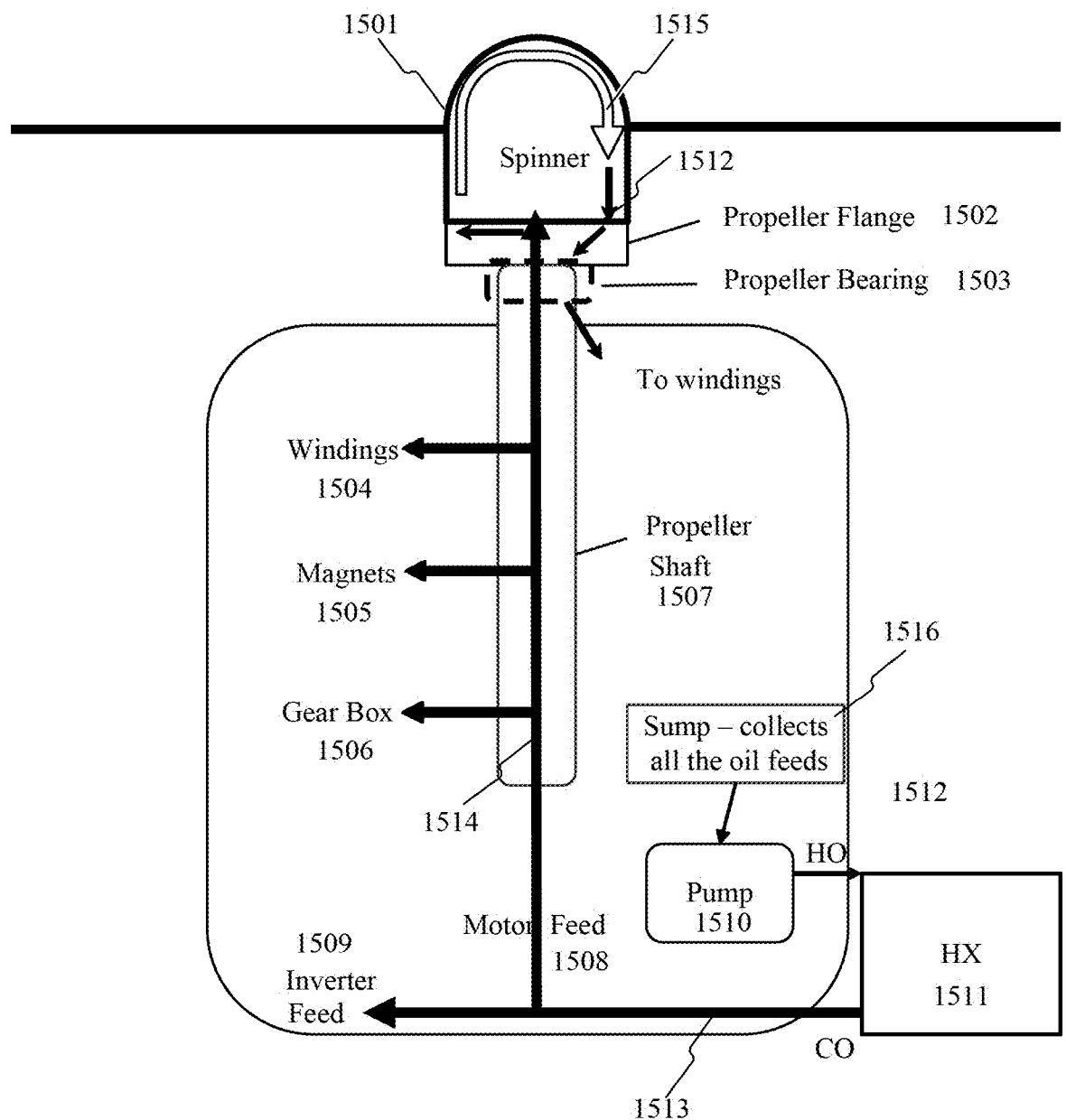
FIG. 15 illustrates an example system for managing ice accretion on a spinner, consistent with embodiments of the present disclosure.

FIG. 15 illustrates an example propeller system 1500 configured to manage ice accretion on a spinner 1501, consistent with disclosed embodiments. Propeller system 1500 may comprise part of, e.g., an electric aircraft, such as VTOL aircraft 100 of FIGS. 1A and 1B. Propeller system 1500 may comprise: a spinner 1501, a propeller flange 1502, a propeller bearing 1503, a plurality of windings 1504, a plurality of magnets 1505, a gearbox 1506, a propeller shaft 1507, a motor feed 1508, an inverter feed 1509, a pump 1510, a heat exchanger 1511, a hot oil path 1512, a cold oil path 1513, a shaft oil path 1514, and a spinner oil path 1515. In this context, "spinner" may refer to a cap or other aerodynamic outer surface at the center of rotation of a propeller. The spinner 1501 may be mounted onto the propeller shaft 1507 via propeller flange 1502. The shaft oil path 1514 in propeller shaft 1507 may connect to the propeller flange 1502. The shaft oil path 1514 in the propeller shaft 1507 may travel along the propeller shaft 1507, towards the propeller flange 1502 and spinner 1501.

An oil flow path may be described beginning at a sump 1516 which collects oil that has been heated by various components of the propeller system 1500 such as, e.g., windings 1504, magnets 1505, or gearbox 1506, or an inverter (not shown, but fed oil by inverter feed 1509). The heated oil may be pumped by pump 1510 through a hot oil path 1512 into heat exchanger 1511. Heat exchanger 1511 may cool the oil by exchanging heat with, e.g., an airflow passing through the heat exchanger 1511, and deliver it back to the various components by cold oil path 1513 to be heated again. The oil may travel along shaft oil path 1514 to be delivered to the spinner 1501 through, e.g., propeller flange 1502. For example, where it may circulate through spinner oil path 1515. Spinner oil path 1515 may comprise, e.g., conduits, micro-tubes or other pathways configured to distribute oil along an inner surface. For example, spinner path may comprise channels similar to those employed in a heat exchanger, and may be bonded or brazed onto the spinner 1501, or formed integrally within the spinner 1501 shell. Hot oil may be circulated through spinner oil path 1515 by, e.g., pump 1510 or by centrifugal force of the spinning propeller. For example, in some embodiments, spinner oil path 1515 may be introduced at a radially inward portion of spinner 1501 and returned to a more radially outward portion of propeller flange 1502 to provide a net centrifugal force on the oil in spinner oil path and assist with its circulation. Thus, hot oil may enter through a central portion of propeller flange 1502 and circulate through oil flow path 1515 to exchange heat with the cold surface and melt or prevent ice buildup. The oil may then return to propeller flange 1502 and be directed back into a stationary part of propeller system 1500, such as by travelling through propeller bearing 1503 to, e.g., windings 1504 or other hot components, and eventually return to sump 1516 to repeat the oil flow cycle.

Because de-icing path of spinner 1501 may cool the oil reaching sump 1516 to a lower temperature than it would otherwise be in the absence of such a path, the spinner oil path may reduce the cooling requirements on heat exchanger 1511, allowing a smaller design of the heat exchanger or even eliminating a need for it entirely. Shrinking or eliminating the heat exchanger may simultaneously reduce or eliminate the need for a corresponding air inlet, allowing the propeller nacelle profile to be significantly more streamlined to reduce drag and boost energy efficiency.

Figure 16:
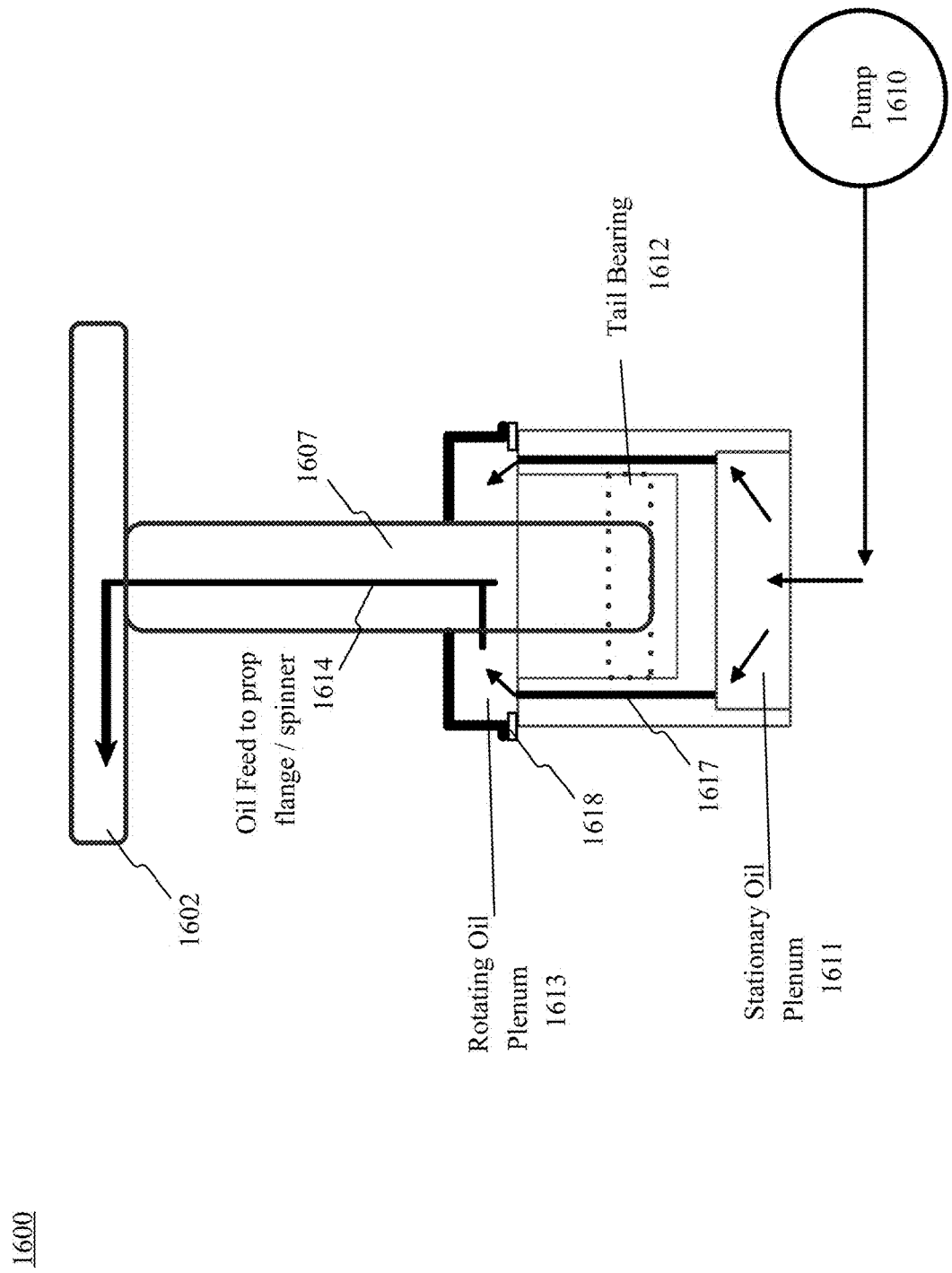
FIG. 16 illustrates an example system for managing ice accretion on a spinner, consistent with embodiments of the present disclosure.

FIG. 16 illustrates an example system 1600 for managing ice accretion on a spinner, consistent with disclosed embodiments. System 1600 may comprise, e.g., a subsystem of propeller system 1500 of FIG. 15. For example, system 1600 may comprise part of, e.g., an electric aircraft, such as VTOL aircraft 100 of FIGS. 1A and 1B. System 1600 may comprise: a pump 1610, a stationary oil plenum 1611, a tail bearing 1612, a rotating oil plenum 1613, a propeller shaft 1607, shaft oil path 1614, a propeller flange 1602, stationary channels 1617, and sealed bearing system 1618. Pump 1610 may force oil into stationary oil plenum 1611, through stationary channels 1617, which ay optionally pass through a tail bearing 1612, and into rotating oil plenum 1613. Rotating oil plenum 1613 may be configured to spin with respect to stationary components via sealed bearing system 1618, so that it may move with the other rotating components of a propeller system, such as propeller shaft 1607 or propeller flange 1602. Oil may enter shaft oil path 1614 via rotating oil plenum 1613 and enter the spinner (not shown) through shaft flange 1602. Rotating oil plenum 1613 may and stationary oil plenum 1611 may this supply hot oil from stationary components of a propeller electric engine into spinning components such as spinner 1501 of FIG. 15.

Figure 17A:
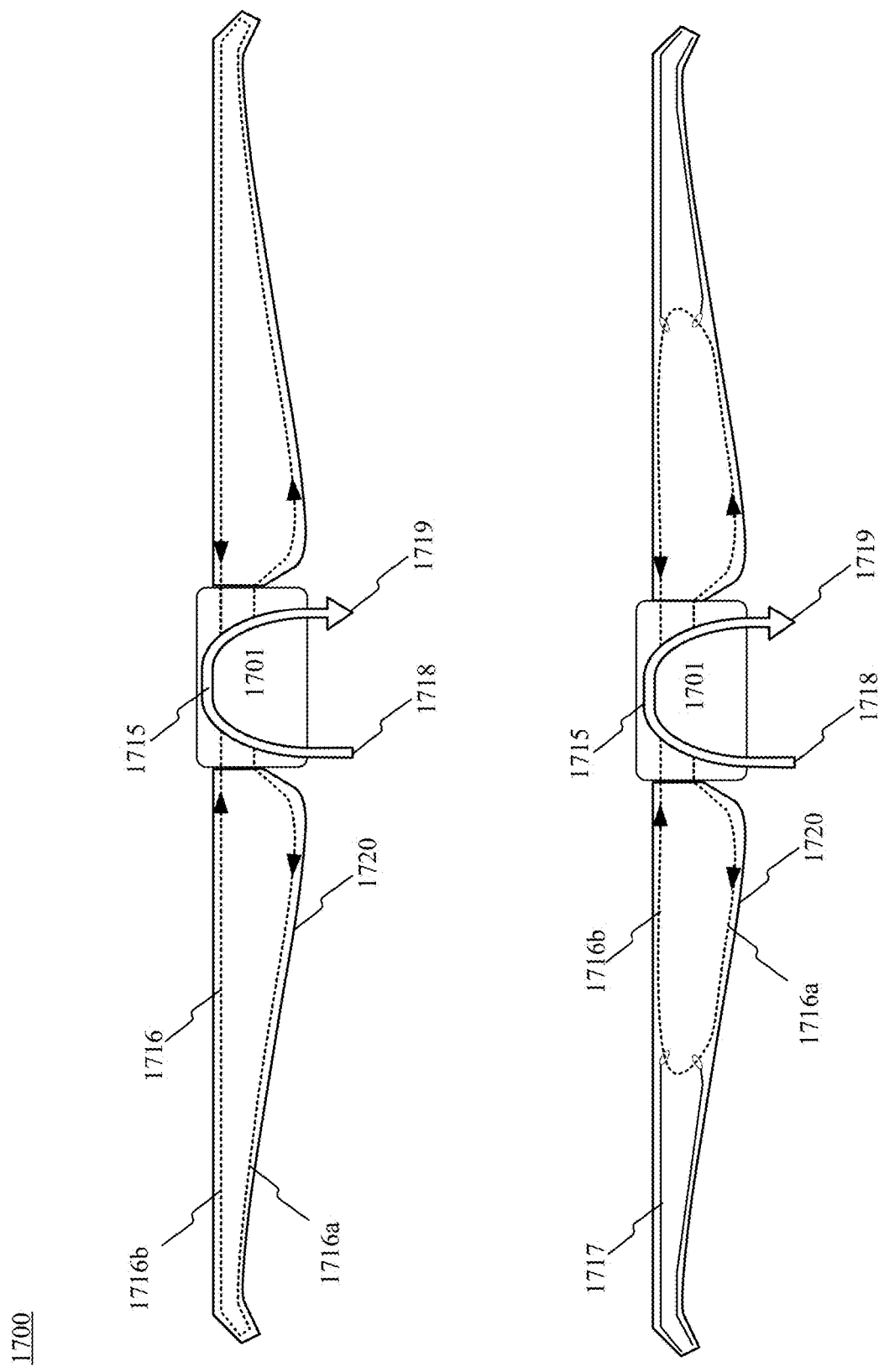
FIGS. 17A-17B illustrate example systems for managing ice accretion on a spinner or propeller blades, consistent with embodiments of the present disclosure.
Figure 17B:
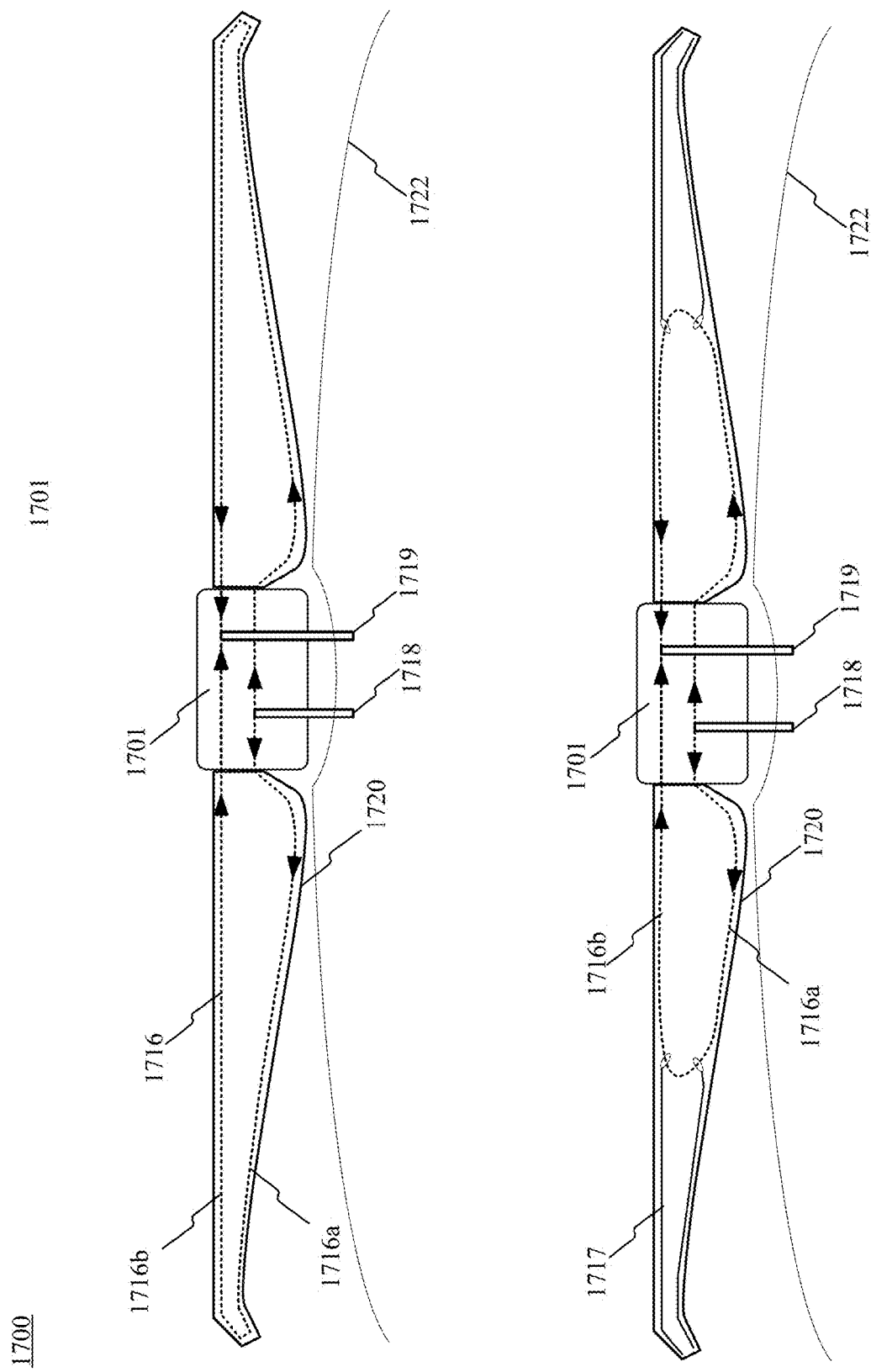

FIGS. 17A-17B illustrate examples of a propeller system 1700 configured to manage ice accretion on a spinner or propeller blades, consistent with disclosed embodiments. Propeller system 1700 may comprise part of, e.g., an electric aircraft, such as VTOL aircraft 100 of FIGS. 1A and 1B. Propeller system 1700 may comprise: spinner 1701, spinner oil path 1715, blade channels 1716, thermal conductors 1717, oil path inlet 1718, oil path outlet 1719, and blades 1720.

Propeller system 1700 may be similar to system 1500 of FIG. 15 with the addition of ice management systems within blades 1720. For example, oil may be distributed from spinner oil path (also referred to as a spinner channel) 1715 to internal blade channels 1716, which may be, e.g., formed within the blade material or bonded to a hollow interior. In some embodiments as seen at the top of FIG. 17A, blade channels 1716 may run along substantially an entire length of blades 1720. For instance, in some embodiments, the forces exerted on the oil due to rotation of propeller blades 1720 may be substantially equal on both a radially outbound segment 1716a and a radially inbound segment 1716b, such that the opposing forces may essentially cancel leaving only the force applied along the oil flow path from, e.g., a pump or other circulation mechanism, and pressure losses along the oil paths. Therefore, in some embodiments, it may be desirable to run internal blade channels 1716 along substantially the entire length of blades 1720 to prevent ice from forming and create additional heat exchange surfaces. For example, if all rotating spinners and blades are functioning as heat exchangers, in some embodiments it may be possible to greatly reduce a size of heat exchangers at the nacelle or eliminate them entirely, saving cost and weight, and reducing drag.

However, a further concern is the possibility of air being present in the oil that is circulating through spinner oil path 1715 and blade channels 1716. The more radially outward blade channels are run, the more the blades 1720 may act as a centrifuge to separate the air from the oil. This may disrupt the fluid flow and create unwanted imbalances within the propeller blades. Therefore, in some embodiments as seen at the bottom of FIG. 17A, blade channels 1716 may extend only through a portion of the blade, such as a distance of, e.g., 20%, 30%, 40%, 50%, 60%, or 70% of the blade radius as measured from an axis of rotation. The particular radius chosen may depend on fluid flow characteristics, channel widths, expected blade operating conditions and the degree to which the oil may be de-aerated. In some embodiments, the remainder of the blades 1720 may be heated by, e.g., providing thermal conductors 1717 from the blade channels 1716 to the radially outward portions of blades 1720.

Furthermore, it is noted that the radially interior heating properties of blade channels 1720 at the bottom of FIG. 17A may be combined with the ice management cycles described above. For example, while the blade channels 1716 may be better suited to heat the radially inward portions of blades 1720, some ice management cycles may be more effective on the radially outward portions. By providing the blade channels 1716 and performing ice management cycles such as, e.g., modulating propeller speed, ice may be effectively managed along an entire length of blades 1720. Similarly, the provision of blade channels 1716 may reduce the required magnitude of a management cycle because, e.g., a propeller RPM or tip Mach number will not need to be made high enough to shed ice at the radially inward portions, but instead may be designed only to manage ice at the outer portions of blades 1720. Therefore, the combination of blade channels and ice management cycles may provide superior ice management.

As discussed above and further illustrated in FIG. 17B, in some embodiments the oil may be circulated only through blades 1720 and may not be circulated through dedicated heat exchange channels in the spinner 1701. Instead, oil flow may enter by one or more oil path inlets 1718 and be distributed to each blade channel 1716. After cycling through the blade channel, the circulating oil may be combined again at one or more oil path outlets 1719. It may be desirable to concentrate oil flow into the propeller blades 1720 to improve performance of the oil flow system as a heat exchanger, rather than solely as an ice management system. For example, while the surface of spinner 1701 may be provided with a constant airflow in the cruise configuration, this may not be the case when hovering, or when slowly ascending or descending. In those situations, only the rotating blades may continue to provide continuous contact with an airflow that is sufficiently strong to perform heat exchange with the oil inside the blades. Thus in some embodiments, by concentrating oil flow in the blades 1720, it may be possible to reduce or eliminate a dedicated air-oil heat exchanger (such as heat exchanger 803 in FIG. 8A), which may also reduce or eliminate the need for drag-inducing features (such as air inlet 806 in FIG. 8A). For example, when the propeller blades 1720 act as the sole heat exchanger for a propeller assembly, it may be possible to eliminate an air inlet because the sole heat exchanger is located outside the skin 1722 of the aircraft (such as outside the nacelle, boom, or other exterior aerodynamic surfaces), eliminating the need to draw air into the aircraft's interior. In some embodiments, the plurality of propeller blades 1720 may serve as the primary heat exchanger in a propeller system. The blades may be considered the "primary" heat exchanger when, e.g., a significant portion of the heat that is generated by a motor assembly is transferred to the external environment by thermal conduction through the propeller blades. For example, a significant portion of the heat may comprise, e.g., at least 30%, at least 50%, or at least 70% of the heat that is generated by the motor assembly. In some embodiments, the blades may be considered the "primary" heat exchanger when, e.g., no other heat transfer component (such as, e.g., cooling fins or an air-oil heat exchanger) transfers more heat from the motor assembly to the external environment than the propeller blades do. Alternatively or additionally, blades may be considered the "primary" heat exchanger when the propeller assembly has no other component that is designed to function as a heat exchanger.

FIGS. 18A-18K illustrate example systems for managing ice accretion on a propeller assembly, consistent with disclosed embodiments. As discussed below, ice management systems according to embodiments of the present disclosure may utilize the electrical or mechanical power of the propeller to wirelessly generate heat in a moving component of the propeller assembly, such as, e.g., propeller blades or spinner.

For example, in some embodiments, an array of magnets may be arranged on a stationary part of the propeller assembly. "Stationary" in this context may refer to a component of the aircraft that does not rotate along with the propeller blades, such as a motor assembly, boom, nacelle, etc. In some embodiments the magnets may comprise permanent magnets. In some embodiments, the magnets may comprise electromagnets coupled to an AC or DC power circuit.

The magnets may be arranged in proximity to an electrically conductive portion on a movable part of the propeller assembly. In some embodiments, the electrically conductive portion may comprise an electrically conductive strip configured to generate eddy current as the material moves through the magnetic fields generated by the array of magnets. The eddy current may be conducted to other parts of the propeller assembly by further electrically or conductive material, such as wiring embedded within the blades, spinner, or other ice-prone surface. In some embodiments, the electrically conductive portion may comprise windings. The magnets may be configured to induce an electric current in the windings. The current may then flow to other parts of the blade and spinner by, e.g., the embedded wiring, which may generate heat at desired locations by resistive heating to manage ice accretions.

Various embodiments for electric ice management are discussed below. It should be understood, as is true of the embodiments of FIGS. 1-17B above, that the features recited in each of FIGS. 18A-18K may be used in combination with each other, and further that features from one illustrated embodiment may be incorporated or substituted into another of the illustrated embodiments. By way of example only, the coils illustrated in FIG. 18J may be used in addition to, or in lieu of, the permanent magnets illustrated in FIG. 18G.

Additionally, while FIGS. 18A-18K are described with respect to a tilt propeller, embodiments of the present disclosure are not limited to this. For example, the features described below may be implemented on, e.g., a lift propeller or another type of aircraft propeller assembly.

Figure 18A:
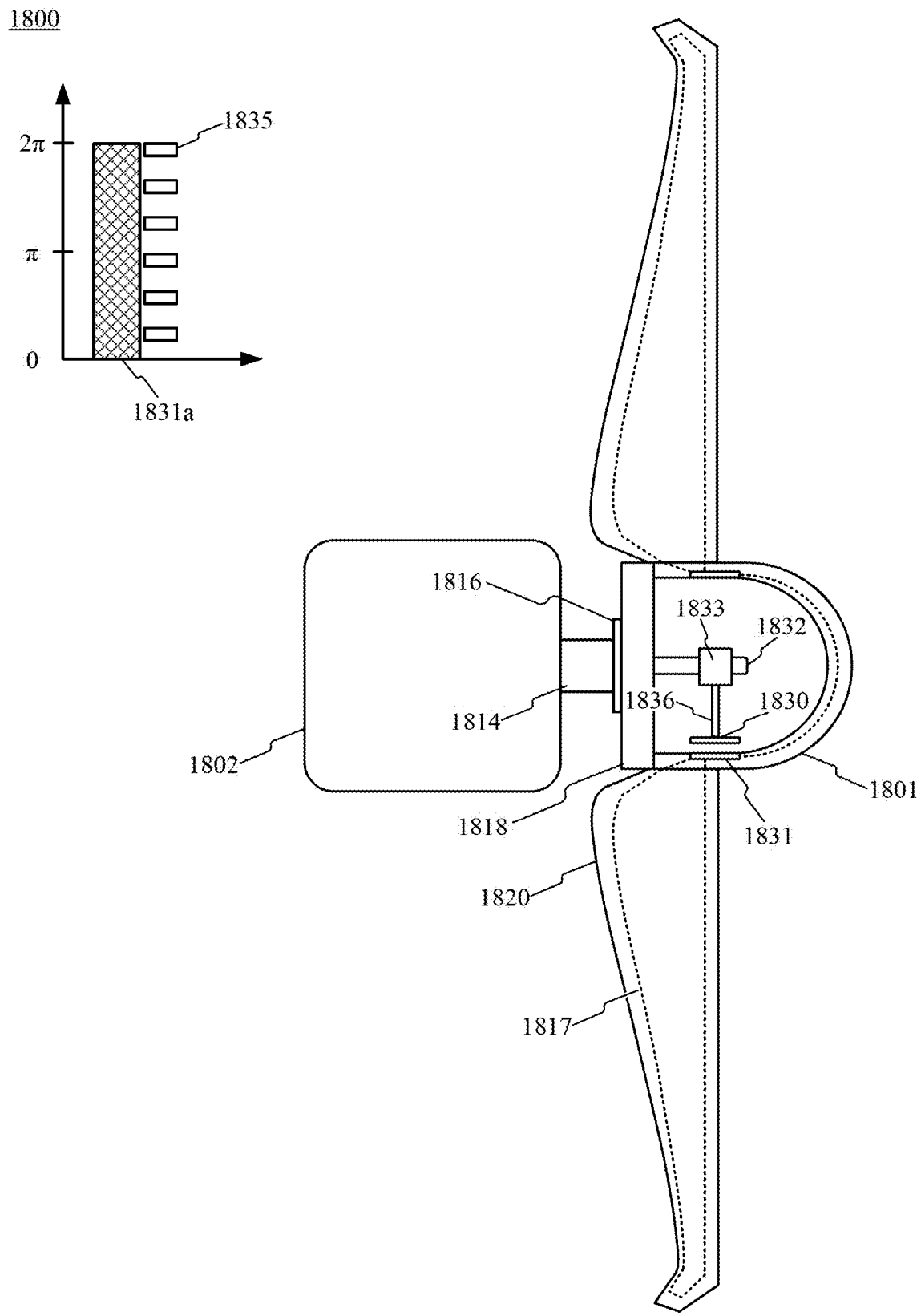
FIGS. 18A-18K illustrate example systems for electrically managing ice accretion on a spinner or propeller blades, consistent with embodiments of the present disclosure.

As seen in FIG. 18A, a propeller assembly 1800 may comprise, e.g., a motor assembly 1802 configured to rotate a propeller shaft 1814; a propeller hub 1818 coupled to the propeller shaft 1814 by a propeller flange 1816; spinner 1801; and propeller blades 1820.

Propeller assembly 1800 may comprise a spinner rod 1832 inside the spinner 1801. Spinner rod 1832 may, e.g., extend from propeller hub 1818 and be coaxial with a rotation axis of propeller shaft 1814. Spinner rod may be fixed with respect to propeller hub 1818 and configured to rotate along with it and the other rotating elements of propeller assembly 1800. In some embodiments, spinner rod may comprise, or be fixed to, another rotating element of the propeller assembly such as, e.g., propeller flange 1816, spinner 1801, or other mechanisms inside spinner 1801 such as, e.g., a pitch control rod or yoke plate (not shown). As illustrated, spinner rod 1832 is cantilevered from propeller hub 1818, but embodiments of the present disclosure are not limited to this. For example, in some embodiments, the spinner rod 1832 may instead be cantilevered from the spinner 1801, or it may connect the propeller hub 1818 to the spinner 1801. Cantilevered spinner rods may be preferable in some embodiments in view of their compact and lightweight design, while spinner rods 1832 that connect the propeller hub 1818 to the spinner 1801 may offer, e.g., greater stability and durability of the propeller structure.

A magnet 1830 may be suspended from spinner rod 1832 by a bearing 1833 and an arm 1836. For example, the magnet 1830 may comprise one or more permanent magnets. Bearing 1833 may isolate magnet 1830 from the rotational motion of the propeller assembly so that, in the horizontal thrust orientation shown in the figure, magnet 1830 remains hanging downward by the force of gravity while spinner rod 1832 rotates along with the propeller. In a perfectly vertical thrust orientation, the magnet 1830 may also remain sufficiently decoupled from the rotation of the propeller assembly by inertia, such that ice management may be effective in both lift and cruise configurations. However, it should be noted that tilt propellers are frequently oriented at slight angles to the vertical direction even during takeoff, landing and hover, such that gravity may nevertheless assist in keeping the magnet 1830 stationary.

The spinner 1801 may comprise an electrically conductive portion 1831 located proximal to magnet 1830. In some embodiments, as shown in FIG. 18A, the electrically conductive portion 1831 may comprise a sheet of metal 1831a such as, e.g., aluminum, copper, iron, or steel (such as, e.g., carbon steel, electrical steel, stainless steel, etc.). The electrically conductive portion 1831 may be, e.g., affixed to an inner surface of spinner 1801, or it may be embedded within spinner 1801. The electrically conductive portion may be located at a lateral side of the spinner as seen in FIG. 18A. For example, a lateral side of the spinner may refer to a portion of the spinner 1801 that faces more radially outward toward a propeller blade 1820 than toward a forward flight direction. In some embodiments, the sheet of metal may wrap continuously around an inner surface of the spinner, as illustrated at the top left corner of FIG. 18A (electrically conductive portion 1831a is illustrated in "unrolled" form as a continuous strip spanning a full circular path from 0 to $2\pi$). In some embodiments, a plurality of magnetic field sensors 1835 may be arrayed alongside the electrically conductive portion 1831, as discussed later below.

When the propeller is operating, relative motion between suspended magnet 1830 and spinner 1801 may generate eddy currents in the electrically conductive portion 1831, causing the electrically conductive portion 1831 to generate heat. This heat may then warm the spinner to manage icing. In some embodiments, the generated heat may be distributed by a wiring path 1817. Wiring path 1817 may comprise, e.g., a system of thermally conductive materials such as carbon fiber, metal wires or mesh, etc. and may be configured to distribute the eddy current heat by thermal conduction to ice-prone surfaces of the propeller assembly such as, e.g., the spinner 1801, blades 1820 or elsewhere.

Embodiments of an icing management system according to FIG. 18A offer a simple, passive, fail-safe design that requires no dedicated control components to operate. This "always on" design may similarly reduce the burden of ice detection. For example, while it may nevertheless be important to know the status of ice accretion on surfaces of the aircraft, there may be no need to specifically determine when icing management should be initiated.

In some embodiments, an array of magnetic field sensors 1835 may be provided near the electrically conductive portion 1831. Magnetic field sensors 1835 may be configured to detect the magnetic flux of magnet 1830 as it passes by during rotation of the propeller. This sensor data can be transmitted to, e.g., an inverter or control circuit of the motor assembly 1802 used as a rotational position sensor. For example, the sensor data can be transmitted to the stationary portion of the propeller assembly by, e.g., wireless transmission, through a slip ring, etc. Thus it may be possible to integrate a rotary position sensor into the structure of the icing management system to reduce the number of separate dedicated sensors and control circuits in propeller assembly 1800.

Alternatively or in addition to eddy current heat generation, in some embodiments ice management may be achieved by generating and driving an electric current throughout the spinner 1801 or blade 1820. For example, as schematically illustrated at the top left corner in FIG. 18B, the electrically conductive portion 1831 may comprise a plurality of windings 1831b. When the propeller is operating, relative motion between suspended magnet 1830 and spinner 1801 may induce an electric current in the windings 1831b of electrically conductive portion 1831, which may then be distributed by wiring path 1817. Wiring path 1817 may comprise, e.g., electrically conductive portion such as metal wires that may distribute the electric current throughout, e.g., spinner 1801 or blades 1820 and manage ice at their surfaces by resistive heating. In some embodiments, the resistive heating may be adjusted at desired locations by tailoring the thickness or other structural properties of the wiring path 1817. By way of example only, if it is desirable to generate more heat at the tips of blades 1820 than at their roots, then segments of the wiring path 1817 may be made thinner at the blade tips to increase resistive heating at those locations.

In some embodiments, a switch 1834 may be configured to selectively enable or disable electrical contact between the wiring path 1817 and the electrically conductive portion 1831. For example, in some embodiments, the switch 1834 may comprise a thermostatic switch configured to disable electrical contact when the temperature at the switch 1834 exceeds a predetermined threshold. Alternatively or additionally, switch 1834 may comprise an actively controlled switch that may be operated by, e.g., a pilot or flight control system. For example, in some embodiments, switch 1834 may be configured to be in wireless or slip ring communication with a control circuit on a stationary portion of the aircraft. In some embodiments, switch 1834 may be battery powered, or may be powered or charged by the current induced in the windings 1831b of electrically conductive portion 1831. By providing a switch 1834, it may be possible to disconnect wiring path 1817 when ice management is unnecessary to reduce energy losses, while still maintaining minimal complexity in the ice management control architecture.

In some embodiments, switch 1834 may be designed with a default "on" setting, that is, the switch may be configured to connect the wiring path 1817 and the electrically conductive portion 1831 by default, and to disable this connection when the switch is activated. In this way, a failure of the switch or its control architecture is more likely to result in an "always on" mode and is less likely to disable ice management capabilities. Such a failure could be detected by determining that heating is activated when it should not be, which could be determined by efficiency losses in the propeller assembly that result from the heat generation.

In some embodiments, a plurality of switches may be provided to selectively enable or disable heating over different zones of the propeller assembly. For example, the different zones may comprise, e.g., spinner 1801 or a region of spinner 1801, an individual blade 1820 or a region of an individual blade 1820, all blades 1820. BY targeting different zones, it may be possible to selectively concentrate the heating power where it is needed depending on icing conditions.

Figure 18B:
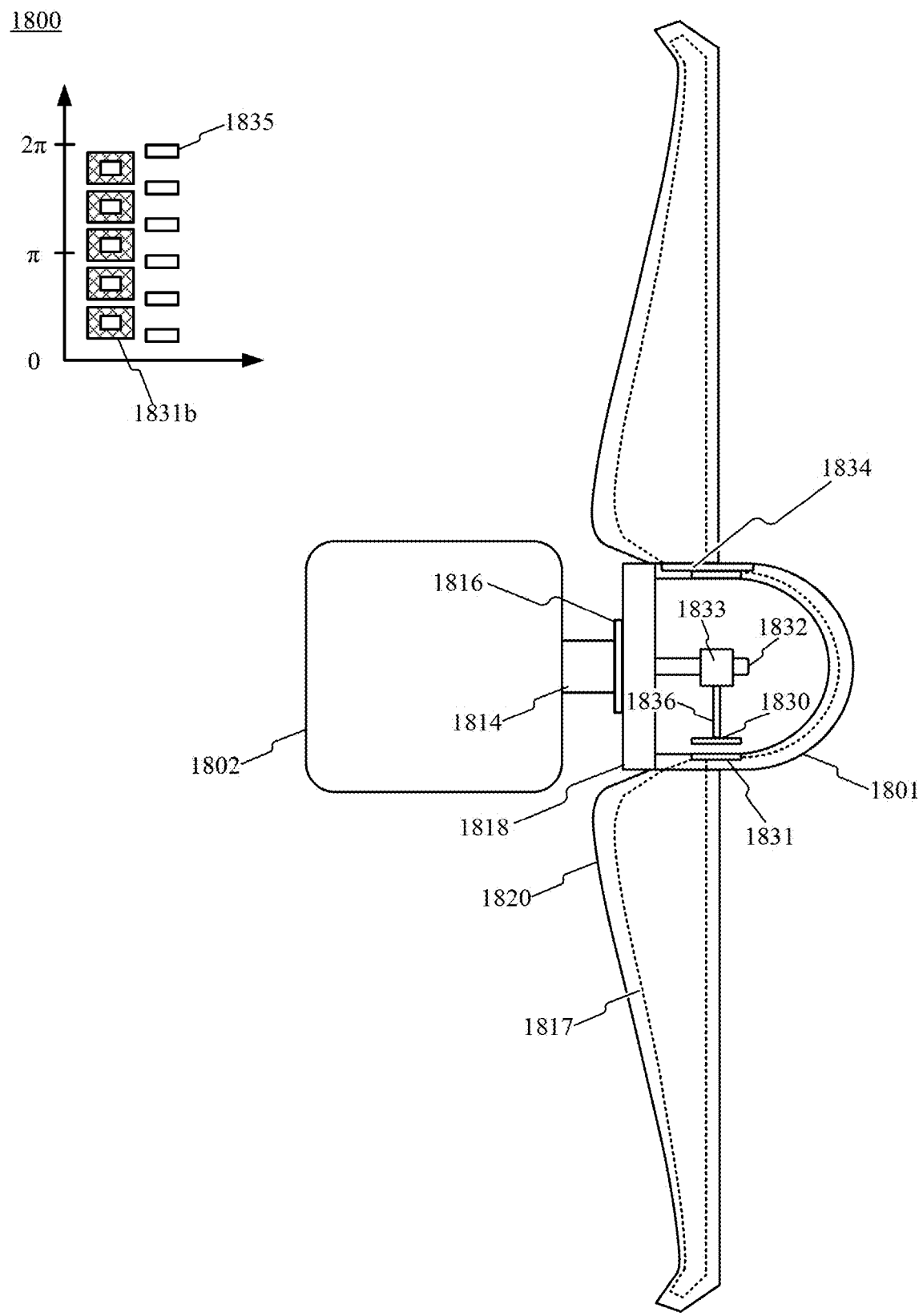
Figure 18C:
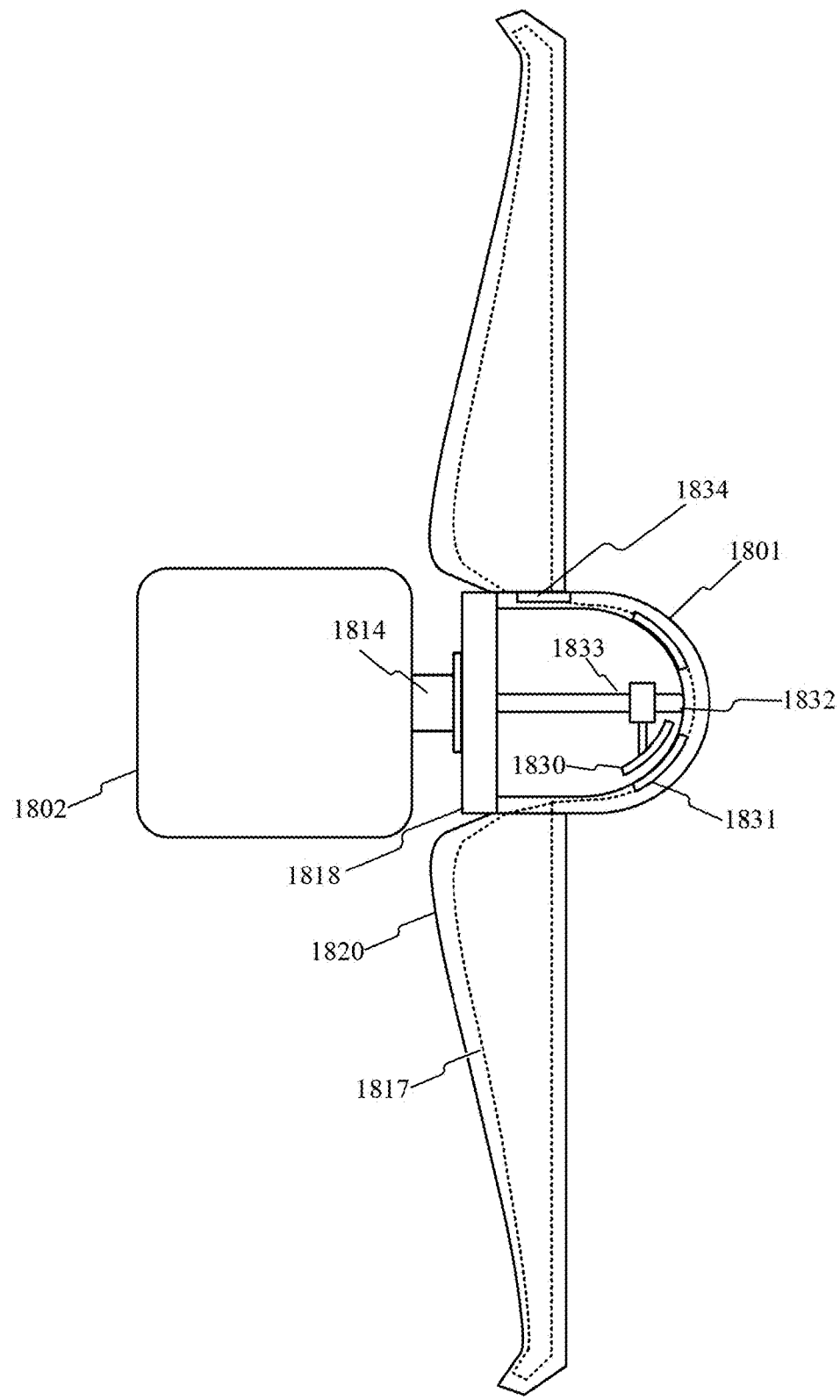
Figure 18D:
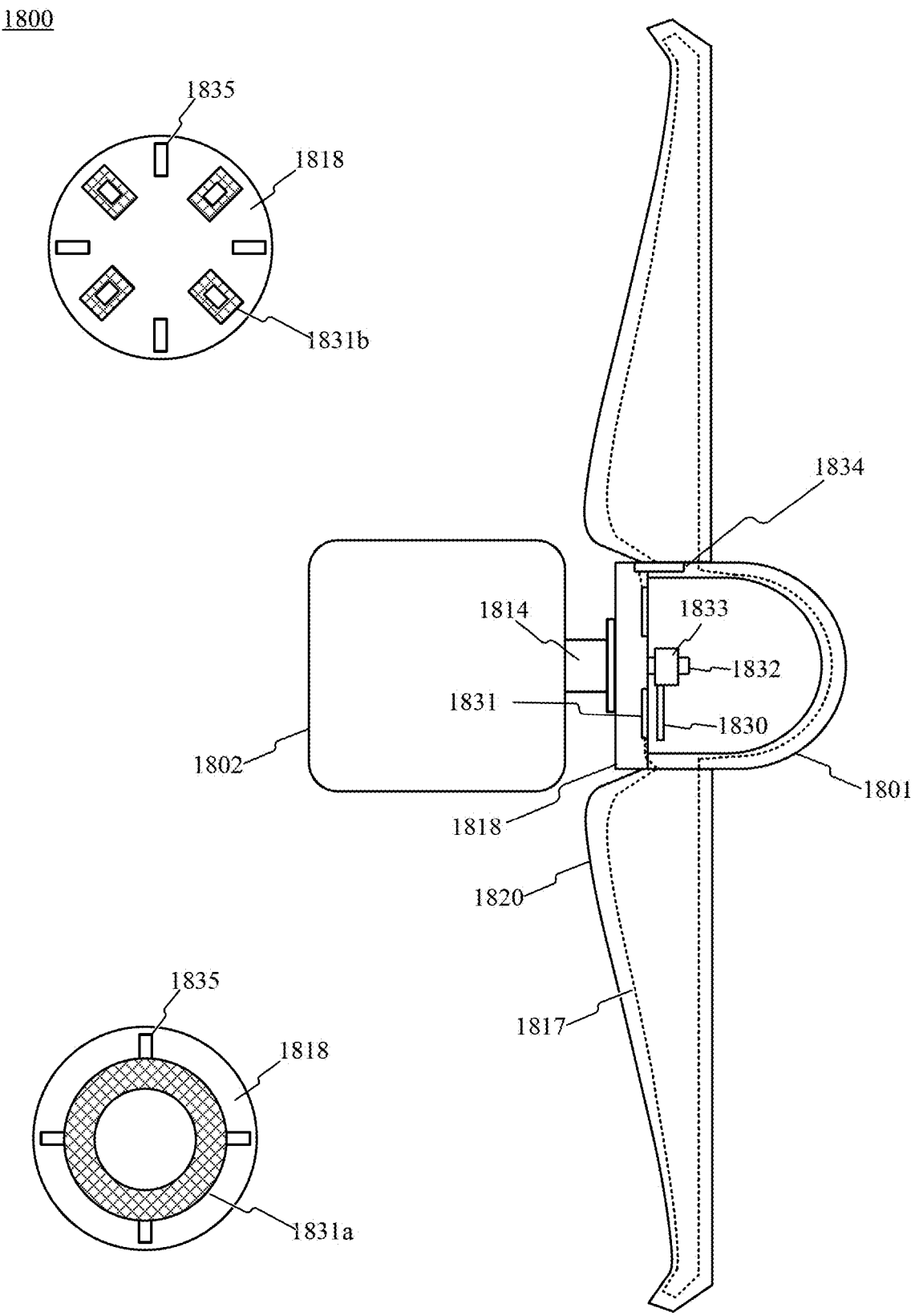

FIGS. 18C and 18D schematically illustrate additional configurations for ice management, consistent with embodiments of the present disclosure. For example, embodiments according to FIGS. 18C and 18D may be similar to those described with respect to FIGS. 18A and 18B except as described below.

As shown in FIG. 18C, a magnet 1830 may face a front portion of spinner 1801, and the electrically conductive portion 1831 (such as, e.g., metal sheet 1831*a* as shown in FIG. 18A or a plurality of windings 1831*b* as shown in FIG. 18B) may be located at the front portion. In this context, a "front" of the spinner may refer to the propulsion direction of the spinner. For example, for the case of a tilt propeller, the front may correspond to the forward flight direction when the propeller is in a horizontal thrust, or cruise, configuration. The front facing arrangement may be advantageous in that it arranges the electrically conductive portion in proximity to a more ice prone region of the spinner 1801. Additionally, in some embodiments the front facing arrangement may better accommodate space requirements by locating the magnet 1830, spinner rod 1832, and bearing 1833 away from other components such as, e.g., a pitch control mechanism (not shown).

Alternatively or additionally, as shown in FIG. 18D, a magnet 1830 may face away from the front of spinner 1801, such as toward propeller hub 1818 or propeller flange 1816. Further, the electrically conductive portion 1831 may be mounted to, or embedded in, propeller hub 1818 or propeller flange 1818. For example, a front view of an example propeller hub 1818 is shown at the bottom left in FIG. 18D, with electrically conductive portion 1831 comprising a flat disc or washer-shaped conductive sheet 1831*a* configured to generate eddy current heating as discussed above. Alternatively or additionally, as shown at the top left corner of FIG. 18D, electrically conductive portion 1831 may comprise a plurality of windings 1831*b*, arranged in a circle in the plane of propeller hub 1818, and configured to generate and drive an electric current through wiring path 1817.

Figure 18E:
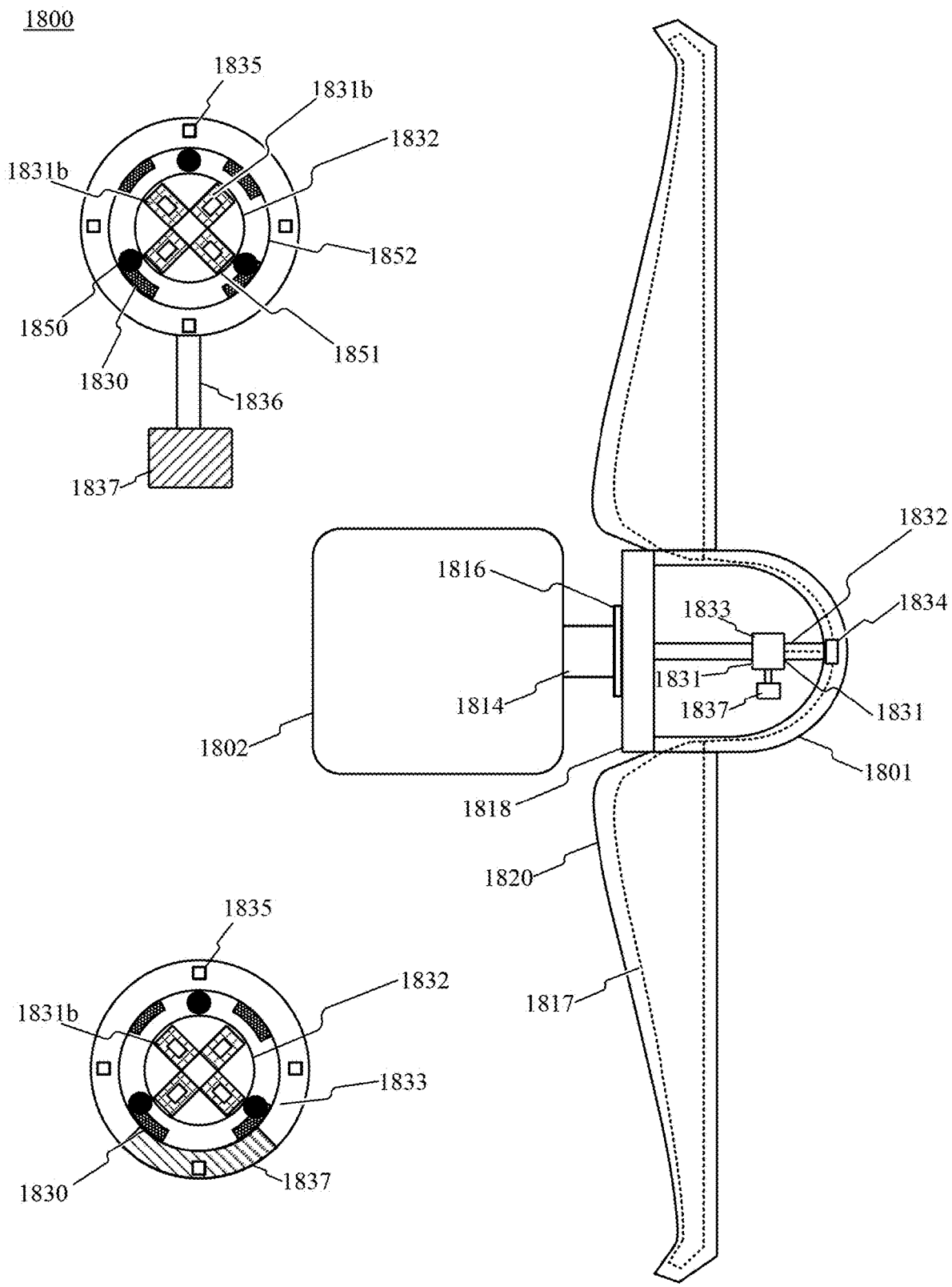

In some embodiments, magnet 1830 and electrically conductive portion 1831 may be integrated into, e.g., bearing 1833 and spinner rod 1832, respectively. For example, as shown in FIG. 18E, bearing 1833 (illustrated schematically at the top left corner of FIG. 18E as a sleeve surrounding three rollers) may comprise a plurality of magnets 1830 that are arranged around its inner surface to facing a plurality of windings 1831*b* as the electrically conductive portion 1831. The plurality of windings may be arranged on or within spinner rod 1832. A counterweight 1837 may be suspended from arm 1836 to maintain bearing 1833 and magnets 1830 in a stationary orientation with respect to the direction of gravity while spinner rod 1832 rotates. For example, a bearing 1833 may comprise rollers 1850 between an inner bearing surface 1851 (e.g., on an exterior of rod 1832) and an outer bearing surface 1852 (e.g., on an interior sleeve of bearing 1833). Thus a current may be induced in the windings and distributed throughout spinner 1801 or blades 1820 by wiring path 1817. In some embodiments, the length of arm 1836 may be optimized to increase a gravity-induced torque on the bearing 1833 and maintain it in the desired orientation. In some embodiments as seen at the lower left corner of FIG. 18E, the arm 1836 may be eliminated, and counterweight 1837 may be integrated within a housing of the bearing 1833 to create a mass imbalance that maintains the bearing 1833 and in the desired orientation. The configuration of FIG. 18E may allow for compact and efficient electricity generation without the need for any control architecture or electrical connections to the stationary parts of propeller assembly 1800.

Figure 18F:
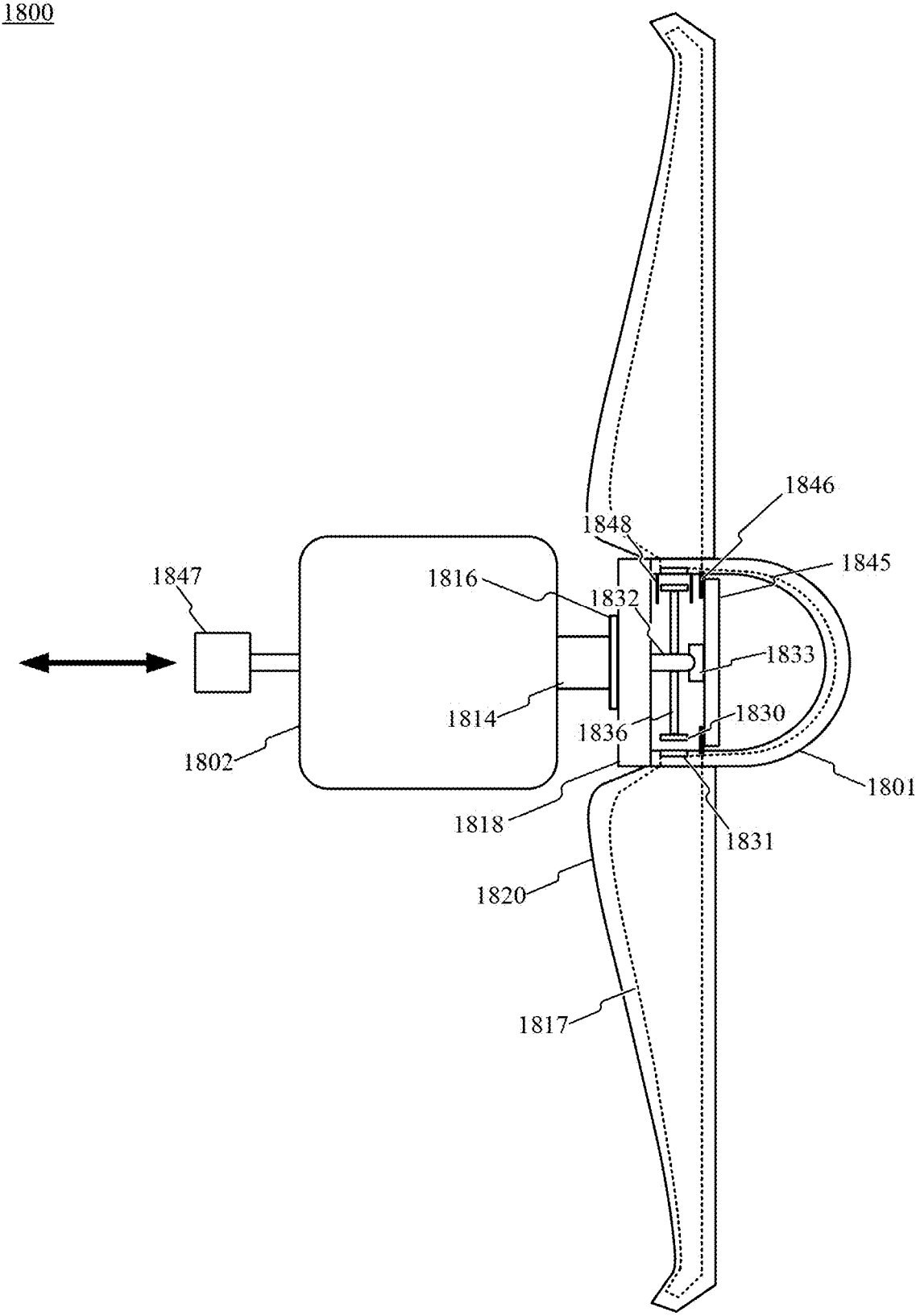

In some embodiments, as shown in FIG. 18F, spinner rod 1832 may be fixed to a stationary part of the propeller assembly or aircraft such that there is relative rotation between spinner rod 1832 and spinner 1801. For example, spinner rod 1832 may comprise a pitch control rod that passes through propeller shaft 1814. The pitch control rod 1832 may remain stationary with respect to a rotation direction about the axis of propeller shaft 1814, and may be linearly translatable along the propeller axis direction (as indicated by double arrows) to actuate a pitch control such as, e.g., a yoke or link 1845 and blade actuating pins 1846. For example, the pitch control rod 1832 may be linearly translated by, e.g., a pitch actuator 1847 on a stationary part of the propeller system or aircraft. While the yoke 1845 and blade actuating pins 1846 may rotate along with the other rotating parts of the propeller system, the pitch control rod 1832 may be rotationally isolated from yoke 1845 by bearing 1833, which in this case may comprise, e.g., a thrust bearing.

Magnet 1830 may be attached to pitch control rod 1832 by an arm 1836 in a similar manner as discussed above. However, in the embodiment of FIG. 18F, the arm may be rigidly coupled to pitch control rod 1832. Thus, in the configuration of FIG. 18F, the magnet 1830 and arm 1836 may not require gravity in order to remain fixed while the electrically conductive portion 1831 rotates around it. As such, it may be possible to secure a more stable configuration, and may allow for additional arms 1836 and magnets 1830 to be arranged symmetrically around spinner rod 1832. For example, a second magnet 1830 at the top in FIG. 18F may be positioned diametrically opposite to a first magnet 1830 shown at the bottom. In some embodiments, further magnets 1830 may be arrayed around the spinner rod 1832, such as, e.g., 3, 4, 5, 6, or any suitable number. This may not only increase the generation of heat or electricity, but may also provide for simpler balancing of the propeller system.

Alternatively or additionally, in some embodiments, one or more magnets 1830 or arms 1836 may be arranged symmetrically about the spinner rod 1832 by bearing 1833 as discussed above with respect to, e.g., FIG. 18A. For example, a further magnet 1830 may be arranged symmetrically opposite to the suspended magnet of FIG. 18A, or a plurality of two or more magnets may be arranged symmetrically around spinner rod 1832. In some embodiments, one or more magnets 1830 may be balanced by a counterweight, similar to counterweight 1837 as discussed above.

In some embodiments, to reduce the impact of the linear axial displacement that would occur between the magnets 1830 and electrically conductive portion 1831 during pitch control, at least one of the magnets 1830 or electrically conductive portion 1831 may be sized or positioned such that the magnets 1830 and electrically conductive portion 1831 are always in sufficient proximity throughout the full range of allowable blade pitch angles. In some embodiments, the sizing or placement of the magnets 1830 and electrically conductive portion 1831 may be optimized for a main pitch angle, or a range of pitch angles, that is expected to be used in the cruise orientation, during which ice management may be most important. In some embodiments, the arms 1836 and magnets 1831 may be linearly decoupled from pitch control rod 1832 by, e.g., a spline system (not shown) in order to maintain proximity of magnets 1830 to electrically conductive portion 1831. In such a case, for example, the magnets 1831 could be axially constrained by a groove or track 1848 that is coupled to a rotating portion of the propeller assembly such as, e.g., spinner 1801 or propeller hub 1818. The groove or track 1848 may allow the magnets 1830 to maintain relative rotational motion with electrically conductive portion 1831 by, e.g., bearings or other low friction guides (not shown).

Figure 18G:
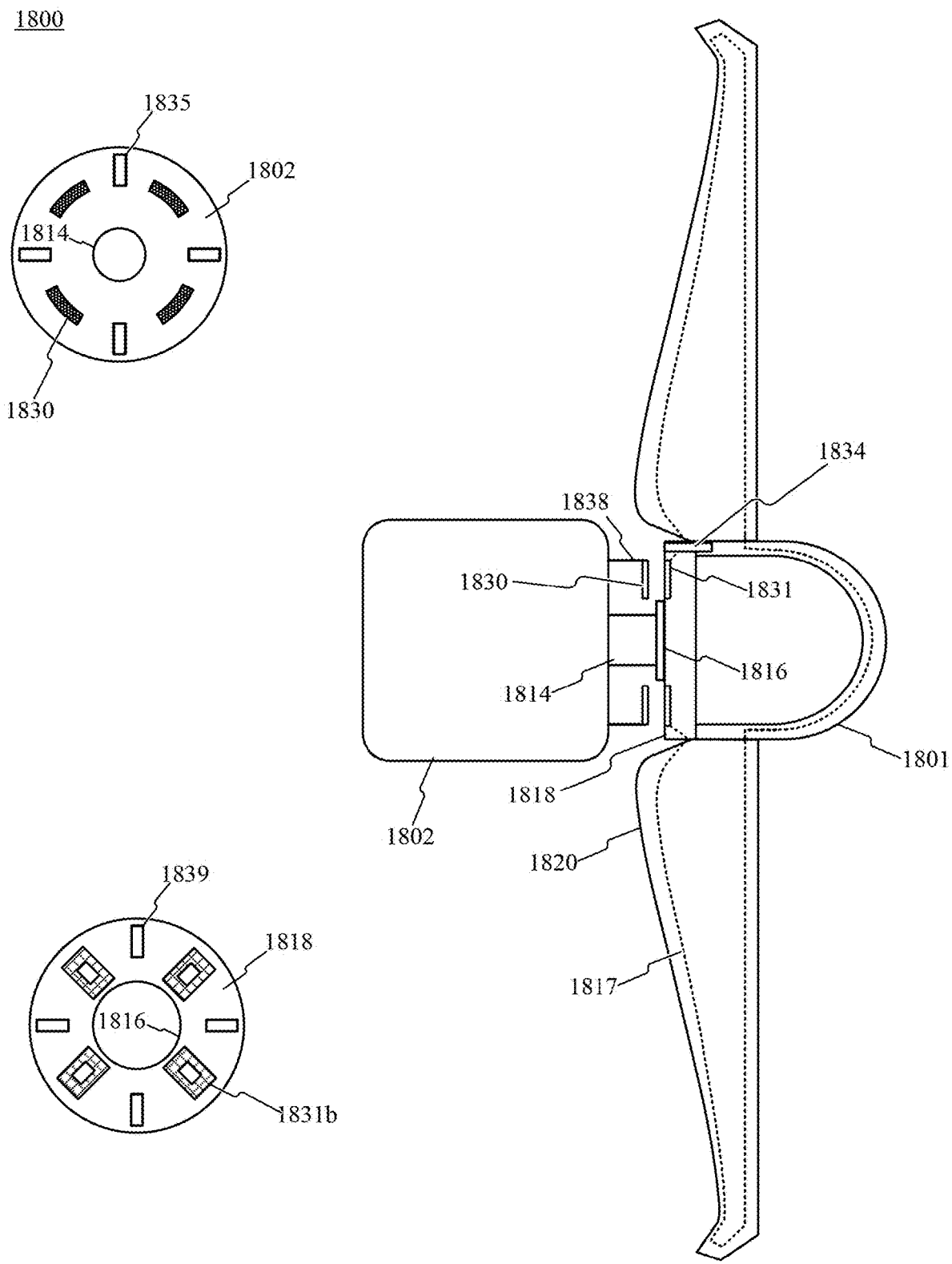

In some embodiments, magnets 1830 may be mounted to a stationary part of the propeller assembly or aircraft. For example, as shown in FIG. 18G, a plurality of magnets 1830 may be mounted to motor assembly 1802 and surrounding propeller shaft 1814. For example, magnets 1830 may be directly mounted on an exterior surface of motor assembly 1802, or may be spaced from the motor assembly 1802 on an extension such as, e.g., a cylindrical mount 1838. Cylindrical mount 1838 may space magnets 1830 further away from motor assembly 1802 and closer to the windings 1831b of electrically conductive portion 1831. This may achieve improved efficiency of current generation in view of the reduced gap between the magnets and windings. It may also prevent overheating and demagnetization of magnets 1830 by reduced thermal contact with motor assembly 1802. Alternatively or additionally, magnets 1830 may be mounted to another stationary component, such as a boom, nacelle, motor mount, etc. Electrically conductive portion may be mounted to, e.g., propeller hub 1818 and may comprise a plurality of windings surrounding propeller flange 1816. Alternatively or additionally, the electrically conductive portion may be mounted to another moving part of the propeller such as, e.g., propeller flange 1816 or propeller shaft 1814. Further as mentioned above, while the electrically conductive portion 1831 is illustrated as comprising a plurality of windings 1831b, embodiments of the present disclosure are not limited to this. For example, the electrically conductive portion 1831 may comprise a metal sheet 1831a configured to generate eddy current heating, such as that shown in FIG. 18D.

For example, the top left of FIG. 18G illustrates a motor assembly 1802 as viewed along an axis of propeller shaft 1814 from the propeller flange 1816 side. Magnets 1830 and magnetic field sensors 1835 may be arranged around a facing surface of motor assembly 1802 or another stationary component as discussed above. The bottom left of FIG. 18G illustrates a propeller flange 1816 as viewed along an axis of propeller shaft 1814 from the motor assembly 1802 side. Windings 1831b and auxiliary magnets 1839 may be arranged around a facing surface of propeller flange 1818 or another rotating component as discussed above. Auxiliary magnets may be configured to provide a reference magnetic field for magnetic field sensors 1835 to detect, allowing the magnetic field sensors to be located on the stationary side of propeller system 1800. This may enable direct rotary position detection without the need to wirelessly transmit power or signals.

Figure 18H:
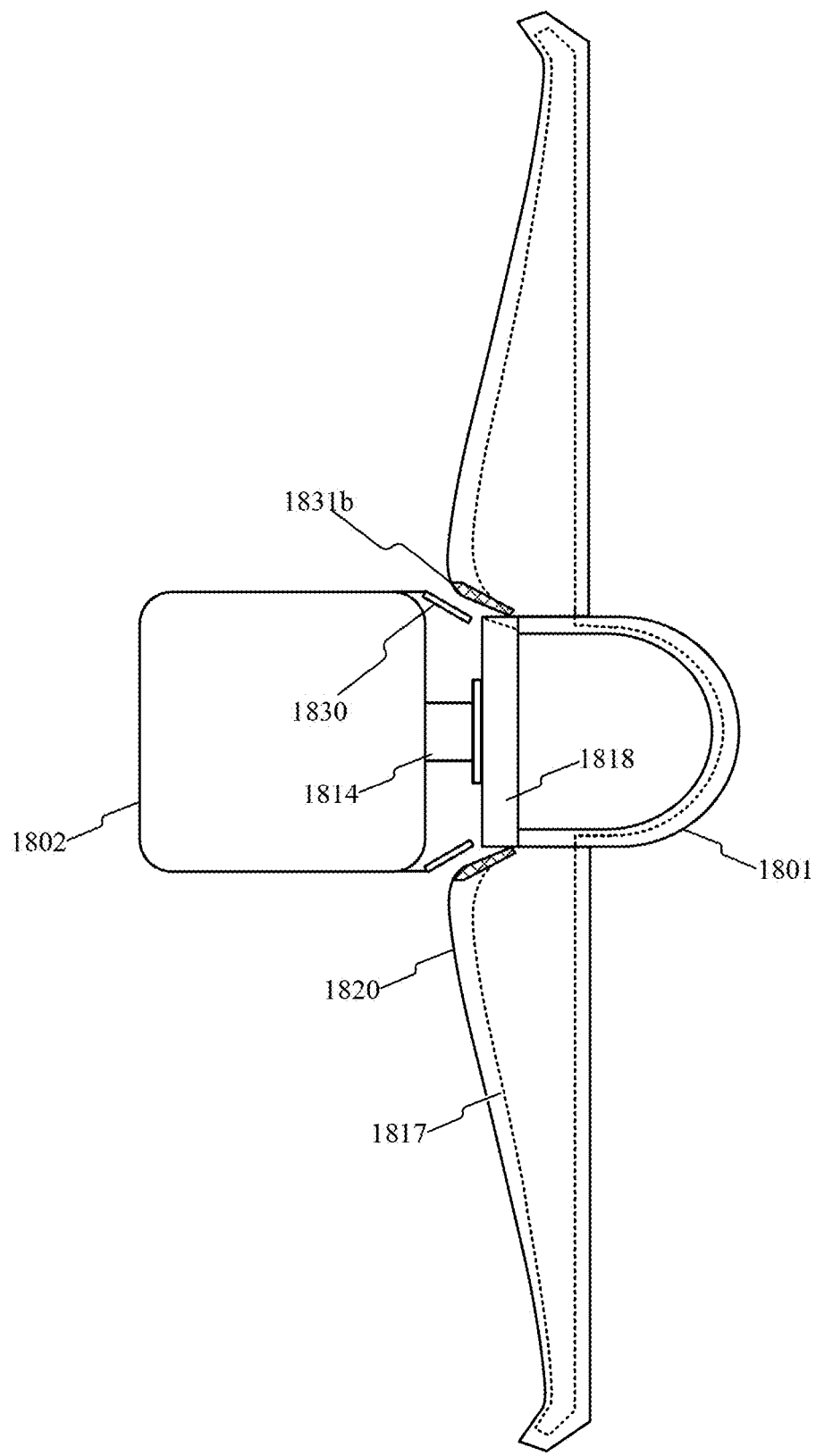
Figure 18I:
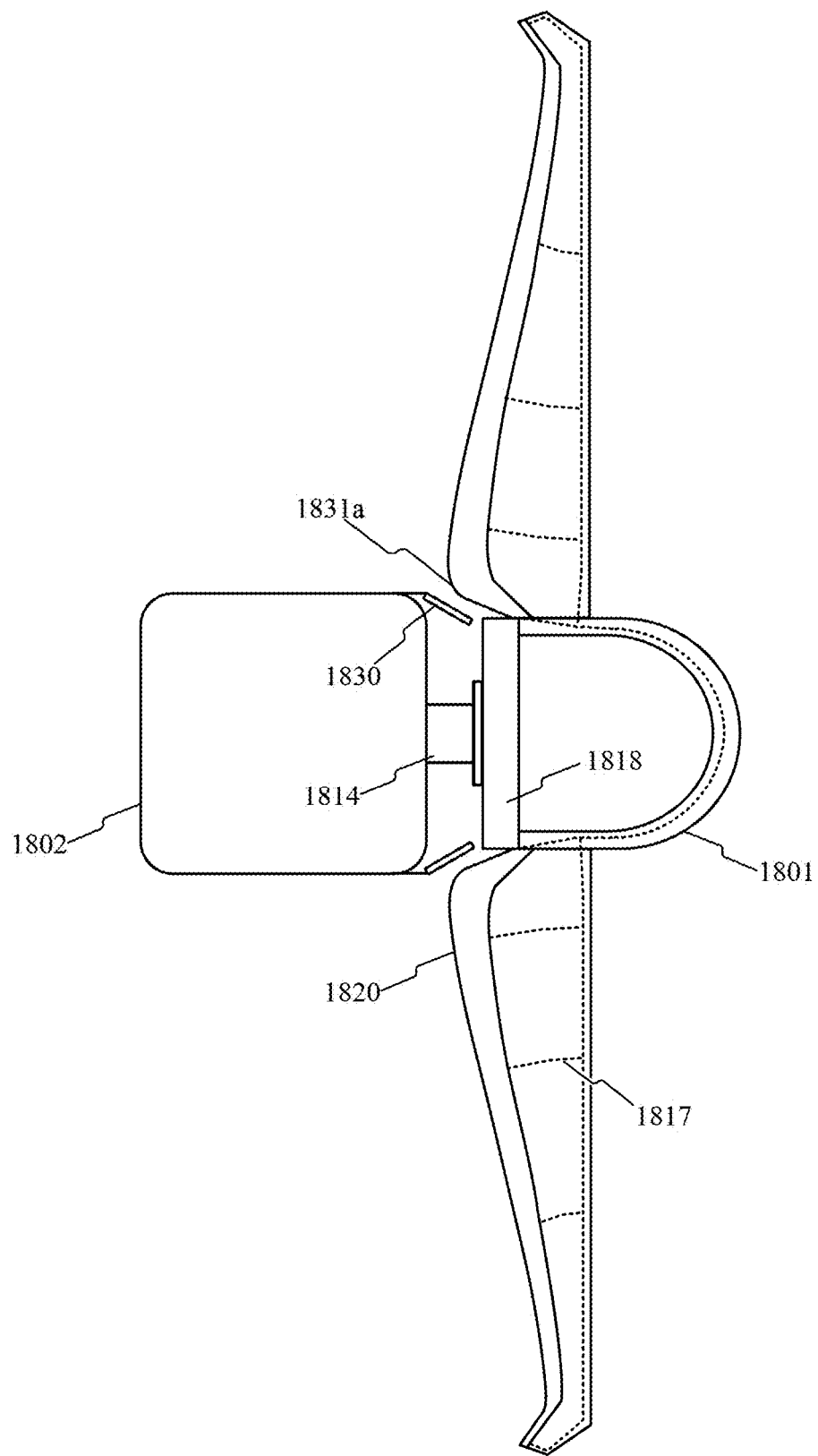

In some embodiments, magnets 1830 may be arranged to face electrically conductive portions 1831 that are located on other rotating parts of propeller assembly 1800 such as, e.g., on or within blades 1820. For example, as seen in FIGS. 18H and 18I, electrically conductive portions 1831 may be located at, e.g., a trailing edge of blades 1820 and arranged to face magnets 1830. In some embodiments, magnets 1830 may be mounted at an angle from the mounting surface to accommodate a contour of blades 1820. For example, as seen in FIG. 18H, electrically conductive portion 1831 may comprise, e.g., windings 1831b configured to drive an electric current through wiring paths 1817. By embedding windings directly into a propeller blade 1820, it may be possible to distribute heat more efficiently over each blade. At the same time, ice management for a spinner 1801 could be achieved by routing the wiring path 1817 through the spinner, or by utilizing another of the disclosed techniques to independently heat the spinner 1801.

Alternatively or additionally, as seen in FIG. 18I, the electrically conductive portion may comprise a metal sheet 1831a running along a length of blade 1820 and configured to generate eddy current heating in the blades 1820. Heat may then be distributed via wiring paths 1817 to other parts of the blades 1820 or to the spinner 1801. In some embodiments, the electrically conductive portion 1831 may serve multiple functions on blade 1820. For example, the electrically conductive portion may form part of a blade spar or other structural support frame. As illustrated in FIG. 18I, the electrically conductive portion may comprise part of a lightning ground path leading from the propeller to a frame of the aircraft. By designing the electrically conductive portion to serve multiple necessary functions, it may be possible to simplify the propeller design while reducing the weight and number of components.

Figure 18J:
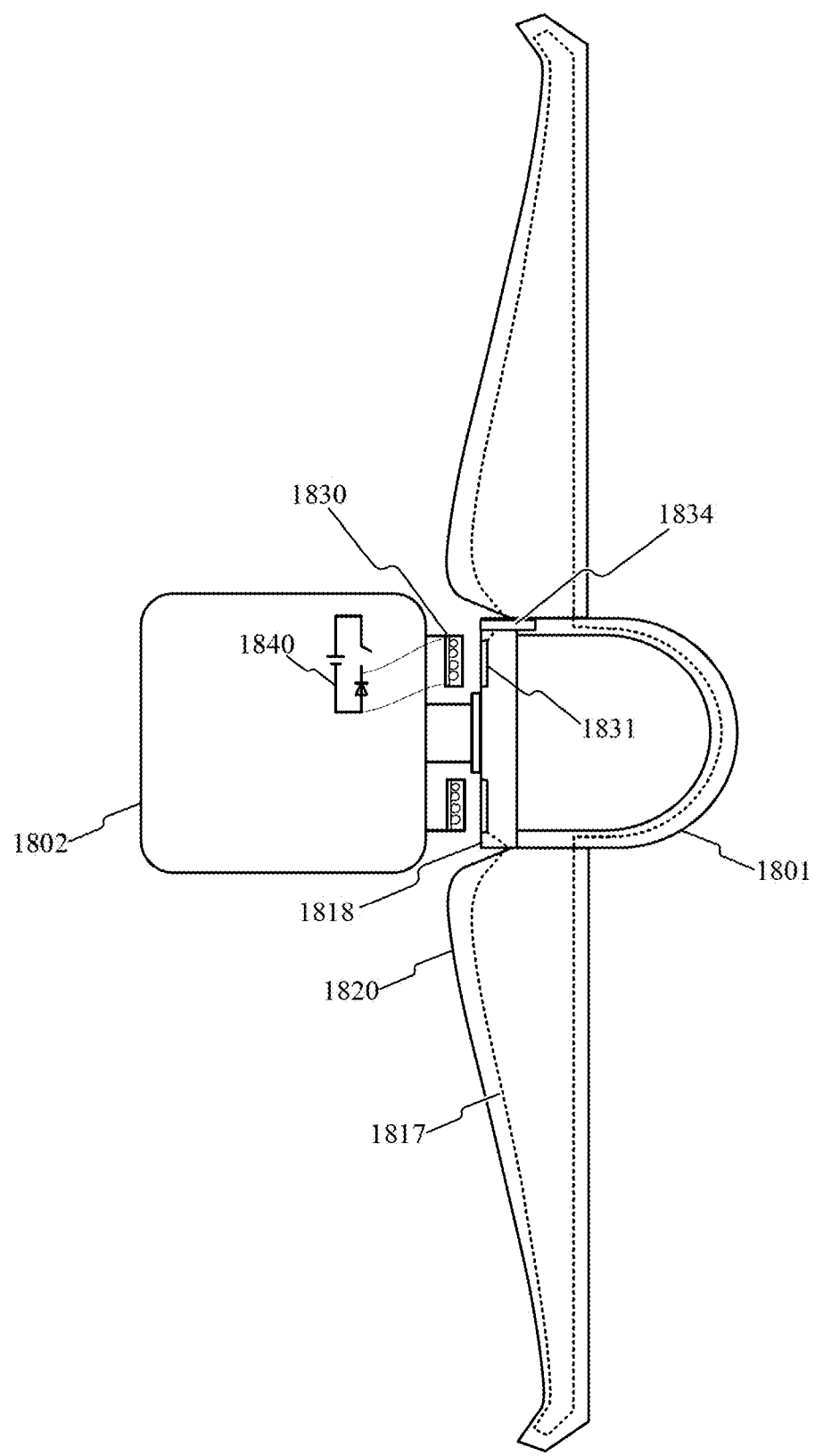
Figure 18K:
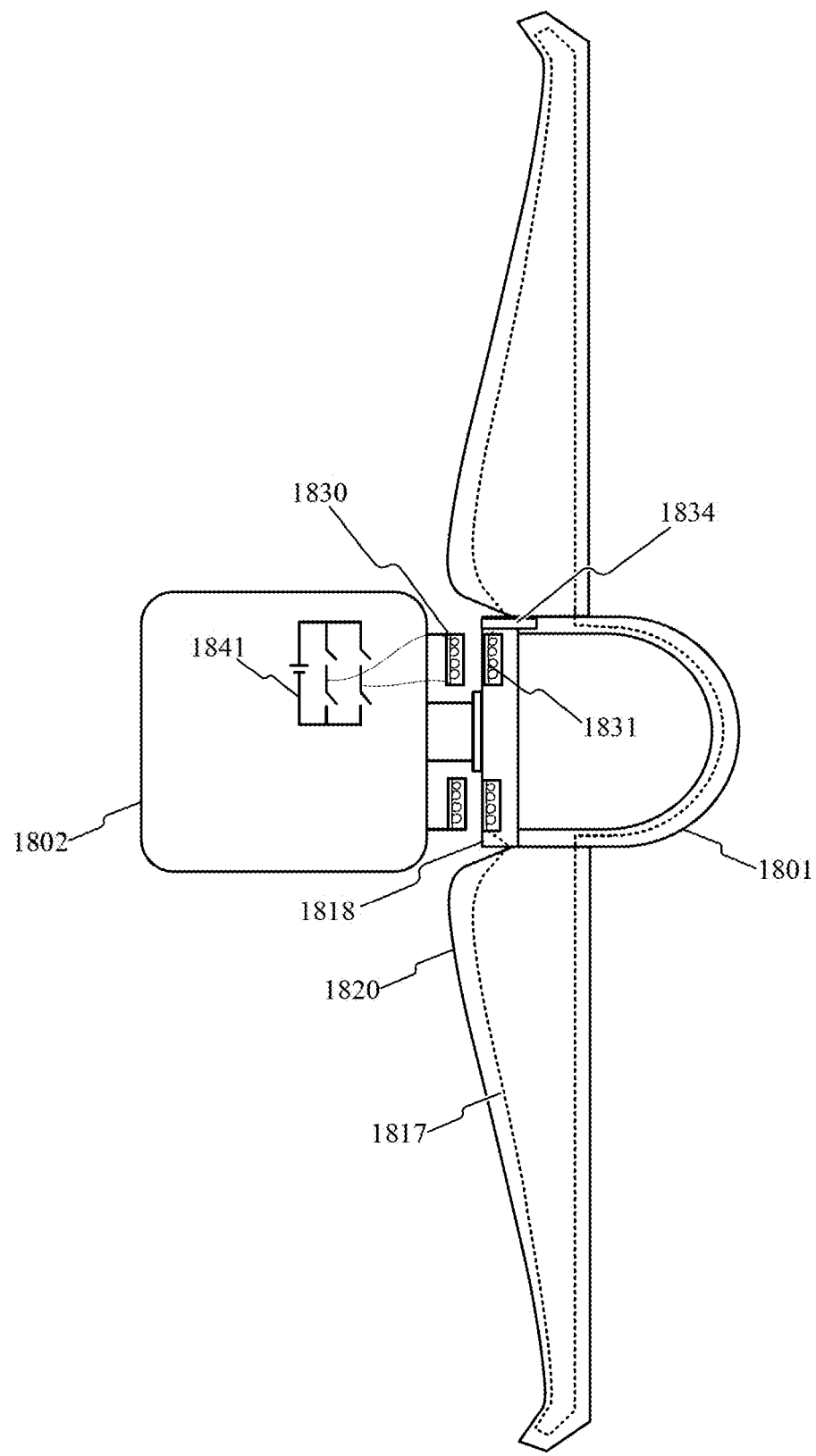

Further, while the magnets 1830 in the example embodiments of FIGS. 18A-18I have been described with respect to permanent magnets, embodiments of the present disclosure are not limited to this. In some embodiments, magnets 1830 in the above-described configurations may comprise electromagnets. For example, FIGS. 18J and 18K schematically illustrate example embodiments in which the magnets 1830 comprise electromagnets. The example configuration may correspond to, e.g., the configuration shown in FIG. 18G. In some embodiments, the electromagnets may comprise coils such as, e.g., air-core or iron-core coils, connected to a power supply. The power supply may comprise part of, e.g., motor assembly 1802, such as an inverter or a sub-control module (not shown).

In some embodiments, as illustrated in FIG. 18J, the coils may be connected to a DC power circuit 1840. For example, in some embodiments DC power circuit may comprise a buck converter circuit. The DC power circuit 1840 may approximate the magnetic field of a stationary permanent magnet. However, unlike the permanent magnets described above, electromagnet 1830 may be selectively operated only when it is needed, allowing the propeller to operate at optimal efficiency otherwise. Further, the magnitude of the magnetic field may be adjustable to produce a desired amount of heat.

However, a drawback of both the permanent magnets and DC powered electromagnets discussed above is that they may both require relative motion between the magnet 1830 and electrically conductive portion 1831 to generate eddy current heating or drive an electric current through wiring paths 1817. Therefore, in some embodiments, as seen in FIG. 18K, an electromagnet 1830 may comprise coils connected to an AC power circuit 1841. In some embodiments, the electrically conductive portion 1831 may comprise similar induction coils as illustrated, or may comprise windings or metal sheets as discussed previously. Because the AC power circuit generates a changing magnetic field, it may be possible to generate eddy current heating or induce a current even when the propeller is stationary. This may be advantageous for de-icing when, e.g., the aircraft is grounded. It may be particularly advantageous for use in lift propellers, which may be stowed motionless during cruise flight in icing conditions. AC power circuit 1841 may be configured to modulate both the amplitude and frequency of the magnetic field to adjust heating and current parameters.

A non-transitory computer-readable medium may be provided that stores instructions for one or more processors of a controller for performing ice management embodiments of the present disclosure. For example, the instructions stored in the non-transitory computer-readable medium may be executed by the circuitry of the controller for performing any of the above disclosed ice management processes in part or in entirety. Common forms of non-transitory media include, for example, a floppy disk, a flexible disk, hard disk, solid-state drive, magnetic tape, or any other magnetic data storage medium, a Compact Disc Read-Only Memory (CD-ROM), any other optical data storage medium, any physical medium with patterns of holes, a Random Access Memory (RAM), a Programmable Read-Only Memory (PROM), and Erasable Programmable Read-Only Memory (EPROM), a FLASH-EPROM or any other flash memory, Non-Volatile Random Access Memory (NVRAM), a cache, a register, any other memory chip or cartridge, and networked versions of the same. The one or more processors can include any combination of any number of a central processing unit (CPU), a graphics processing unit (GPU), a neural processing unit (NPU), a microcontroller unit (MCU), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, the one or more processors can also be a set of processors grouped as a single logical component.

Embodiments of the present disclosure may further be described with respect to the following clauses:

1. A flight control system for an aircraft, the flight control system comprising:
   a memory storing instructions; and
   a processor configured to execute the instructions to perform operations comprising:
   determining an icing condition based on an icing state input;
   determining the aircraft state based on one or more predefined flight parameters;
   determining a propeller modulation parameter based on the icing condition and the aircraft state;
   generating a plurality of effector commands corresponding to the propeller modulation parameter, wherein the plurality of effector commands is configured to induce a first ice management cycle in a first symmetric pair of propellers of the aircraft, and a second ice management cycle in a second symmetric pair of propellers of the aircraft, the first ice management cycle occurring at a first time interval that is different from a second time interval of the second ice management cycle.
2. The flight control system of clause 1, wherein the icing state input is based on a primary ice detector.
3. The flight control system of clause 1 or 2, wherein the icing state input is based on an input from the flight control system or from a pilot.
4. The flight control system of any of clauses 1 to 3, wherein the one or more predefined parameters comprises one of control margin status, current bank angle, load factor, vertical airspeed vs. commanded airspeed, altitude, propulsion system, signal integrity, or flight mode.
5. The flight control system of any of clauses 1 to 4, wherein the propeller modulation parameter comprises one of revolutions per minute (RPM), blade pitch angle, torque, or propeller tilt angle.
6. The flight control system of any of clauses 1 to 5, wherein the propeller modulation parameter comprises RPM, and the first ice management cycle comprises increasing an RPM of the first symmetric pair of propellers by at least 50 percent during the first time interval.
7. The flight control system of any of clauses 1 to 5, wherein the propeller modulation parameter comprises RPM, and the first ice management cycle comprises increasing an RPM of the first symmetric pair of propellers to at least 80 percent of a maximum RPM during the first time interval.
8. The flight control system of any of clauses 1 to 5, wherein the propeller modulation parameter comprises blade pitch angle, and the first ice management cycle comprises changing a blade pitch angle of the first symmetric pair of propellers by at least 5 degrees during the first time interval.
9. The flight control system of clause 8, wherein the first ice management cycle further comprises changing the blade pitch angle of the first symmetric pair of propellers by at least 5 degrees at least 4 times during the first time interval.
10. The flight control system of any of clauses 1 to 9, wherein the propeller modulation parameter comprises torque, and the first ice management cycle comprises changing a torque of the first symmetric pair of propellers by at least 50 percent during the first time interval.
11. The flight control system of any of clauses 1 to 9, wherein the propeller modulation parameter comprises torque, and the first ice management cycle comprises:
increasing a torque of the first symmetric pair of propellers to from an initial torque value to within 80 percent of a maximum torque, and decreasing the torque of the first symmetric pair of propellers to the initial torque during the first time interval.
12. The flight control system of any of clauses 1 to 11, wherein the propeller modulation parameter comprises propeller tilt angle, and the first ice management cycle comprises changing a propeller tilt angle of the first symmetric pair of propellers by at least 10 degrees during the first time interval.
13. The flight control system of any of clauses 1 to 5 or 8 to 12, wherein the propeller modulation parameter comprises RPM, and the first ice management cycle comprises increasing a first RPM of the first symmetric pair of propellers to at least 80 percent of a second RPM of the second symmetric pair of propellers during the first time interval.
14. The flight control system of clause 13, wherein the first ice management cycle further comprises decreasing the second RPM of the second symmetric pair of propellers during the first time interval to compensate an increased RPM of the first symmetric pair of propellers.
15. The flight control system of clause 13 or 14, wherein:
the second ice management cycle comprises increasing the second RPM of the second symmetric pair of propellers to at least 80 percent of the first RPM of the first symmetric pair of propellers during the second time interval.
16. The flight control system of any of clauses 13 to 15, wherein the second ice management cycle further comprises decreasing the first RPM of the first symmetric pair of propellers during the second time interval to compensate an increased RPM of the second symmetric pair of propellers.
17. The flight control system of any of clauses 1 to 7 or 10 to 16, wherein the propeller modulation parameter comprises blade pitch angle, and the first ice management cycle comprises changing a first blade pitch angle of the first symmetric pair of propellers by at least 5 degrees with respect to a second blade pitch angle of the second symmetric pair of propellers during the first time interval.
18. The flight control system of clause 17, wherein the first ice management cycle further comprises increasing a second RPM of the second symmetric pair of propellers during the first time interval.
19. The flight control system of clause 17 or 18, wherein the second ice management cycle comprises changing a second blade pitch angle of the second symmetric pair of propellers by at least 5 degrees with respect to the first blade pitch angle of the first symmetric pair of propellers during the second time interval.
20. The flight control system of any of clauses 1 to 9 or 12 to 19, wherein the propeller modulation parameter comprises torque, and the first ice management cycle comprises increasing a torque of the first symmetric pair of propellers from an initial torque value to a first torque value and decreasing the torque of the first symmetric pair of propellers from the first torque value to a second torque value.
21. The flight control system of clause 20, wherein the first torque value is within 80 percent of a maximum torque value of the first symmetric pair of propellers.
22. The flight control system of clause 20 or 21, wherein the second torque value is less than 50 percent of the initial torque value of the first symmetric pair of propellers.
23. The flight control system of any of clauses 20 to 22, wherein the first ice management cycle further comprises increasing a second RPM of the second symmetric pair of propellers during the first time interval.
24. The flight control system of any of clauses 1 to 23, wherein the propeller modulation parameter comprises propeller tilt angle, and the first ice management cycle comprises changing a propeller tilt angle of the first symmetric pair of propellers by at least 10 degrees.
25. The flight control system of clause 24, wherein the first ice management cycle further comprises increasing a second RPM of the second symmetric pair of propellers during the first time interval.
26. The flight control system of any of clauses 1 to 25, wherein the first symmetric pair of propellers comprises a first outermost propeller from a first side of a body of the aircraft and a second outermost propeller from a second side of the body of the aircraft.
27. The flight control system of clause 26, wherein the second symmetric pair of propellers comprises a third propeller inward of the first propeller on the first side of the body of the aircraft and a fourth propeller inward of the second propeller on the second side of the body of the aircraft.
28. The flight control system of clause 27, wherein the plurality of effector commands is further configured to induce a third ice management cycle in a third symmetric pair of propellers of the aircraft, the third ice management cycle occurring at a third time interval, the third time interval being different from the first time interval and the second time interval.
29. The flight control system of clause 28, wherein the third symmetric pair of propellers comprises a fifth propeller between the first propeller and the third propeller on the first side of the body of the aircraft and a sixth propeller between the second propeller and the fourth propeller on the second side of the body of the aircraft.
30. The flight control system of any of clauses 1 to 29, wherein the flight control system is configured to generate the plurality of effector commands at repeating time intervals.
31. The flight control system of any of clauses 1 to 30, wherein the plurality of effector commands is configured to induce the first ice management cycle and the second ice management cycle in non-overlapping time intervals.
32. The flight control system of any of clauses 1 to 31, wherein the first symmetric pair of propellers and the second symmetric pair of propellers comprise pairs of tilt propellers.
33. The flight control system of any of clauses 1 to 32, wherein the first ice management cycle further comprises:
rotating a symmetric pair of lift propellers between a first angular position and a second angular position, the first angular position being offset from the second angular position by a multiple of 30 degrees.
34. The flight control system of clause 33, wherein each lift propeller of the symmetric pair of lift propellers is located behind a corresponding tilt propeller of the first symmetric pair of tilt propellers in a forward flight direction.
35. The flight control system of clause 33 or 34, wherein each lift propeller of the symmetric pair of lift propellers is located farther from a body of the aircraft than a corresponding tilt propeller of the first symmetric pair of tilt propellers.
36. The flight control system of any of clauses 32 to 35, wherein each lift propeller of the symmetric pair of lift propellers is located closer to a body of the aircraft than a corresponding tilt propeller of the first symmetric pair of tilt propellers.
37. The flight control system of any of clauses 1 to 31, wherein the first symmetric pair of propellers and the second symmetric pair of propellers comprise pairs of lift propellers.
38. The flight control system of clause 37, wherein the first ice management cycle comprises: rotating the first symmetric pair of propellers between a first angular position and a second angular position, the first angular position being offset from the second angular position by a multiple of 30 degrees.
39. The flight control system of clause 38, wherein rotating the first symmetric pair of propellers comprises rotating a first lift propeller of the first symmetric pair of propellers in an opposite direction from a second lift propeller of the first symmetric pair of propellers.
40. The flight control system of any of clauses 1 to 39, wherein the plurality of effector commands is configured to perform the first ice management cycle at periodic intervals based on a predetermined schedule to manage asymmetric ice accretion.

41. The flight control system of any of clauses 1 to 40, wherein the flight control system is configured to generate the plurality of effector commands at periodic intervals to manage asymmetric ice accretion.

42. A propeller assembly for an aircraft, comprising:
a propeller;
a motor assembly coupled to the propeller;
a heat exchanger;
an oil flow path configured to thermally couple the heat exchanger to the motor assembly, the oil flow path comprising a first segment, a second segment, and a third segment; and
a nacelle mechanically coupled to the motor assembly, the nacelle comprising an air inlet configured to direct air into the heat exchanger, the air inlet comprising a lower lip with respect to a forward flight configuration and an upper lip opposite the lower lip, the lower lip being farther from the motor assembly than the upper lip,
wherein:
the first segment passes through motor assembly;
the second segment passes through the heat exchanger;
the third segment passes along the lower lip, and
the oil flow path bypasses the upper lip.

43. The propeller assembly of clause 42, further comprising:
a thermally conductive material between the motor assembly and the upper lip, the thermally conductive material being configured to conduct heat from the motor assembly to the upper lip.

44. The propeller assembly of clause 43, wherein:
the nacelle comprises a first material;
the thermally conductive material comprises a second material different from the first material, and
the second material has a higher coefficient of thermal conductivity than the first material.

45. The propeller assembly of clause 43 or 44, wherein the thermally conductive material extends along two lateral sides of the air inlet between the upper lip and the lower lip.

46. The propeller assembly of any of clauses 43 to 45, wherein the thermally conductive material extends from inside the motor assembly to outside the motor assembly.

47. The propeller assembly of clause 46, wherein the thermally conductive material comprises a plate extending from inside the motor assembly to outside the motor assembly.

48. The propeller assembly of any of clauses 43 to 47, wherein the thermally conductive material wraps around the motor assembly.

49. The propeller assembly of any of clauses 42 to 48, wherein the third segment branches out of the second segment in an oil flow direction and returns to the second segment in the oil flow direction.

50. The propeller assembly of clause 49, wherein the first segment feeds into the second segment in the oil flow direction and returns from the second segment in the oil flow direction.

51. The propeller assembly of any of clauses 42 to 50, further comprising a first flow control valve configured to regulate an oil flow rate through the third segment.

52. The propeller assembly of clause 51, wherein the first flow control valve is configured to selectively shut off an oil flow to or from the third segment.

53. The propeller assembly of clause 51 or 52, further comprising a second flow control valve, wherein the first flow control valve is located at an inlet side of the third segment, and the second flow control valve is located at an outlet side of the third segment.

54. The propeller assembly of any of clauses 42 to 53, wherein the third segment runs along a lower surface of the nacelle with respect to a forward flight configuration.

55. The propeller assembly of any of clauses 42 to 54, wherein the third segment branches out of the first segment in an oil flow direction at a first segment exit point.

56. The propeller assembly of clause 55, wherein the third segment feeds into the second segment in the oil flow direction.

57. The propeller assembly of clause 55 or 56, wherein the third segment returns to the first segment in the oil flow direction at a first segment entry point, the first segment entry point being downstream in the oil flow direction of the first segment exit point.

58. The propeller assembly of clause 57, wherein the first segment entry point is upstream of the second segment in the oil flow direction.

59. The propeller assembly of clause 57, wherein the first segment entry point is downstream of the second segment in the oil flow direction.

60. The propeller assembly of any of clauses 42 to 59, wherein the third segment is connected in series within the first segment.

61. The propeller assembly of any of clauses 42 to 60, wherein a first portion of the first segment feeds into the third segment, and the third segment feeds into a second portion of the first segment.

62. The propeller assembly of any of clauses 42 to 61, wherein a first portion of the first segment feeds into the third segment, and the third segment feeds into a second portion of the first segment.

63. A vertical takeoff and landing aircraft comprising the propeller assembly of any of clauses 42 to 62, wherein:
the propeller, motor assembly, heat exchanger, and nacelle are configured to tilt with respect to a frame of the vertical takeoff and landing aircraft between a lift configuration and a cruise configuration.

64. A propeller assembly for an aircraft, comprising:
a propeller;
a motor assembly coupled to the propeller;
a heat exchanger;
an oil flow path configured to thermally couple the heat exchanger to the motor assembly, the oil flow path comprising a first segment and a second segment;
a nacelle mechanically coupled to the motor assembly, the nacelle comprising an air inlet configured to direct air into the heat exchanger, the air inlet comprising a lower lip with respect to a forward flight configuration and an upper lip opposite the lower lip, the lower lip being farther from the motor assembly than the upper lip, and
a heat pipe circuit configured to collect heat from a heat source and discharge the heat to the lower lip, wherein:
the first segment passes through motor assembly, and the second segment passes through the heat exchanger.

65. The propeller assembly of clause 64, wherein the heat source comprises the motor assembly.

66. The propeller assembly of clause 64 or 65, wherein the heat source comprises a thermally conductive material between the motor assembly and the nacelle.

67. The propeller assembly of any of clauses 64 to 66, wherein the heat source comprises the heat exchanger.
68. A propeller assembly for an aircraft, comprising:
a propeller;
a motor assembly coupled to the propeller;
a heat exchanger;
an oil flow path configured to thermally couple the heat exchanger to the motor assembly, the oil flow path passing through the motor assembly and the heat exchanger;
a nacelle mechanically coupled to the motor assembly, the nacelle comprising an air inlet;
wherein the heat exchanger is arranged at the air inlet.
69. A propeller assembly for an aircraft, comprising:
a propeller hub;
a propeller blade coupled to the propeller hub;
a spinner coupled to the propeller hub;
a spinner rod coupled to the propeller hub;
an electrically conductive portion;
a motor configured to rotate the propeller hub, the propeller blade, the spinner, the spinner rod, and the electrically conductive portion; and
a magnet suspended from the spinner rod, the magnet being rotationally decoupled from the spinner rod by a bearing;
wherein the magnet is configured to generate a current in the electrically conductive portion when the propeller rotates to manage ice accretion on a surface of the propeller assembly.
70. The propeller assembly of clause 69, wherein:
the electrically conductive portion comprises a metal sheet; and
the current comprises an eddy current for generating heat in the electrically conductive portion.
71. The propeller assembly of clauses 69 or 70, wherein:
the electrically conductive portion comprises a winding; and
the current generates a flow of electricity in the electrically conductive portion.
72. The propeller assembly of any of clauses 69 to 71, wherein the electrically conductive portion is located at a lateral side portion of the spinner.
73. The propeller assembly of any of clauses 69 to 72, wherein the electrically conductive portion is located at a front portion of the spinner.
74. The propeller assembly of any of clauses 69 to 73, wherein the electrically conductive portion is located at the propeller hub.
75. The propeller assembly of any of clauses 69 to 74, further comprising:
a wiring path configured to conduct one of heat or electricity from the electrically conductive portion to at least one of the spinner or the propeller blade.
76. The propeller assembly of clause 75, further comprising a switch configured to enable or disable a connection between the electrically conductive portion and the wiring path.
77. The propeller assembly of clause 76, wherein the switch comprises a thermostatic switch configured to disable the switch when a temperature at the switch reaches a predetermined temperature.
78. The propeller assembly of clause 76, wherein the switch is configured to be controlled using wireless communication.
79. The propeller assembly of clause 76, wherein the switch is configured to be powered by the current generated in the electrically conductive portion.
80. The propeller assembly of any of clauses 69 to 79, further comprising:
a magnetic field sensor configured to detect a magnetic flux of the magnet and transmit a signal to the motor based on the detection.
81. The propeller assembly of clause 80, wherein a controller of the motor is configured to determine a rotational position of the propeller assembly based on the signal.
82. The propeller assembly of any of clauses 69 to 81, further comprising a further magnet coupled to the bearing and arranged symmetrically opposite to the magnet with respect to the spinner rod.
83. The propeller assembly of any of clauses 69 to 82, further comprising a plurality of magnets arranged symmetrically about the spinner rod.
84. The propeller assembly of any of clauses 69 to 83, further comprising a counterweight configured to balance the magnet suspended from the spinner rod.
85. A propeller assembly for an aircraft, comprising:
a propeller hub;
a propeller blade coupled to the propeller hub;
a spinner coupled to the propeller hub;
a spinner rod coupled to the propeller hub;
an electrically conductive portion coupled to the spinner rod;
a bearing surrounding the spinner rod and configured to support an array of magnets around the electrically conductive portion; and
a motor configured to rotate the propeller hub, the propeller blade, the spinner, the spinner rod, and the electrically conductive portion;
wherein the array of magnets is configured to generate a current in the electrically conductive portion when the propeller rotates to manage ice accretion on a surface of the propeller assembly.
86. The propeller assembly of clause 85, further comprising a counterweight configured to maintain an orientation of the bearing with respect to a direction of gravity.
87. A propeller assembly for an aircraft, comprising:
a rotating portion comprising:
a propeller hub;
a propeller blade coupled to the propeller hub;
a spinner coupled to the propeller hub; and
an electrically conductive portion;
a motor configured to rotate the rotating portion; and
a magnet configured to remain stationary with respect to the motor;
wherein the magnet is configured to generate a current in the electrically conductive portion when the rotating portion rotates to manage ice accretion on a surface of the rotating portion.
88. The propeller assembly of clause 87, wherein:
the electrically conductive portion comprises a metal sheet; and
the current comprises an eddy current for generating heat in the electrically conductive portion.
89. The propeller assembly of clauses 87 or 88, wherein:
the electrically conductive portion comprises a winding; and
the current generates a flow of electricity in the electrically conductive portion.
90. The propeller assembly of any of clauses 87 to 89, wherein the electrically conductive portion is located at the propeller hub or a propeller flange coupled to the propeller hub.

91. The propeller assembly of any of clauses 87 to 90, wherein the electrically conductive portion is located at the propeller blade.
92. The propeller assembly of any of clauses 87 to 91, wherein the electrically conductive portion comprises a structural support of the propeller blade.
93. The propeller assembly of any of clauses 87 to 92, wherein the electrically conductive portion comprises a lightning ground path of the propeller blade.
94. The propeller assembly of any of clauses 87 to 93, further comprising:
a wiring path configured to conduct one of heat or electricity from the electrically conductive portion to at least one of the spinner or the propeller blade.
95. The propeller assembly of clause 94, further comprising a switch configured to enable or disable a connection between the electrically conductive portion and the wiring path.
96. The propeller assembly of clause 95, wherein the switch comprises a thermostatic switch configured to disable the switch when a temperature at the switch reaches a predetermined temperature.
97. The propeller assembly of clause 95, wherein the switch is configured to be controlled using wireless communication.
98. The propeller assembly of clause 97, wherein the switch is configured to be powered by the current generated in the electrically conductive portion.
99. The propeller assembly of any of clauses 87 to 98, further comprising:
a magnetic field sensor configured to detect a magnetic flux of the magnet and transmit a signal to the motor based on the detection.
100. The propeller assembly of clause 99, wherein a controller of the motor is configured to determine a rotational position of the propeller assembly based on the signal.
101. The propeller assembly of any of clauses 87 to 100, wherein the magnet comprises a permanent magnet.
102. The propeller assembly of any of clauses 87 to 101, wherein the magnet comprises an electromagnet.
103. The propeller assembly of clause 102, further comprising a DC power circuit configured to provide DC power to the electromagnet.
104. The propeller assembly of clause 102, further comprising an AC power circuit configured to provide AC power to the electromagnet.
105. The propeller assembly of any of clauses 87 to 104, wherein:
the rotating portion further comprises a propeller shaft coupled to the propeller hub and configured to be rotated by the motor;
further comprising a spinner rod configured to pass through the propeller shaft and being rotationally decoupled from the propeller shaft;
wherein the magnet comprises a first magnet mechanically coupled to the spinner rod.
106. The propeller assembly of clause 105, further comprising a second magnet mechanically coupled to the spinner rod at a position that is diametrically opposite to the first magnet with respect to the spinner rod.
107. The propeller assembly of clause 105 or 106, further comprising:
a pitch control, wherein the spinner rod comprises a pitch control rod configured to actuate the pitch control.
108. The propeller assembly of clause 107, wherein the spinner rod is rotationally decoupled from the pitch control by a bearing.
109. The propeller assembly of clause 107 or 108, wherein the pitch control comprises a yoke and a blade actuating pin.
110. A method of managing ice accretions on an aircraft, the method comprising:
determining an icing condition of the aircraft;
performing a propeller modulation based on the icing condition, wherein performing the propeller modulation comprises:
inducing a first ice management cycle in a first symmetric pair of propellers of the aircraft,
inducing a second ice management cycle in a second symmetric pair of propellers of the aircraft, the first ice management cycle occurring at a first time interval that is different from a second time interval of the second ice management cycle.
111. The method of clause 110, wherein determining the icing condition is based on a primary ice detector.
112. The method of clause 110 or 111, wherein determining the icing condition is based on an input from a flight control system or from a pilot, the input indicating an icing condition exists.
113. The method of any of clauses 110 to 112, further comprising:
determining an aircraft state, and
performing the propeller modulation when the aircraft state meets one or more predefined parameters.
114. The method of clause 113, wherein the one or more predefined parameters comprises one of control margin status, current bank angle, load factor, vertical airspeed vs. commanded airspeed, altitude, propulsion system, signal integrity, or flight mode.
115. The method of any of clauses 110 to 114, wherein the propeller modulation comprises modulating at least one of revolutions per minute (RPM), blade pitch angle, torque, or propeller tilt angle.
116. The method of any of clauses 110 to 115, wherein the propeller modulation comprises modulating RPM, and the first ice management cycle comprises increasing an RPM of the first symmetric pair of propellers by at least 50 percent during the first time interval.
117. The method of any of clauses 110 to 115, wherein the propeller modulation comprises modulating RPM, and the first ice management cycle comprises increasing an RPM of the first symmetric pair of propellers to at least 80 percent of a maximum RPM during the first time interval.
118. The method of any of clauses 110 to 115, wherein the propeller modulation comprises modulating blade pitch angle, and the first ice management cycle comprises changing a blade pitch angle of the first symmetric pair of propellers by at least 5 degrees during the first time interval.
119. The method of clause 118, wherein the first ice management cycle further comprises changing the blade pitch angle of the first symmetric pair of propellers by at least 5 degrees at least 4 times during the first time interval.
120. The method of any of clauses 110 to 119, wherein the propeller modulation comprises modulating torque, and the first ice management cycle comprises changing a torque of the first symmetric pair of propellers by at least 50 percent during the first time interval.

121. The method of any of clauses 110 to 119, wherein the propeller modulation comprises modulating torque, and the first ice management cycle comprises:
increasing a torque of the first symmetric pair of propellers to from an initial torque value to within 80 percent of a maximum torque, and decreasing the torque of the first symmetric pair of propellers to the initial torque during the first time interval.

122. The method of any of clauses 110 to 121, wherein the propeller modulation comprises modulating propeller tilt angle, and the first ice management cycle comprises changing a propeller tilt angle of the first symmetric pair of propellers by at least 10 degrees during the first time interval.

123. The method of any of clauses 110 to 115 or 118 to 122, wherein the propeller modulation comprises modulating RPM, and the first ice management cycle comprises increasing a first RPM of the first symmetric pair of propellers to at least 80 percent of a second RPM of the second symmetric pair of propellers during the first time interval.

124. The method of clause 123, wherein the first ice management cycle further comprises decreasing the second RPM of the second symmetric pair of propellers during the first time interval to compensate an increased RPM of the first symmetric pair of propellers.

125. The method of clause 123 or 124, wherein: the second ice management cycle comprises increasing the second RPM of the second symmetric pair of propellers to at least 80 percent of the first RPM of the first symmetric pair of propellers during the second time interval.

126. The method of any of clauses 123 to 125, wherein the second ice management cycle further comprises decreasing the first RPM of the first symmetric pair of propellers during the second time interval to compensate an increased RPM of the second symmetric pair of propellers.

127. The method of any of clauses 110 to 117 or 120 to 126, wherein the propeller modulation comprises modulating blade pitch angle, and the first ice management cycle comprises changing a first blade pitch angle of the first symmetric pair of propellers by at least 5 degrees with respect to a second blade pitch angle of the second symmetric pair of propellers during the first time interval.

128. The method of clause 127, wherein the first ice management cycle further comprises increasing a second RPM of the second symmetric pair of propellers during the first time interval.

129. The method of clause 127 or 128, wherein the second ice management cycle comprises changing a second blade pitch angle of the second symmetric pair of propellers by at least 5 degrees with respect to the first blade pitch angle of the first symmetric pair of propellers during the second time interval.

130. The method of any of clauses 110 to 119 or 122 to 129, wherein the propeller modulation comprises modulating torque, and the first ice management cycle comprises increasing a torque of the first symmetric pair of propellers from an initial torque value to a first torque value and decreasing the torque of the first symmetric pair of propellers from the first torque value to a second torque value.

131. The method of clause 130, wherein the first torque value is within 80 percent of a maximum torque value of the first symmetric pair of propellers.

132. The method of clause 130 or 131, wherein the second torque value is less than 50 percent of the initial torque value of the first symmetric pair of propellers.

133. The method of any of clauses 130 to 132, wherein the first ice management cycle further comprises increasing a second RPM of the second symmetric pair of propellers during the first time interval.

134. The method of any of clauses 110 to 133, wherein the propeller modulation comprises modulating propeller tilt angle, and the first ice management cycle comprises changing a propeller tilt angle of the first symmetric pair of propellers by at least 10 degrees.

135. The method of clause 134, wherein the first ice management cycle further comprises increasing a second RPM of the second symmetric pair of propellers during the first time interval.

136. The method of any of clauses 110 to 135, wherein the first symmetric pair of propellers comprises a first outermost propeller from a first side of a body of the aircraft and a second outermost propeller from a second side of the body of the aircraft.

137. The method of clause 136, wherein the second symmetric pair of propellers comprises a third propeller inward of the first propeller on the first side of the body of the aircraft and a fourth propeller inward of the second propeller on the second side of the body of the aircraft.

138. The method of clause 137, wherein performing the propeller modulation comprises inducing a third ice management cycle in a third symmetric pair of propellers of the aircraft, the third ice management cycle occurring at a third time interval, the third time interval being different from the first time interval and the second time interval.

139. The method of clause 138, wherein the third symmetric pair of propellers comprises a fifth propeller between the first propeller and the third propeller on the first side of the body of the aircraft and a sixth propeller between the second propeller and the fourth propeller on the second side of the body of the aircraft.

140. The method of any of clauses 110 to 139, further comprising performing the propeller modulation at repeating time intervals.

141. The method of any of clauses 110 to 140, wherein performing the propeller modulation comprises inducing the first ice management cycle and the second ice management cycle in non-overlapping time intervals.

142. The method of any of clauses 110 to 141, wherein the first symmetric pair of propellers and the second symmetric pair of propellers comprise pairs of tilt propellers.

143. The method of any of clauses 110 to 142, wherein the first ice management cycle further comprises:
rotating a symmetric pair of lift propellers between a first angular position and a second angular position, the first angular position being offset from the second angular position by a multiple of 30 degrees.

144. The method of clause 143, wherein each lift propeller of the symmetric pair of lift propellers is located behind a corresponding tilt propeller of the first symmetric pair of tilt propellers in a forward flight direction.

145. The method of clause 143 or 144, wherein each lift propeller of the symmetric pair of lift propellers is located farther from a body of the aircraft than a corresponding tilt propeller of the first symmetric pair of tilt propellers.

146. The method of any of clauses 142 to 145, wherein each lift propeller of the symmetric pair of lift propellers is located closer to a body of the aircraft than a corresponding tilt propeller of the first symmetric pair of tilt propellers.
147. The method of any of clauses 110 to 141, wherein the first symmetric pair of propellers and the second symmetric pair of propellers comprise pairs of lift propellers.
148. The method of clause 147, wherein the first ice management cycle comprises: rotating the first symmetric pair of propellers between a first angular position and a second angular position, the first angular position being offset from the second angular position by a multiple of 30 degrees.
149. The method of clause 148, wherein rotating the first symmetric pair of propellers comprises rotating a first lift propeller of the first symmetric pair of propellers in an opposite direction from a second lift propeller of the first symmetric pair of propellers.
150. The method of any of clauses 110 to 149, wherein performing the propeller modulation comprises performing the first ice management cycle at periodic intervals based on a predetermined schedule to manage asymmetric ice accretion.
151. The method of any of clauses 110 to 150, further comprising performing the propeller modulation at periodic intervals to manage asymmetric ice accretion.
152. A computer-readable medium that stores a set of instructions that is executable by at least one processor of an apparatus to cause the apparatus to perform the method of any of clauses 110 to 151.
153. A propeller assembly for an aircraft, comprising:
a propeller shaft;
a propeller hub coupled to the propeller shaft;
a propeller blade coupled to the propeller hub;
a spinner coupled to the propeller hub;
an electrically conductive portion;
a motor configured to rotate the propeller shaft, propeller hub, the propeller blade, the spinner, and the electrically conductive portion;
a spinner rod configured to pass through the propeller shaft and being rotationally decoupled from the propeller shaft; and
a first magnet attached to the spinner rod;
wherein the first magnet is configured to generate a current in the electrically conductive portion when the propeller rotates to manage ice accretion on a surface of the propeller assembly.
154. The propeller assembly of clause 153, further comprising:
a pitch control, wherein the spinner rod comprises a pitch control rod configured to actuate the pitch control.
155. The propeller assembly of clause 154, wherein the pitch control comprises a yoke and a blade actuating pin.
156. The propeller assembly of any of clauses 154 or 155, wherein the spinner rod is rotationally decoupled form the pitch control by a bearing.
157. The propeller assembly of any of clauses 154 to 156, further comprising a second magnet attached to the spinner rod at a position that is diametrically opposite to the first magnet with respect to the spinner rod.

158. A propeller assembly for an aircraft, comprising:
a propeller comprising:
a hub; and
a plurality of propeller blades, each of the plurality of propeller blades comprising a blade channel inside the propeller blade and configured to circulate fluid;
a motor assembly configured to rotate the propeller about a rotation axis; and
an oil flow path configured to circulate oil through the motor assembly and through each blade channel of the plurality of propeller blades to thermally couple the motor assembly to the plurality of propeller blades;
wherein the propeller assembly is configured to transfer heat from the motor assembly to an external environment outside the propeller assembly by thermal conduction through the propeller blades.
159. The propeller assembly of clause 158, wherein, during operation of the propeller assembly, at least 30% of heat that is generated by the motor assembly is transferred to the external environment by thermal conduction through the propeller blades.
160. The propeller assembly of clause 158, wherein, during operation of the propeller assembly, at least 50% of heat that is generated by the motor assembly is transferred to the external environment by thermal conduction through the propeller blades.
161. The propeller assembly of any of clauses 158 to 160, wherein:
each of the plurality of propeller blades further comprises a thermal conductor configured to conduct heat from the blade channel to a portion of the propeller blade that is radially outward from the blade channel.
162. The propeller assembly of any of clauses 158 to 161, wherein blade channel extends radially outward through the blade by not more than 70% of a blade radius as measured from the rotation axis.
163. The propeller assembly of any of clauses 158 to 162, wherein blade channel extends radially outward through the blade by not more than 50% of a blade radius as measured from the rotation axis.
164. The propeller assembly of any of clauses 158 to 163, wherein blade channel extends radially outward through the blade by not more than 30% of a blade radius as measured from the rotation axis.
165. The propeller assembly of any of clauses 158 to 164, wherein:
the propeller further comprises a spinner, the spinner having a spinner channel configured to circulate fluid; and
the oil flow path is further configured to circulate oil through the spinner channel to thermally couple the motor assembly to the spinner.
166. A propeller assembly for an aircraft, comprising:
a propeller comprising:
a hub; and
a plurality of propeller blades, each of the plurality of propeller blades comprising a blade channel inside the propeller blade and configured to circulate fluid;
a motor assembly configured to rotate the propeller about a rotation axis; and
an oil flow path configured to circulate oil through the motor assembly and through each blade channel of the plurality of propeller blades to thermally couple the motor assembly to the plurality of propeller blades;
wherein the plurality of propeller blades comprises a sole heat exchanger of the motor assembly.

167. The propeller assembly of clause 166, wherein, during operation of the propeller assembly, at least 30% of heat generated by the motor assembly is transferred to the external environment by thermal conduction through the propeller blades.
168. The propeller assembly of clause 166, wherein, during operation of the propeller assembly, at least 50% of heat generated by the motor assembly is transferred to the external environment by thermal conduction through the propeller blades.
169. The propeller assembly of any of clauses 166 to 168, wherein:
each of the plurality of propeller blades further comprises a thermal conductor configured to conduct heat from the blade channel to a portion of the propeller blade that is radially outward from the blade channel.
170. The propeller assembly of any of clauses 166 to 169, wherein blade channel extends radially outward through the blade by not more than 70% of a blade radius as measured from the rotation axis.
171. The propeller assembly of any of clauses 166 to 170, wherein blade channel extends radially outward through the blade by not more than 50% of a blade radius as measured from the rotation axis.
172. The propeller assembly of any of clauses 166 to 171, wherein blade channel extends radially outward through the blade by not more than 30% of a blade radius as measured from the rotation axis.
173. The propeller assembly of any of clauses 166 to 172, wherein:
the propeller further comprises a spinner, the spinner having a spinner channel configured to circulate fluid; and
the oil flow path is further configured to circulate oil through the spinner channel to thermally couple the motor assembly to the spinner.
174. A method of managing ice accretions on an aircraft, the method comprising:
determining an icing condition of the aircraft;
performing a propeller modulation based on the icing condition, wherein performing the propeller modulation comprises:
inducing a first ice management cycle in a first set of one or more propellers of the aircraft,
inducing a second ice management cycle in a second set of one or more propellers of the aircraft, the first set of one or more propellers being different from the second set of one or more propellers, and the first ice management cycle occurring at a first time interval that is different from a second time interval of the second ice management cycle.
175. The method of clause 174, wherein determining the icing condition is based on a primary ice detector.
176. The method of clause 174 or 175, wherein determining the icing condition is based on an input from a flight control system or a pilot indicating an icing condition exists.
177. The method of any of clauses 174 to 176, further comprising:
determining an aircraft state, and
performing the propeller modulation when the aircraft state meets one or more predefined parameters.
178. The method of clause 177, wherein the one or more predefined parameters comprises one of control margin status, current bank angle, load factor, vertical airspeed vs. commanded airspeed, altitude, propulsion system, signal integrity, or flight mode.
179. The method of any of clauses 174 to 178, wherein the propeller modulation comprises modulating at least one of revolutions per minute (RPM), blade pitch angle, torque, or propeller tilt angle.
180. The method of any of clauses 174 to 179, wherein the propeller modulation comprises modulating RPM, and the first ice management cycle comprises increasing an RPM of the first set of one or more propellers by at least 50 percent during the first time interval.
181. The method of any of clauses 174 to 179, wherein the propeller modulation comprises modulating RPM, and the first ice management cycle comprises increasing an RPM of the first set of one or more propellers to at least 80 percent of a maximum RPM during the first time interval.
182. The method of any of clauses 174 to 179, wherein the propeller modulation comprises modulating blade pitch angle, and the first ice management cycle comprises changing a blade pitch angle of the first set of one or more propellers by at least 5 degrees during the first time interval.
183. The method of clause 182, wherein the first ice management cycle further comprises changing the blade pitch angle of the first set of one or more propellers by at least 5 degrees at least 4 times during the first time interval.
184. The method of any of clauses 174 to 183, wherein the propeller modulation comprises modulating torque, and the first ice management cycle comprises changing a torque of the first set of one or more propellers by at least 50 percent during the first time interval.
185. The method of any of clauses 174 to 183, wherein the propeller modulation comprises modulating torque, and the first ice management cycle comprises:
increasing a torque of the first set of one or more propellers to from an initial torque value to within 80 percent of a maximum torque, and decreasing the torque of the first set of one or more propellers to the initial torque during the first time interval.
186. The method of any of clauses 174 to 185, wherein the propeller modulation comprises modulating propeller tilt angle, and the first ice management cycle comprises changing a propeller tilt angle of the first set of one or more propellers by at least 10 degrees during the first time interval.
187. The method of any of clauses 174 to 179 or 182 to 185, wherein the propeller modulation comprises modulating RPM, and the first ice management cycle comprises increasing a first RPM of the first set of one or more propellers to at least 80 percent of a second RPM of the second set of one or more propellers during the first time interval.
188. The method of clause 187, wherein the first ice management cycle further comprises decreasing the second RPM of the second set of one or more propellers during the first time interval to compensate an increased RPM of the first set of one or more propellers.
189. The method of clause 187 or 188, wherein: the second ice management cycle comprises increasing the second RPM of the second set of one or more propellers to at least 80 percent of the first RPM of the first set of one or more propellers during the second time interval.
190. The method of any of clauses 187 to 189, wherein the second ice management cycle further comprises decreasing the first RPM of the first set of one or more propellers during the second time interval to compensate an increased RPM of the second set of one or more propellers.

191. The method of any of clauses 174 to 181 or 184 to 190, wherein the propeller modulation comprises modulating blade pitch angle, and the first ice management cycle comprises changing a first blade pitch angle of the first set of one or more propellers by at least 5 degrees with respect to a second blade pitch angle of the second set of one or more propellers during the first time interval.

192. The method of clause 191, wherein the first ice management cycle further comprises increasing a second RPM of the second set of one or more propellers during the first time interval.

193. The method of clause 191 or 192, wherein the second ice management cycle comprises changing a second blade pitch angle of the second set of one or more propellers by at least 5 degrees with respect to the first blade pitch angle of the first set of one or more propellers during the second time interval.

194. The method of any of clauses 174 to 183 or 186 to 193, wherein the propeller modulation comprises modulating torque, and the first ice management cycle comprises increasing a torque of the first set of one or more propellers from an initial torque value to a first torque value and decreasing the torque of the first set of one or more propellers from the first torque value to a second torque value.

195. The method of clause 194, wherein the first torque value is within 80 percent of a maximum torque value of the first set of one or more propellers.

196. The method of clause 194 or 195, wherein the second torque value is less than 50 percent of the initial torque value of the first set of one or more propellers.

197. The method of any of clauses 194 to 196, wherein the first ice management cycle further comprises increasing a second RPM of the second set of one or more propellers during the first time interval.

198. The method of any of clauses 174 to 197, wherein the propeller modulation comprises modulating propeller tilt angle, and the first ice management cycle comprises changing a propeller tilt angle of the first set of one or more propellers by at least 10 degrees.

199. The method of clause 198, wherein the first ice management cycle further comprises increasing a second RPM of the second set of one or more propellers during the first time interval.

200. The method of any of clauses 174 to 199, wherein:
wherein the first set of one or more propellers includes an outermost propeller from a first side of a body of the aircraft and an outermost propeller from a second side of the body of the aircraft, forming a first symmetric pair of propellers.

201. The method of clause 200, wherein:
the second set of one or more propellers includes an innermost propeller inward of the outermost propeller on the first side of the body of the aircraft, and an innermost propeller inward of the outermost propeller on the second side of the body of the aircraft, forming a second symmetric pair of propellers.

202. The method of clause 201, wherein performing the propeller modulation comprises inducing a third ice management cycle in a third symmetric pair of propellers of the aircraft, the third ice management cycle occurring at a third time interval, the third time interval being different from the first time interval and the second time interval.

203. The method of clause 202, wherein the third symmetric pair of propellers includes a middle propeller between the outermost propeller and the innermost propeller on the first side of the body of the aircraft and a middle propeller between the outermost propeller and the innermost propeller on the second side of the body of the aircraft.

204. The method of any of clauses 174 to 203, further comprising performing the propeller modulation at repeating time intervals.

205. The method of any of clauses 174 to 204, wherein performing the propeller modulation comprises inducing the first ice management cycle and the second ice management cycle in non-overlapping time intervals.

206. The method of any of clauses 174 to 205, wherein the first set of one or more propellers and the second set of one or more propellers comprise tilt propellers.

207. The method of any of clauses 174 to 206, wherein the first ice management cycle further comprises:
rotating a lift propeller between a first angular position and a second angular position, the first angular position being offset from the second angular position by a multiple of 30 degrees.

208. The method of clause 207, wherein the lift propeller is located behind one of the first set of one or more propellers in a forward flight direction.

209. The method of clause 207, wherein the lift propeller is located farther from a body of the aircraft than one of the first set of one or more propellers.

210. The method of any of clauses 207 to 209, wherein the lift propeller is located closer to a body of the aircraft than one of the first set of one or more propellers.

211. The method of any of clauses 174 to 205, wherein the first set of one or more propellers and the second set of one or more propellers comprise lift propellers.

212. The method of clause 211, wherein the first ice management cycle comprises rotating a first lift propeller of the first set of one or more propellers between a first angular position and a second angular position, the first angular position being offset from the second angular position by a multiple of 30 degrees.

213. The method of clause 212, wherein the first ice management cycle comprises rotating a second lift propeller of the first set of one or more propellers in an opposite direction from the first lift propeller.

214. The method of any of clauses 174 to 213, wherein performing the propeller modulation comprises performing the first ice management cycle at periodic intervals based on a predetermined schedule to manage asymmetric ice accretion.

215. The method of any of clauses 174 to 214, further comprising performing the propeller modulation at periodic intervals to manage asymmetric ice accretion.

216. A computer readable medium that stores a set of instructions that is executable by at least one processor of an apparatus to cause the apparatus to perform the method of any of clauses 174 to 215.

217. A flight control system for an aircraft, the flight control system comprising:
a memory storing instructions; and
a processor configured to execute the instructions to cause the flight control system to perform the method of any of clauses 174 to 215.

218. A method of managing ice accretions on an aircraft, the method comprising:
determining an icing condition of the aircraft; and
performing a propeller modulation based on the icing condition, wherein performing the propeller modulation comprises:
modulating a first propeller parameter in coordination with a modulation of a second propeller parameter of a first set of one or more propellers of the aircraft,
wherein the first propeller parameter and the second propeller parameters are different parameters, each comprising one of: revolutions per minute (RPM), blade pitch angle, torque, propeller tilt angle, or propeller angular position about a propeller blade rotation axis, of the first set of one or more propellers.
219. The method of clause 218, wherein one of the first propeller parameter or the second propeller parameter comprises RPM.
220. The method of clause 218 or 219, performing the propeller modulation comprises increasing the RPM of the first set of one or more propellers by at least 50 percent.
221. The method any of clauses 218 to 220, wherein performing the propeller modulation comprises increasing the RPM of the first set of one or more propellers to at least 80 percent of a maximum RPM.
222. The method of any of clauses 218 to 221, wherein one of the first propeller parameter or the second propeller parameter comprises blade pitch angle.
223. The method of any of clauses 218 to 222, wherein performing the propeller modulation comprises changing the blade pitch angle of the first set of one or more propellers by at least 5 degrees.
224. The method of any of clauses 218 to 223, wherein one of the first propeller parameter or the second propeller parameter comprises torque.
225. The method of any of clauses 218 to 224, wherein performing the propeller modulation comprises repeatedly braking and accelerating the first set of one or more propellers to include vibrations in propeller blades of the first set of one or more propellers.
226. The method of any of clauses 218 to 225, wherein one of the first propeller parameter or the second propeller parameter comprises propeller tilt angle.
227. The method of any of clauses 218 to 226, wherein performing the propeller modulation comprises changing the propeller tilt angle of the first set of one or more propellers by at least 10 degrees during a first time interval.
228. The method of any of clauses 218 to 227, wherein one of the first propeller parameter or the second propeller parameter comprises propeller angular position about the propeller blade rotation axis.
229. The method of any of clauses 218 to 228, wherein:
the one of the first propeller parameter or the second propeller parameter comprises propeller angular position about the propeller blade rotation axis, wherein modulating the propeller angular position comprises moving at least one propeller of the first set of one or more propellers from a first angular position to a second angular position, the at least one propeller comprising at least a first blade and a second blade;
wherein in the first angular position, a first surface of one of the first blade or the second blade is facing away from a forward airflow, and a second surface one of the first blade or the second blade is facing toward the forward airflow, and
in the second angular position, the second surface is facing away from the forward airflow, and the first surface is facing toward the forward airflow.
230. The method of clause 229, wherein the first surface comprises a tip of the first blade, and the second surface comprises a tip of the second blade.
231. The method of clause 229, wherein the first surface comprises a leading edge of the first blade, and the second surface comprises a trailing edge of the first blade.
232. The method of clause 229, wherein the first surface comprises a leading edge of the first blade, and the second surface comprises a leading edge of the second blade.
233. The method of clause 229, wherein the first surface comprises a trailing edge of the first blade, and the second surface comprises a trailing edge of the second blade.
234. The method of clause 229, wherein the at least one propeller comprises a tilt propeller, and the other of the first propeller parameter or the second propeller parameter comprises propeller tilt angle.
235. The method of clause 229, wherein the at least one propeller comprises one of a lift propeller or a tilt propeller, and the other of the first propeller parameter or the second propeller parameter comprises propeller torque.
236. The method of any of clauses 218 to 235, wherein modulating the second propeller parameter is configured to compensate an effect on flight characteristics of modulating the first propeller parameter.
237. The method of any of clauses 218 to 236, wherein modulating the second propeller parameter is configured to perform ice management together with modulating the first propeller parameter.
238. The method of any of clauses 218 to 237, where performing the propeller modulation further comprises:
modulating a third propeller parameter in a second set of one or more propellers of the aircraft, the second set being different from the first set, to compensate an effect on flight characteristics of modulating the first propeller parameter;
wherein the third propeller parameter comprises one of RPM, blade pitch angle, torque, propeller tilt angle, or propeller angular position about a propeller blade rotation axis, of the second set of one or more propellers.
239. The method of clause 238, wherein the third propeller parameter is the same as the first propeller parameter.
240. The method of clause 238, wherein the third propeller parameter is different from the first propeller parameter.
241. The method of any of clauses 218 to 240, wherein the first set of one or more propellers comprises at least one propeller on either side of a fuselage of the aircraft.
242. The method of any of clauses 218 to 241, wherein the first set of one or more propellers comprises all tilt propellers of the aircraft.
243. The method of any of clauses 218 to 242, wherein determining the icing condition is based on a primary ice detector.
244. The method of any of clauses 218 to 243, wherein determining the icing condition is based on an input from a flight control system or an input from a pilot, the input indicating an icing condition exists.

245. The method of any of clauses 218 to 244, further comprising:
determining an aircraft state, and
performing the propeller modulation when the aircraft state meets one or more predefined parameters.

246. The method of clause 245, wherein the one or more predefined parameters comprises one of control margin status, current bank angle, load factor, vertical airspeed vs. commanded airspeed, altitude, propulsion system, signal integrity, or flight mode.

247. A computer readable medium that stores a set of instructions that is executable by at least one processor of an apparatus to cause the apparatus to perform the method of any of clauses 218 to 246.

248. A flight control system comprising:
a memory storing instructions; and
a processor configured to execute the instructions to cause the flight control system to perform the method of any of clauses 218 to 246.

249. A method of managing ice accretions on an aircraft, the method comprising:
determining an icing condition of the aircraft; and
performing a propeller modulation on one or more propellers based on the icing condition, wherein performing the propeller modulation comprises:
moving at least one propeller of a first set of one or more propellers from a first angular position to a second angular position, the at least one propeller comprising at least a first blade and a second blade;
wherein in the first angular position, a first surface of one of the first blade or the second blade is facing away from a forward airflow, and a second surface one of the first blade or the second blade is facing toward the forward airflow, and
in the second angular position, the second surface is facing away from the forward airflow, and the first surface is facing toward the forward airflow.

250. The method of clause 249, wherein the first surface comprises a tip of the first blade, and the second surface comprises a tip of the second blade.

251. The method of clause 249, wherein the first surface comprises a leading edge of the first blade, and the second surface comprises a trailing edge of the first blade.

252. The method of clause 249, wherein the first surface comprises a leading edge of the first blade, and the second surface comprises a leading edge of the second blade.

253. The method of clause 249, wherein the first surface comprises a trailing edge of the first blade, and the second surface comprises a trailing edge of the second blade.

254. The method of any of clauses 249 to 253, wherein the at least one propeller comprises a tilt propeller.

255. The method of any of clauses 249 to 253, wherein the at least one propeller comprises a lift propeller.

256. A computer readable medium that stores a set of instructions that is executable by at least one processor of an apparatus to cause the apparatus to perform the method of any of clauses 249 to 255.

257. A flight control system, comprising:
a memory storing instructions; and
a processor configured to execute the instructions to cause the flight control system to perform the method of any of clauses 249 to 256.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The invention claimed is:

1. A propeller assembly for an aircraft, comprising:
a propeller;
a motor assembly coupled to the propeller;
a heat exchanger;
an oil flow path configured to thermally couple the heat exchanger to the motor assembly, the oil flow path comprising a first segment, a second segment, and a third segment; and
a nacelle mechanically coupled to the motor assembly, the nacelle comprising an air inlet configured to direct air into the heat exchanger, the air inlet comprising a lower lip with respect to a forward flight configuration and an upper lip opposite the lower lip, the lower lip being farther from the motor assembly than the upper lip,
wherein:
the first segment passes through motor assembly;
the second segment passes through the heat exchanger;
the third segment passes along the lower lip, and
the oil flow path bypasses the upper lip.

2. The propeller assembly of claim 1, further comprising:
a thermally conductive material between the motor assembly and the upper lip, the thermally conductive material being configured to conduct heat from the motor assembly to the upper lip.

3. The propeller assembly of claim 2, wherein:
the nacelle comprises a first material;
the thermally conductive material comprises a second material different from the first material, and
the second material has a higher coefficient of thermal conductivity than the first material.

4. The propeller assembly of claim 2, wherein the thermally conductive material extends along two lateral sides of the air inlet between the upper lip and the lower lip.

5. The propeller assembly claim 2, wherein the thermally conductive material extends from inside the motor assembly to outside the motor assembly.

6. The propeller assembly of claim 5, wherein the thermally conductive material comprises a plate extending from inside the motor assembly to outside the motor assembly.

7. The propeller assembly of claim 2, wherein the thermally conductive material wraps around the motor assembly.

8. The propeller assembly of claim 1, wherein the third segment branches out of the second segment in an oil flow direction and returns to the second segment in the oil flow direction.

9. The propeller assembly of claim 8, wherein the first segment feeds into the second segment in the oil flow direction and returns from the second segment in the oil flow direction.

10. The propeller assembly of claim 1, further comprising a first flow control valve configured to regulate an oil flow rate through the third segment.

11. The propeller assembly of claim 10, wherein the first flow control valve is configured to selectively shut off an oil flow to or from the third segment.

12. The propeller assembly of claim 10, further comprising a second flow control valve, wherein the first flow control valve is located at an inlet side of the third segment, and the second flow control valve is located at an outlet side of the third segment.

13. The propeller assembly of claim 1, wherein the third segment runs along a lower surface of the nacelle with respect to a forward flight configuration.

14. The propeller assembly of claim 1, wherein the third segment branches out of the first segment in an oil flow direction at a first segment exit point.

15. The propeller assembly of claim 14, wherein the third segment feeds into the second segment in the oil flow direction.

16. The propeller assembly of claim 15, wherein the third segment returns to the first segment in the oil flow direction at a first segment entry point, the first segment entry point being downstream in the oil flow direction of the first segment exit point.

17. The propeller assembly of claim 16, wherein the first segment entry point is upstream of the second segment in the oil flow direction.

18. The propeller assembly of claim 16, wherein the first segment entry point is downstream of the second segment in the oil flow direction.

19. The propeller assembly of claim 1, wherein the third segment is connected in series within the first segment.

20. The propeller assembly of claim 1, wherein a first portion of the first segment feeds into the third segment, and the third segment feeds into a second portion of the first segment.

21. The propeller assembly of claim 1, further comprising:
- a spinner, the spinner having a spinner channel configured to circulate fluid; and
- the oil flow path is further configured to circulate oil through the spinner channel to thermally couple the motor assembly to the spinner.

22. The propeller assembly of claim 1, further comprising:
- a plurality of propeller blades coupled to the motor assembly and configured to be rotated by the motor assembly, each of the plurality of propeller blades comprising a blade channel inside the propeller blade and configured to circulate fluid; and
- the oil flow path is further configured to circulate oil through each blade channel of the plurality of propeller blades to thermally couple the motor assembly to the plurality of propeller blades.

23. An aircraft comprising the propeller assembly of claim 1.

24. A vertical takeoff and landing aircraft comprising the propeller assembly of claim 1, wherein:
- the propeller, motor assembly, heat exchanger and nacelle are configured to tilt with respect to a frame of the vertical takeoff and landing aircraft between a lift configuration and a cruise configuration.

* * * * *